United States Patent [19]

Kuroda et al.

[11] Patent Number: 5,805,560
[45] Date of Patent: Sep. 8, 1998

[54] RECORDING/REPRODUCING APPARATUS AND RECORDING/REPRODUCING METHOD USING PROBE

[75] Inventors: Ryo Kuroda, Kawasaki; Toshihiko Takeda, Atsugi; Shunichi Shido, Sagamihara, all of Japan

[73] Assignee: Canon Kabushiki Kaisha, Tokyo, Japan

[21] Appl. No.: 720,974

[22] Filed: Oct. 16, 1996

[30] Foreign Application Priority Data

Oct. 16, 1995 [JP] Japan .................................. 7-293643
Mar. 29, 1996 [JP] Japan .................................. 8-103985
Oct. 3, 1996 [JP] Japan .................................. 8-281900

[51] Int. Cl.$^6$ ...................................................... G11B 9/00
[52] U.S. Cl. .......................... 369/126; 369/101; 250/306
[58] Field of Search .................................. 369/126, 101; 250/306; 365/174

[56] References Cited

U.S. PATENT DOCUMENTS

| | | | |
|---|---|---|---|
| 4,343,993 | 8/1982 | Binnig et al. | 250/306 |
| 4,575,822 | 3/1986 | Quate | 365/174 |
| 4,724,318 | 2/1988 | Binnig | 250/306 |
| 5,204,851 | 4/1993 | Kawada et al. | 369/126 |
| 5,220,555 | 6/1993 | Yanagisawa et al. | 369/126 |
| 5,282,191 | 1/1994 | Yamano et al. | 369/126 |
| 5,287,342 | 2/1994 | Kishi et al. | 369/126 |

FOREIGN PATENT DOCUMENTS

| | | |
|---|---|---|
| 62-281138 | 12/1987 | Japan . |
| 63-161552 | 7/1988 | Japan . |
| 63-161553 | 7/1988 | Japan . |
| 01196751 | 8/1989 | Japan . |
| 1-245445 | 9/1989 | Japan . |
| 02050333 | 2/1990 | Japan . |
| 03194124 | 8/1991 | Japan . |
| 04212737 | 8/1992 | Japan . |
| 04364244 | 12/1992 | Japan . |

OTHER PUBLICATIONS

"Silicon As A Mechanical Material", K. Petersen, Proceedings Of The IEEE, vol. 70, No. 5, May 1982, pp. 420–457.

*Primary Examiner*—David C. Nelms
*Assistant Examiner*—Kim-Kwok Chu
*Attorney, Agent, or Firm*—Fitzpatrick, Cella, Harper & Scinto

[57] ABSTRACT

A recording/reproducing apparatus for performing recording/reproduction by running a probe relative to a recording bit string on a recording medium and detecting recording bits in the recording bit string, comprising a plural-recording-bit-detection device for letting the probe perform plural recording bit detections as taking positions thereof shifted relative to a same recording bit string on the recording medium; and a recording bit determining device for performing determination of true recording bit, based on the results of the plural recording bit detections.

65 Claims, 35 Drawing Sheets

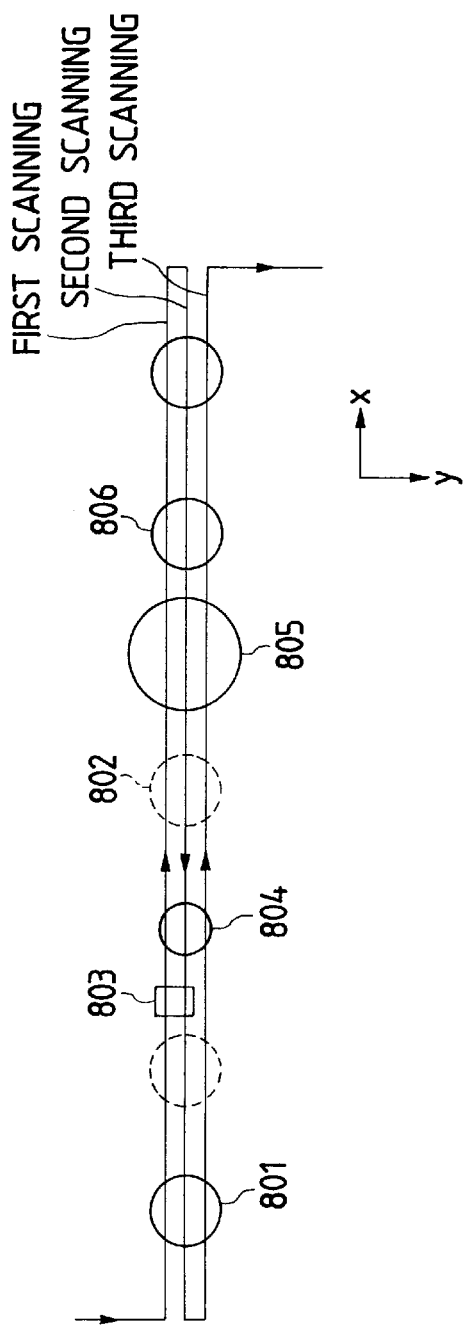
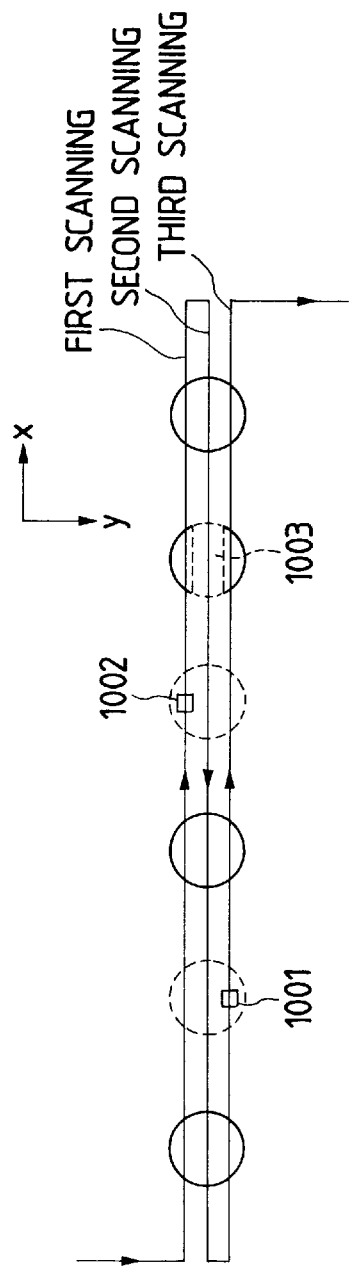

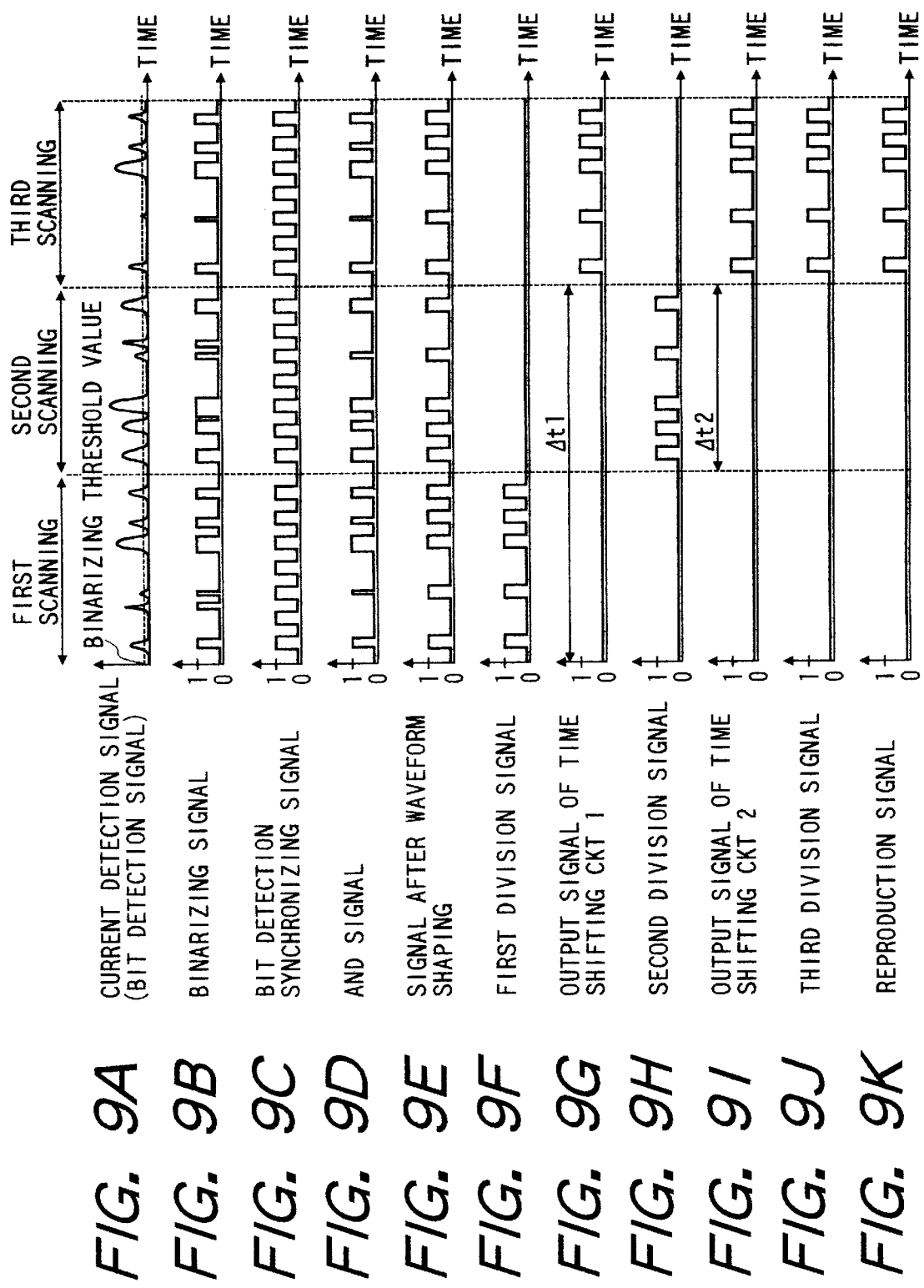

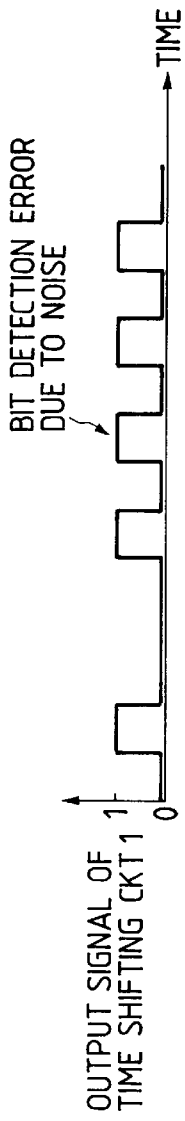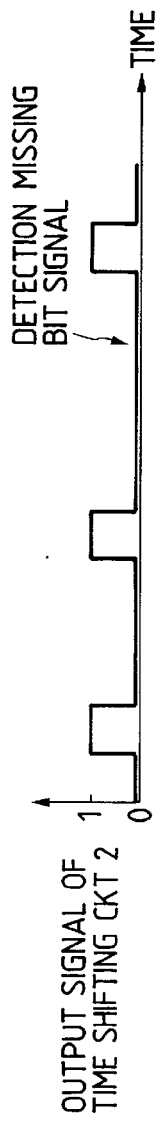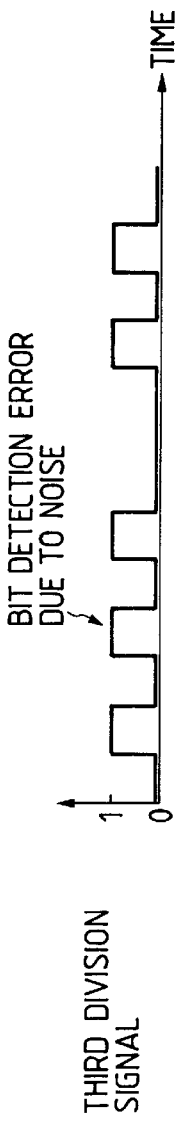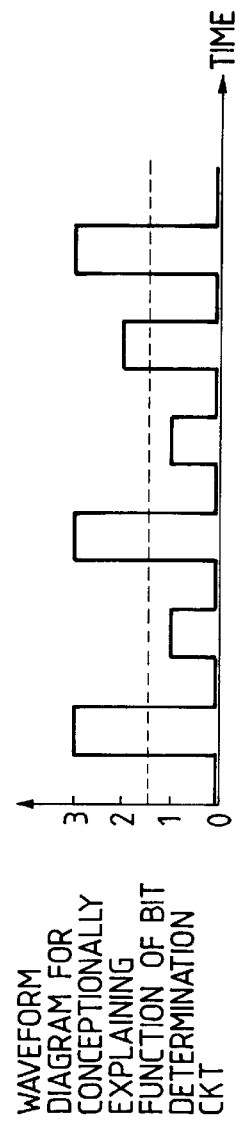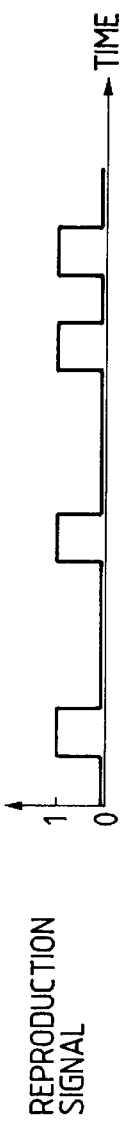
FIG. 11A  OUTPUT SIGNAL OF TIME SHIFTING CKT 1
FIG. 11B  OUTPUT SIGNAL OF TIME SHIFTING CKT 2
FIG. 11C  THIRD DIVISION SIGNAL
FIG. 11D  WAVEFORM DIAGRAM FOR CONCEPTIONALLY EXPLAINING FUNCTION OF BIT DETERMINATION CKT
FIG. 11E  REPRODUCTION SIGNAL

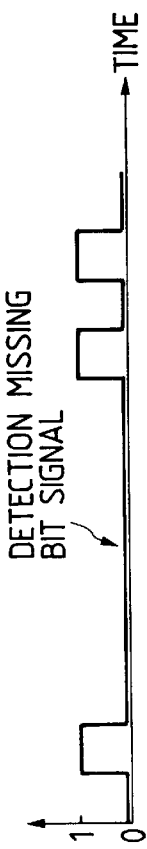
FIG. 13A  OUTPUT SIGNAL OF TIME SHIFTING CKT 1
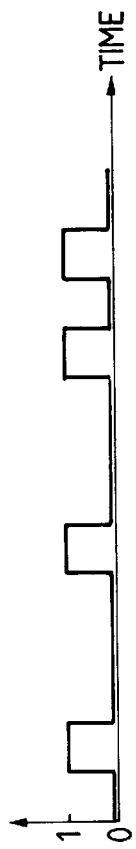
FIG. 13B  OUTPUT SIGNAL OF TIME SHIFTING CKT 2
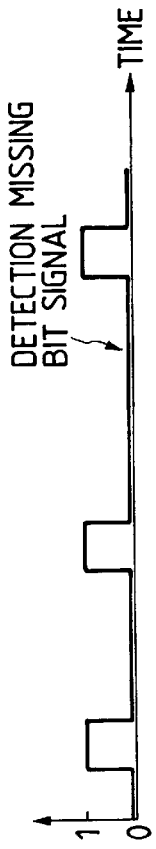
FIG. 13C  THIRD DIVISION SIGNAL
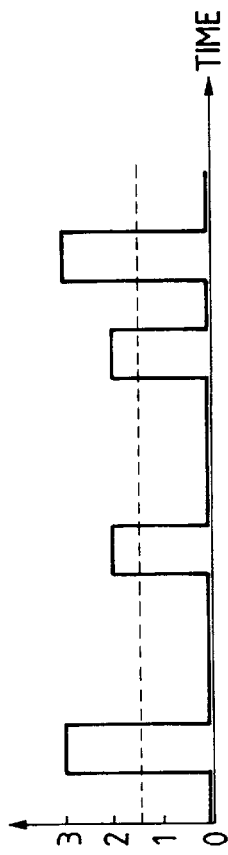
FIG. 13D  WAVEFORM DIAGRAM FOR CONCEPTIONALLY EXPLAINING FUNCTION OF BIT DETERMINATION CKT
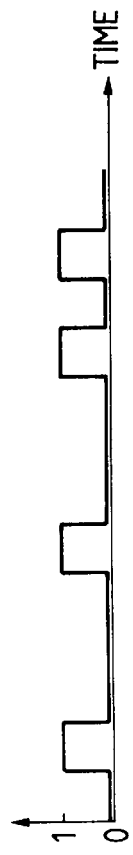
FIG. 13E  REPRODUCTION SIGNAL

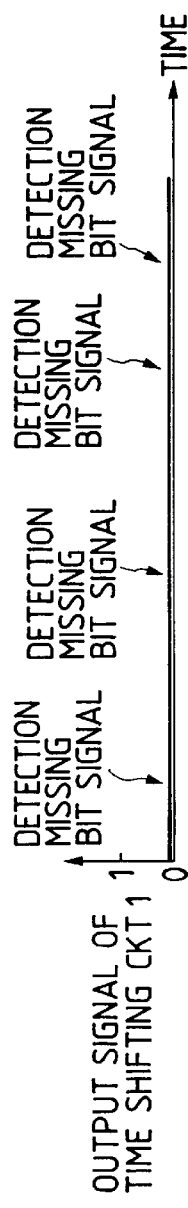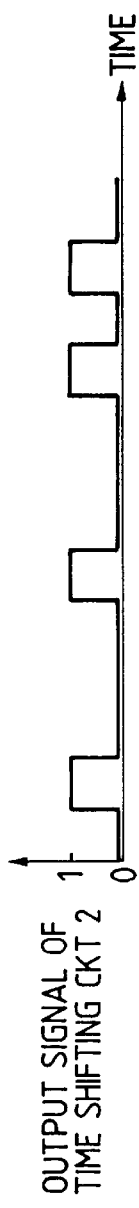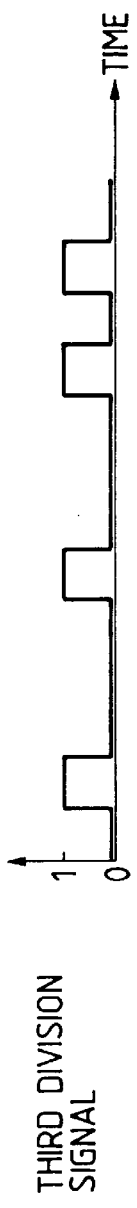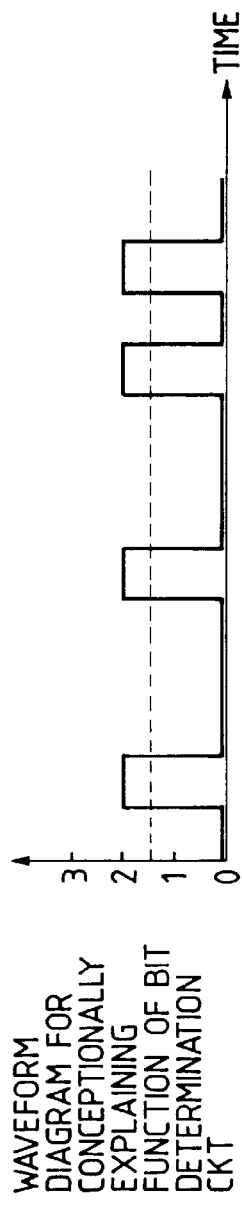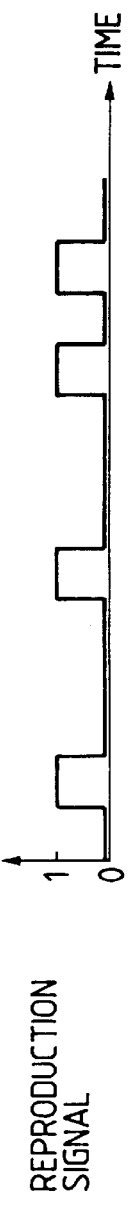
FIG. 15A OUTPUT SIGNAL OF TIME SHIFTING CKT 1
FIG. 15B OUTPUT SIGNAL OF TIME SHIFTING CKT 2
FIG. 15C THIRD DIVISION SIGNAL
FIG. 15D WAVEFORM DIAGRAM FOR CONCEPTIONALLY EXPLAINING FUNCTION OF BIT DETERMINATION CKT
FIG. 15E REPRODUCTION SIGNAL

DRIVE VOLTAGE FOR PIEZO ELEMENT ACTUATOR

DRIVE AMOUNT OF PIEZO ELEMENT ACTUATOR

SIGNAL AFTER WAVEFORM SHAPING

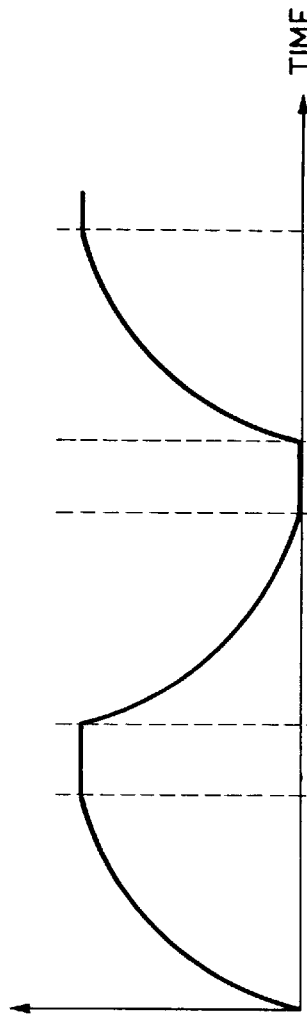
FIG. 21A DRIVE VOLTAGE FOR PIEZO ELEMENT ACTUATOR WITH HYSTERESIS CHARACTERISTIC
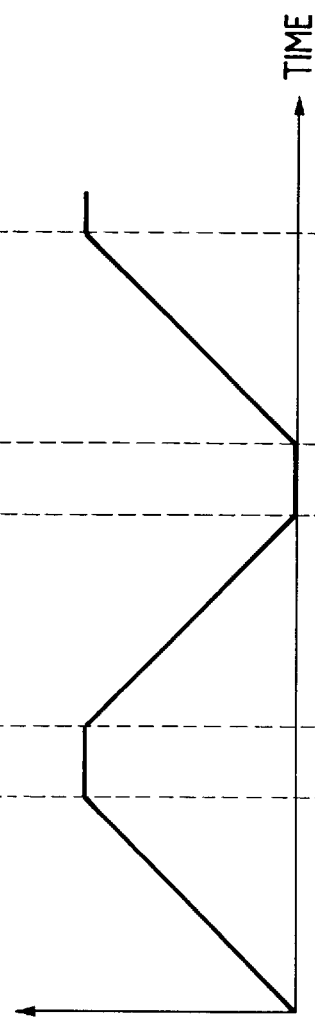
FIG. 21B DRIVE AMOUNT OF PIEZO ELEMENT ACTUATOR
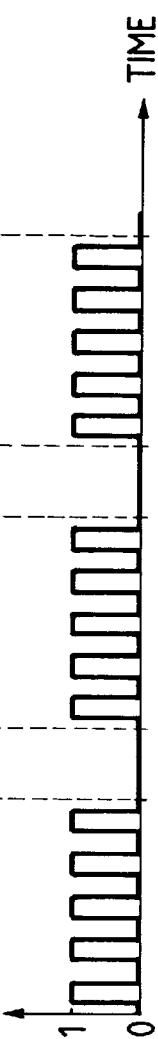
FIG. 21C SIGNAL AFTER WAVEFORM SHAPING

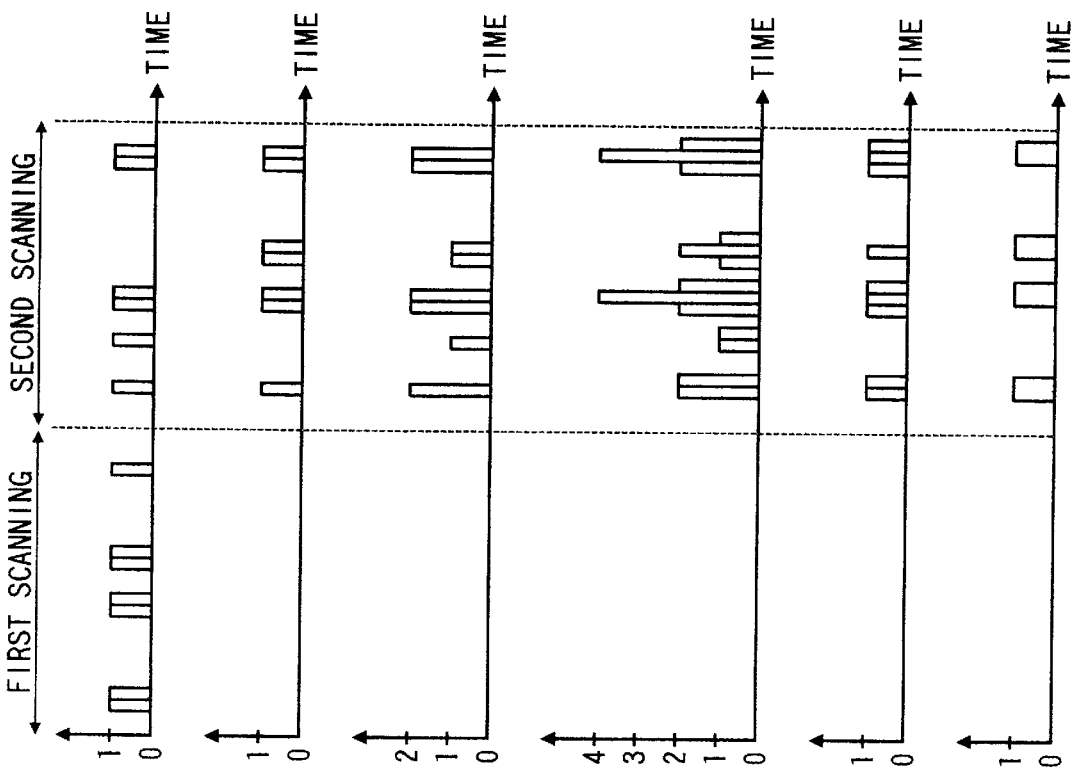

RECORDING/REPRODUCING APPARATUS AND RECORDING/REPRODUCING METHOD USING PROBE

BACKGROUND OF THE INVENTION

1. Field of the Invention

The present invention relates to a recording/reproducing apparatus and recording/reproducing method, and more particularly, to a recording/reproducing apparatus or method capable of reducing bit detection errors when reproducing information as scanning an information recording bit string by probe.

2. Related Background Art

Developed these years was the scanning tunneling microscope (hereinafter abbreviated to STM) capable of observing a surface of an electroconductive substance in nanometer or less resolution (as described in the specification of U.S. Pat. No. 4,343,993), with which observation is carried out in the atomic or molecular scale as to atomic sequence of metal or semiconductor surface, orientation of organic molecules, or the like. Also developed by further extending the STM technology was the atomic force microscope (hereinafter abbreviated to AFM) capable of observing a surface of an electrically insulating material or the like in the resolution equivalent to that of STM (as described in the specification of U.S. Pat. No. 4,724,318).

As an application of the principle of the scanning probe microscopes (hereinafter abbreviated to SPM) including such STM, AFM, and the like, for example, there were such proposals as to realize high-density recording by using a recording medium in place of a sample, having a probe needle access the recording medium while performing feedback control of the recording medium-to-probe needle distance so as to keep the tunnel current constant by STM structure, and applying a voltage between the recording medium and the probe needle to effect recording/reproduction of bits in the bit size of the atomic or molecular scale (as described in the specification of U.S. Pat. No. 4,575,822, the bulletin of Japanese Laid-open Patent Application No. 63-161552, or the bulletin of Japanese Laid-open Patent Application No. 63-161553).

There were further proposals to employ the structure of combination of STM with AFM to effect recording/reproduction by using an elastic probe being electrically conductive and scanning the recording medium with the probe needle at the tip of probe in contact therewith (as described in the bulletin of Japanese Laid-open Patent Application No. 01-245445 or the bulletin of Japanese Laid-open Patent Application No. 03-194124).

In general, the recording/reproducing apparatus as described above necessitates such tracking control as to make the probe follow up a recorded bit string by feedback control in order to reproduce bits with high S/N, because the recording bits are very small. For example, the bulletin of Japanese Laid-open Patent Application No. 04-212737 discloses a tracking method to detect the bits as vibrating the probe in fine amplitude in the normal direction to the bit string row, detect positional deviation of the probe relative to the bit string in the normal direction from modulation components of bit detection signals, and perform such control as to suppress the positional deviation.

In contrast with it, techniques for eliminating the need for the tracking control have been also proposed.

For example, the bulletin of Japanese Laid-open Patent Application No. 02-050333 discloses a method to read information as scanning the medium with the probe in higher density than the recording density upon reproduction without performing tracking and to reproduce the recorded information using the technology of pattern recognition.

Also, the bulletin of Japanese Laid-open Patent Application No. 04-364244 discloses a method to reproduce information using logical OR signals of plural scanning information strings as reproduction signals without performing the process of pattern recognition.

The recording/reproducing apparatus for performing recording/reproduction on a digital basis applying the SPM technology detects the bits formed in the recording medium upon reproduction of information by scanning the recording surface with the probe as kept in a proximate state and detecting signals reflecting states of the recording medium through the probe. On this occasion, the bit detection is carried out in some cases by comparing magnitudes of the detection signals with a magnitude of a threshold value preliminarily set. For example, in the case where there is a difference in conductivity between bit portions and non-bit portions, bit detection is carried out in such a manner that while the probe scans the recording surface as applying a constant voltage between the electroconductive probe and the recording medium, a bit is detected by comparing a magnitude of an electric current (a tunnel current, for example) flowing through the probe with the aforementioned threshold value.

Further, in order to realize high-speed reproduction of information by the recording/reproducing apparatus applying the SPM technology, the apparatus is frequently arranged to have a plurality of probes simultaneously performing the bit detection operation.

In this case, bit detection is effected by comparing intensities of signals (tunnel current signals, for example) reflecting states of the recording medium, which were detected through the individual probes, with the threshold value.

There were, however, the following problems with the above methods for reproducing information by the tracking control and the above bit detection methods for comparing the signals with the magnitude of the preset threshold value.

Namely, the methods for reproducing the information by tracking control sometimes had bit detection errors caused by three-dimensional, positional deviation between the probe and the recording medium due to irregularity of the size and shape of bits, discontinuous, positional deviation of bits, positional deviation of scan, and disturbance such as mechanical vibration.

Also, the method for reproducing the information using the pattern recognition from signals of plural scanning information strings or the method for reproducing the information using the logical OR signals as reproduction signals sometimes had bit detection errors caused by local defects of the recording medium in the bit detection area or sudden electric signal noise.

Further, the bit detection method for comparing the signals with the magnitude of the preset threshold value had such a problem that if spike noise having a signal intensity close to those of signals originating from the bits was mixed in a signal detected through the probe during reproduction of bits, the noise was sometimes recognized erroneously as a bit.

In order to avoid such an accident, it is possible to discriminate the noise from the bits by Fourier transformation of the signals detected through the probe, utilizing the fact that waveforms of signals corresponding to the bits are normally different from those of signals corresponding to the noise.

There are, however, many cases making plural probes simultaneously perform the bit detection operation in order to achieve high-speed reproduction upon reproduction of information. In this case, the Fourier transformation for discriminating the noise from the bits requires a lot of time, which raised the problem of making the total reproduction time longer.

In the case of the plural probes simultaneously performing the bit detection operation, based on the above bit detection method, the distances between the probe tips and the recording medium are assumed to be generally equal regardless of the probes. Based on this assumption, there is the following relation between intensities of signals detected through the individual probes during the bit detection operation and the preset threshold value.

> (intensities of signals detected at bit portions by probe)>(threshold value)>(intensities of signals detected at non-bit portions by probe) (a)

or

> (intensities of signals detected at bit portions by probe)<(threshold value)<(intensities of signals detected at non-bit portions by probe) (b)

This enables accurate bit detection.

The distances between the probe tips and the recording medium sometimes have great variation among the probes because of distortion or the like of structural bodies (cantilevers, for example) for supporting the individual probes.

The intensities of signals detected through the probes greatly change with small change in the distance between the probe tip and the recording medium. At this time, some probes out of the plural probes will have intensities of signals detected off the above relation of Eq. (a) but within the following relation:

> (intensities of signals detected at bit portions by probe)>(intensities of signals detected at non-bit portions by probe)>(threshold value) (c);

or will have intensities of signals detected off the above relation of Eq. (b) but within the following relation:

> (intensities of signals detected at bit portions by probe)<(intensities of signals detected at non-bit portions by probe)<(threshold value) (d).

In this case, signals detected at portions other than the bit portions through the probes will be erroneously recognized as bits.

In order to avoid such an event, the distance between the probe tip and the recording medium is sometimes controlled probe by probe.

Execution of the distance control for plural probes, however, involved the problems of increasing the reproduction time of information and increasing the consumption power of a driving mechanism for such distance control. There was another problem that the distances between the probe tips and the recording medium showed complex change during the distance control because of deformation of the probe support structure or the like caused by heat generation of the driving mechanism itself for the distance control.

SUMMARY OF THE INVENTION

An object of the present invention is thus to provide a recording/reproducing apparatus and recording/reproducing method, solving the above problems in the conventional techniques for performing recording/reproduction of information by the above tracking control, that has no bit detection error caused by the three-dimensional, positional deviation between the probe and the recording medium due to irregularity of the size and shape of bits, discontinuous, positional deviation of bits, positional deviation of scan, and disturbance such as mechanical vibration and that has no bit detection error caused by local defects of the recording medium in the bit detection area or sudden electric signal noise.

Another object of the present invention is to provide a recording/reproducing apparatus and recording/reproducing method of information applying the SPM technology, solving the above problems in the conventional technology for performing bit detection by comparing the signals with the threshold value, that can realize accurate bit recognition without complex signal processing even with mixture of noise in the reproduction signals detected through the probe during bit detection and that can realize accurate bit detection without performing the distance control between the probe tip and the recording medium during bit detection.

In order to accomplish the above objects, the present invention involves the recording/reproducing apparatus and recording/reproducing method arranged as follows.

Namely, the recording/reproducing apparatus or recording/reproducing method according to the present invention is a recording/reproducing apparatus or recording/reproducing method for running a probe relative to a recording bit string on a recording medium detect the recording bits, thereby performing recording/reproduction thereof, which comprises plural recording bit detecting means (or step) for letting the probe perform plural recording bit detections as changing its position relative to a same recording bit string on the recording medium, and recording bit determining means (or step) for performing determination of true recording bit, based on the results of the plural recording bit detections.

BRIEF DESCRIPTION OF THE DRAWINGS

FIG. 8 is a drawing to show a state of bit to become a first cause of bit detection error;

FIGS. 9A to 9K are drawings to show signal processing waveforms for the bit string of FIG. 8;

FIG. 10 is a drawing to show a state of bit to become a second cause of bit detection error;

FIGS. 11A to 11E are drawings to show signal processing waveforms for the bit string of FIG. 10;

FIGS. 13A to 13E are drawings to show signal processing waveforms for the bit string of FIG. 12;

FIGS. 15A to 15E are drawings to show signal processing waveforms for the bit string of FIG. 14;

FIGS. 21A to 21C are drawings to show signal processing waveforms when drive is carried out taking the hysteresis characteristics into consideration;

FIGS. 39A to 39F are drawings to show signal processing waveforms for the bit string of FIG. 37.

DETAILED DESCRIPTION OF THE PREFERRED EMBODIMENTS

Figure 1:
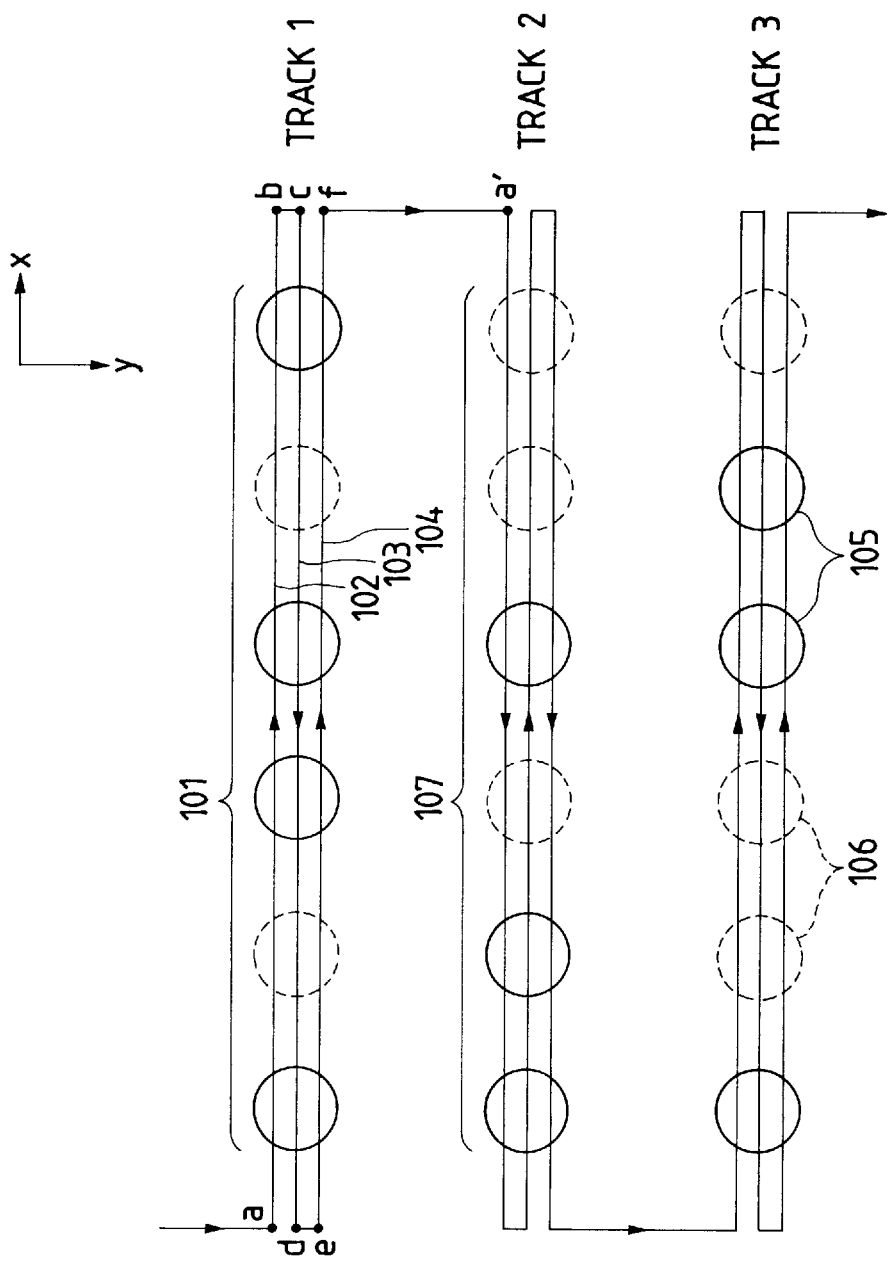
FIG. 1 is a drawing to illustrate Embodiment 1 of the recording/reproducing method of the present invention.

An embodiment of the present invention is of a form to perform a plurality of scans for a recording bit string, another embodiment is of a form to perform plural bit detection s on a recording bit in a single scan, and still another embodiment is of a form as a combination of the foregoing embodiments.

First explained is the form to perform plural scans for a first recording bit string. According to this form, a recording bit string is scanned several times with shifting the position of probe little by little and a bit is determined to be a true bit, for example, when the recording bit is detected two or more times in recording bit detection signals detected based on the plural scans, whereby the bit detection errors due to the following causes can be removed readily.

(1) Local defects or sudden electric signal noise in the bit detection area of the recording medium
(2) Irregularity of detected electric current values at bits
(3) Irregularity of the shape of bits
(4) xy-directional, positional deviation of bits
(5) xy-directional, positional deviation of scan
(6) Separation of the probe from the recording medium during contact scan because of the cause of mechanical vibration or the like.

If in the relative drive between the probe and the recording medium during the plural scans drive is carried out as taking account of the hysteresis characteristics concerning the actuator, it enables bit detection by forward and backward scans for a bit string without necessitating a complex waveform process, thereby enabling to increase the overall reproduction speed.

By a combination with a circumferential scanning method, inversion of scanning direction becomes unnecessary, so that high-speed recording/reproducing operation can be realized as simplifying the actuator drive and signal waveform process.

Further, in the case where a plurality of probes access respective bit strings on the recording medium, the bit detection method of the present invention permits bit detection without causing a bit detection error even if each probe has positional deviation relative to a corresponding bit string, and therefore, it is suitable for the recording/reproducing apparatus having plural probes.

Figure 2:
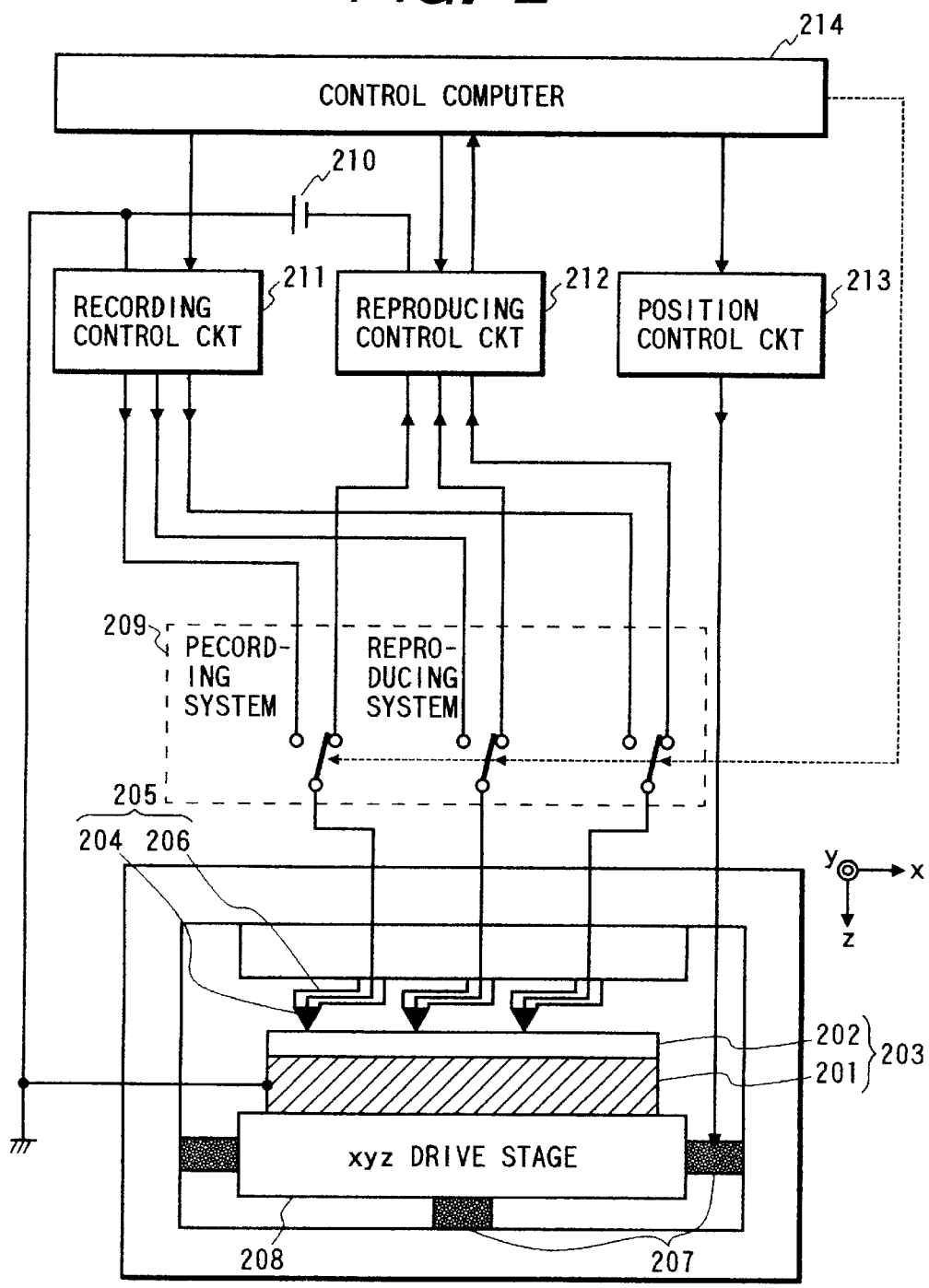
FIG. 2 is a drawing to illustrate the overall structure of the recording/reproducing apparatus to which the present invention is applied.

Next explained using FIG. 2 is the schematic structure of the recording/reproducing apparatus to which the present invention is applied. A plurality of probes 205 are positioned so that probe needles 204 provided at their tip contact a recording medium 203 comprised of a recording layer 202 on an electroconductive substrate 201.

In each probe 205, the probe needle 204 is supported by an elastic member 206 elastically deformable so as to be deflected.

Here, supposing the elastic constant of elastic deformation of the elastic member 206 is approximately 0.1 [N/m] and an elastic deformation amount is approximately 1 [$\mu$m], contact force of probe needle to the recording medium is approximately $10^{-7}$ [N] or so.

Receiving a position control signal from a position control circuit 213 controlled by a control computer 214, an xyz driving mechanism 207 drives an xyz stage 208 attached to the recording medium 203, whereby the probes 205 and recording medium 203 move relative to each other in the three-dimensional directions.

The xy-directional and z-directional positions of probes 205 are adjusted relative to the recording medium 203, whereby the probes 205 are positioned so that the tips of the probe needles 204 contact the recording medium 203 at desired positions and with desired contact force thereon.

While the probes 205 scan the recording medium 203 in the above recording/reproducing apparatus, the tips of probe needles 204 on the probes 205 are always kept in contact with the recording medium 203.

According to this contact scanning method, when scanning is carried out with the tips of probe needles 204 in contact with the recording medium 203, elastic deformation of the elastic members 206 absorb unevenness of the surface of the recording medium 203, if any, and thus, the contact force is kept almost constant between the tips of probe needles 204 and the surface of the recording medium 203, thereby avoiding destruction of the tips of probe needles 204 or the surface of recording medium 203.

Since this method eliminates the need for a means of piezo-element or the like for positioning each probe in the z-direction, the structure is simple, and it is suitable particularly for apparatus having plural probes.

Also, the method eliminates the need for feedback control of z-directional positions of individual probes 205 relative to the recording medium 203, and thus enables high-speed scan of the probes 205 relative to the recording medium 203.

A recording signal generated by a recording control circuit 211 controlled by the control computer 214 is applied from each probe 204 to the recording medium 203 through a changeover switch 209 changed over to a recording system.

In this way, local recording is carried out in portions of the recording layer 202 with which the tips of probe needles 204 are in contact.

The recording layer 201 in the above-described apparatus is made of a material that changes its electric current flowing therein upon application of voltage.

A first specific example of the material is an LB is film (i.e., a built-up film of organic mono molecular layers prepared by the Languor-Blodgett technique) having the electric memory effect, such as polyimide or SOAZ (bis-n-octyl squarilium azulene), as disclosed in the bulletin of Japanese Laid-open Patent Application No. 63-161552 or the bulletin of Japanese Laid-open Patent Application No. 63-161553.

When a voltage over the threshold (approximately 5 to 10 [V]) is applied between the probe needle-the LB film-the substrate, the material changes the conductivity of the inbetween LB film (from the off state to the on state) and increases the electric current flowing therein upon application of a bias voltage (approximately 0.01 to 2 [V]) for reproduction.

A second specific example is an amorphous thin-film material such as GeTe, GaSb, or SnTe.

When a voltage applied between the probe needle—the amorphous thin-film material—the substrate, this material shows phase transition from amorphous to crystalline because of heat generated by the electric current flowing therein upon application of the voltage.

This changes the conductivity of the material, which increases the electric current flowing therein upon application of the bias voltage for reproduction.

A third specific example is an oxidizable metal or semiconductor material such as Zn, W, Si, or GaAs.

When a voltage is applied between the probe needle—the oxidizable metal or semiconductor material, the electric current flowing therein causes this material to react with water adsorbing to the surface of material or with oxygen in the air, forming an oxide film on the surface.

This changes the contact resistance of the surface of material, thereby decreasing the electric current flowing therein upon application of the bias voltage.

Now, reproduction of the bits recorded as described above is carried out as follows.

After the switch 209 changes its signal wiring from each probe 205 to a reproducing system, a bias voltage applying means 210 applies the bias voltage between each probe tip 204 and the substrate 201 and the reproduction control circuit 212 detects an electric current flowing between them. More (or less) electric currents flow at portions of recording bits than at portions without record on the recording medium 203, and thus, the reproduction control circuit 212 detects a difference in the electric current to make a reproduction signal and to output it to the control computer 214.

Next explained is the second form to perform plural bit detections on a recording bit in a single scan. According to the second form, as described above, time series signals In (time series signal intensities at times corresponding to clock signals t=tn) are obtained by digitizing signals reflecting states of the recording medium, having detected through the probe, based on the clock signals t=tn (n=1, 2, . . . , n, . . . ; t=t1 corresponds to the start time of bit detection operation), and the time series signals In are subject to desired signal processing, whereby accurate bit recognition can be realized without performing complex signal processing even if noise is mixed in the reproduction signals detected through the probe during bit detection and whereby accurate bit detection can be realized without performing the distance control between the probe tip and the recording medium during bit detection.

Next explained referring to FIGS. 28A to 28E is a specific method of the above signal processing in this form.

Figure 28A:
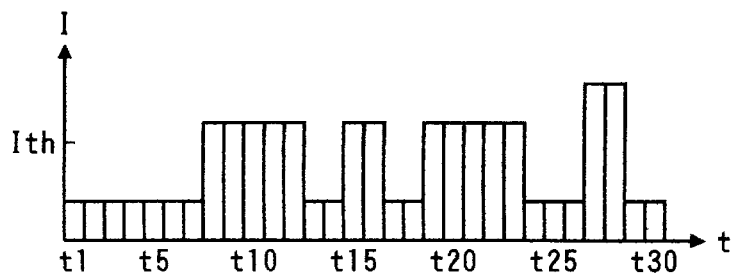
FIGS. 28A to 28E are conceptual drawings of signal processing according to the present invention.

FIG. 28A is a conceptual drawing of time series signals obtained by digitizing the signals reflecting states of the recording medium detected through the probe upon bit detection, based on the clock signals. The abscissa t=tn (n=1, 2, . . . , n, . . . ) represents the clock signals. The time of start of the bit detection operation is defined as t=t1. The ordinate I represents signal intensity. In the following description, In denotes intensities of the time series signals at the times corresponding to the clock signals t=tn.

In FIG. 28A, peaks in $t8 \leq t \leq t12$ and $t19 \leq t \leq t23$ respectively indicate bit-originating signals (signals originating from bits). On the other hand, peaks in $t15 \leq t \leq t16$ and $t27 \leq t \leq t28$ respectively indicate noise-originating signals (signals originating from noise). The probe scans a region on a bit-less portion of the recording surface at least in the zone corresponding to the period of from t=t1 to t=tm (m>1). The following description assumes m=5.

The clock signals tn according to the present invention are characterized by being formed at timings to allow sampling of k (2<k) data while the probe moves the distance corresponding to the mean maximum size of each bit in the bit string. The following description assumes k=5.

Next calculated is the mean value of signal intensities I, as defined below, in the zone corresponding to the aforementioned period of the clock signals of from t=t1 to t=t5.

$$(I1+I2+ \ldots +I5)/(t5-t1)=M \qquad (1)$$

Figure 28B:
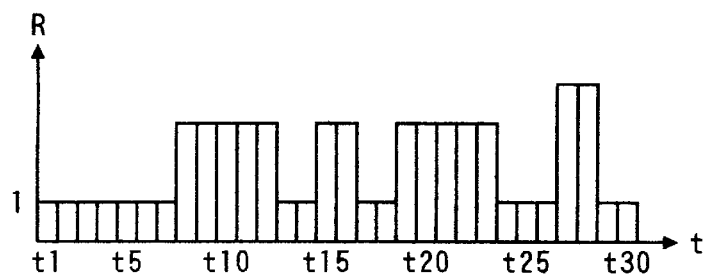

The aforementioned digital time series signals In (see FIG. 28A) are multiplied by the reciprocal 1/M of the average M of signal intensities defined by above Eq. (1). The result of multiplication is shown in FIG. 28B.

The abscissa t=tn (n=1, 2, ..., n, ...) indicates the clock signals. The ordinate R indicates the intensities of the signals formed by multiplying the time series signals I shown in FIG. 28A by 1/M described above. In the following description, Rn (n=1, 2, ..., n, ...) denotes the intensities of signals R at the times corresponding to the clock signals t=tn.

Next, a binarizing process to compare the above signals Rn (see FIG. 28B) with a threshold value is carried out to convert the signals Rn to binary signals comprised of 0 and 1.

In the present invention, the threshold value is set according to the following two rules.

<Rule 1>

For intensities of signals detected by probes upon bit detection, if there is the relation defined as intensities of signals detected at bit portions>intensities of signals detected at non-bit-forming portions, the threshold value is determined as follows.

A ratio Ib/Inb is obtained for each probe between a signal intensity Inb (which is highly likely to be equal to or nearly equal to aforementioned M) detected by each probe upon the bit detection operation carried out while the all probes involved in bit formation and bit detection are fixed relative to respective bit-less regions of the recording surface in the recording/reproducing apparatus and a signal intensity Ib detected by each probe upon the bit detection operation carried out after execution of the bit forming operation while each probe is kept fixed relative to the aforementioned region, and, with the minimum value Hmin among the above ratios for the respective probes, a value calculated by (a×Hmin) (where 0.5<a<0.9; a=0.8, for example) is used as the threshold value.

<Rule 2>

For intensities of signals detected by probes upon bit detection, if there is the relation defined as intensities of signals detected at bit portions<intensities of signals detected at non-bit-forming portions, the threshold value is determined as follows.

A ratio Ib/Inb is obtained for each probe between a signal intensity Inb (which is highly likely to be equal to or nearly equal to aforementioned M) detected by each probe upon the bit detection operation carried out while the all probes involved in bit formation and bit detection are kept fixed relative to respective bit-less regions of the recording surface in the recording/reproducing apparatus and a signal intensity Ib detected by each probe upon the bit detection operation carried out after execution of the bit forming operation while each probe is kept fixed relative to the aforementioned region, and, with the maximum value Hmax among the above ratios for the respective probes, a value calculated by {(1−Hmax)×b+Hmax} (where 0.1<b<0.5; b=0.2, for example) is used as the threshold value.

In the description of the present invention using FIGS. 28A to 28E, the threshold value is set by rule 1 with a=0.8. In this case, the threshold value=3.

Next described are rules for the conversion to binary signals.

If signals detected by the probes are such that intensities of signals at bit portions are relatively greater than intensities of signals detected at non-bit-forming portions, among the above digital signals Rn intensities of signals greater than the threshold value (=3) are converted to 1 and intensities of signals smaller than the threshold value (=3) to 0.

Contrary to this, if the signals detected by the probes are such that intensities of signals at bit portions are relatively smaller than those detected at non-bit-forming portions, among the aforementioned digital signals Rn intensities of signals smaller than the threshold value (=3) are converted to 1 and intensities of signals greater than the threshold value (=3) to 0.

Figure 28C:
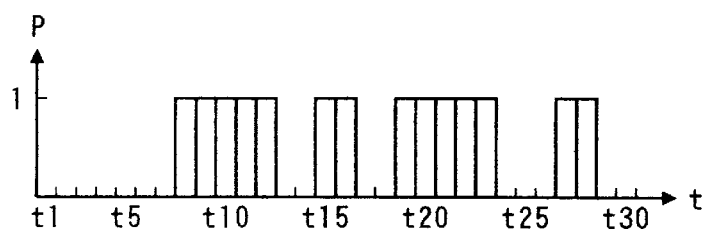

According to the above rules, the time series signals Rn shown in FIG. 28B are converted to binary signals. The result of the binarizing process is shown in FIG. 28C. The abscissa t=tn (n=1, 2, ..., n, ...) indicates the clock signals.

The ordinate P indicates the signal intensities obtained by the binarizing process according to the above rules. In the following description, Pn (n=1, 2, ..., n, ...) denotes intensities of signals P at times corresponding to the clock signals t=tn.

In the present invention, a distribution of signals with signal intensity being 1 is measured in the time series signals Pn comprised of the above binary signals.

Then, signals in a zone where the distribution of signals with signal intensity of 1 satisfies a predetermined condition are regarded as bit detection signals resulting from a bit.

The process for measuring the above signal distribution is described below.

First, in the time series signals Pn comprised of the binary signals, signals indicated by below Eq. (2) are calculated for all n.

$$Pn+Pn-1+ \ldots +Pn-k+1=Qn \qquad (2)$$

For example, Q10 of the signals shown in FIG. 28C for the clock signal t10 is given as follows.

$$\begin{aligned} Q10 &= P10 + P9 + P8 + P7 + P6 \\ &= 1 + 1 + 1 + 0 + 0 \\ &= 3 \end{aligned}$$

Figure 28D:
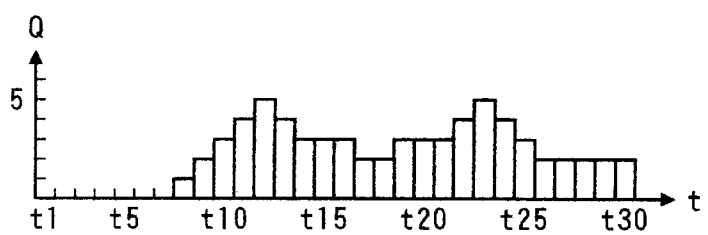

The calculation result of the signals Qn concerning the binary signals shown in FIG. 28C is shown in FIG. 28D.

In the present invention, signals originating from bits are extracted from the above time series signals Qn. For that, in the present invention, the magnitudes of the signals Qn are compared with the magnitude of pk (p is a coefficient), and then signals Yn are determined according to the following rules.

$$Yn=1 \text{ if } Qn \geq p \times k \qquad (a)$$

Yn=0 if the magnitude of Qn is outside the range of Eq. (a)  (b)

Among signals Yn newly formed based on the rules indicated by above Eq. (a) and Eq. (b), signals with signal intensity being 1 are determined to be bit detection signals.

Next explained is the magnitude of the above coefficient p.

(1) The range of p when variation in bit size is taken into account.

If there is no variation in bit size, with p=1, signals of Qn=k can be determined as signals originating from bits.

However, the bit sizes have variation actually. For example, the magnitude of the signal Qn corresponding to a bit smaller than the average bit size becomes smaller than k. Therefore, in the case of p=1, accurate bit recognition cannot be achieved. Thus, p<1 is necessary. However, values of p having no great difference from 1 are excluded.

In the present invention, if a signal has the magnitude of Qn being 0.5 k or less, the signal is determined as spike noise. Accordingly, an appropriate range of the coefficient p in this case is as follows.

$$0.5 < p < 0.95 \qquad (c)$$

(2) The range of p when the noise (especially, the spike noise) is taken into account As for the characteristics of the spike noise considered herein, the signal intensity thereof is close to those of signals originating from bits detected at the bit portions by the probes and the polarity is opposite to that of the signals originating from the bits detected at the bit portions by the probes.

If such noise is superimposed on a signal originating from a bit, the magnitude of the signal Qn becomes smaller than k. Therefore, smaller p is more advantageous in order to extract signals originating from bits out of the above signals Qn. Here, $p \neq 0$.

Therefore, the range of the coefficient p in this case is given as follows.

$$0 < p \tag{d}$$

Since the range of the coefficient p in above Eq. (a) according to the present Invention needs to satisfy both Eq. (c) and Eq. (d) described above, as explained in (1) and (2) above, the range is as follows.

$$0.5 < p < 0.95 \tag{e}$$

Appropriate values of p are next explained referring to FIGS. 35A to 35F and FIGS. 36A to 36F.

Greater values of k can decrease the possibility of erroneously recognizing the spike noise as a bit.

Too large values, however, necessitate a lot of time for data processing.

It is thus necessary to set the magnitude of k to an appropriate value.

<1> In the case of k=4 (see FIGS. 35A to 35F)

Three characteristic cases will be explained.

(Case a)

Figure 35A:
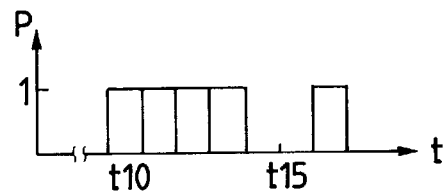
FIGS. 35A to 35F are drawings to show some patterns of signals Pn.

FIG. 35A shows a certain pattern of the signals Pn.

Figure 35B:
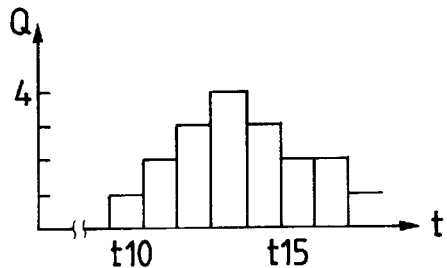

The signals in $t10 \leq t \leq t13$ are bit-originating signals. The signal at t=t16 is a noise-originating signal. The signals Qn concerning the signals shown in FIG. 35A are shown in FIG. 35B.

(Case b)

Figure 35C:
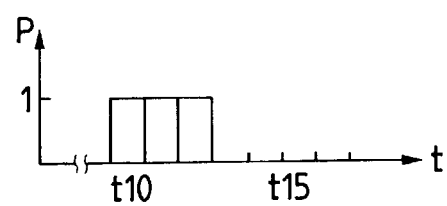

FIG. 35C shows a certain pattern of the signals Pn.

The signals in $t10 \leq t \leq t12$ are bit-originating signals. The reason why the signals continue during only three clock signals is that the noise described in above (2) works.

Figure 35D:
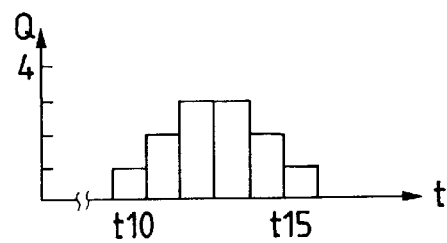

The signals Qn concerning the signals shown in this FIG. 35C are shown in FIG. 35D.

(Case c)

Figure 35E:
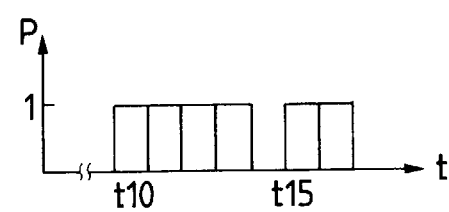

FIG. 35E shows a certain pattern of the signals Pn.

The signals In $t10 \leq t \leq t13$ are bit-originating signals. The signals in $t15 \leq t \leq t16$ are noise-originating signals.

Figure 35F:
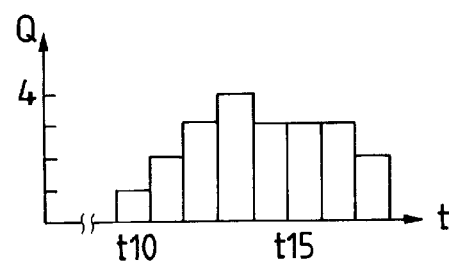

The signals Qn concerning these signals shown in FIG. 35E are shown in FIG. 35F.

In the cases of above (case a) to (case c), $pk \geq 3$ is necessary in order to extract a signal originating from a bit out of the signals Qn.

Namely, $p \geq 3/4 = 0.75$.

As explained above, in the case of k=4, if p=0.8 the bits can be extracted considerably accurately <2> In the case of k=5 (see FIGS. 36A to 36F)

Three characteristic cases will be explained.

(Case d)

Figure 36A:
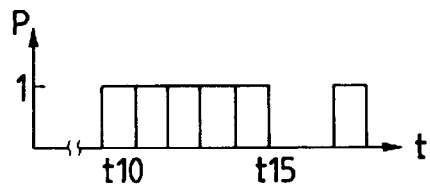
FIGS. 36A to 36F are drawings to show some patterns of signals Pn.
Figure 36B:
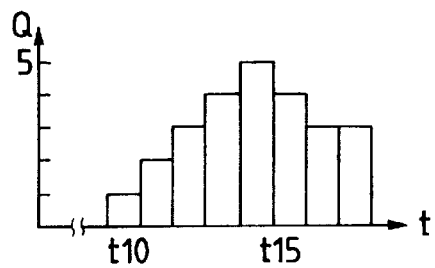

FIG. 36A shows a certain pattern of the signals Pn. The signals in $t10 \leq t \leq t14$ are bit-originating signals. The signal at t=t17 is a noise-originating signal. The signals Qn concerning these signals shown in FIG. 36A are shown in FIG. 36B.

(Case e)

Figure 36C:
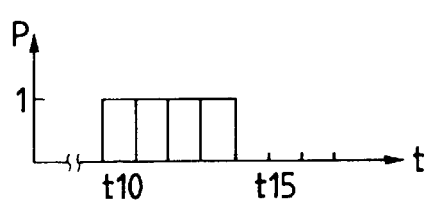
Figure 36D:
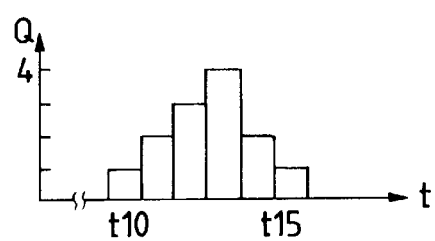

FIG. 36C shows a certain pattern of the signals Pn. The signals in $t10 \leq t \leq t13$ are bit-originating signals. The reason why the signals continue during only four clock signals is that the noise described in above (2) works. The signals Qn concerning these signals shown in FIG. 36C are shown in FIG. 36D.

(Case f)

Figure 36E:
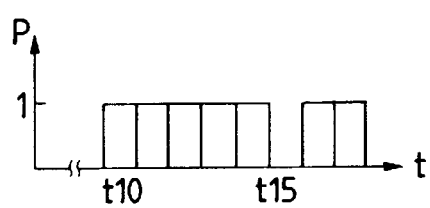
Figure 36F:
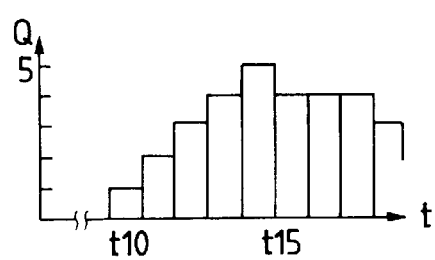

FIG. 36E shows a certain pattern of the signals Pn. The signals in $t10 \leq t \leq t14$ are bit-originating signals. The signals in $t16 \leq t \leq t17$ are noise-originating signals. The signals Qn concerning these signals shown in FIG. 36E are shown in FIG. 36F.

In above (case d) to (case f), $pk \geq 4$ is necessary in order to extract a bit-originating signal out of the signals Qn. Namely, $p \geq 4/5 = 0.8$.

As explained above, in the case of k=5, if p=0.8 the bits can be extracted considerably accurately.

From the description heretofore concerning above Eq. (a) and Eq. (b), in the present invention, the above time series signals Qn are converted to new signals Yn, according to the rules represented by below Eqs. (3) and (4).

$$Yn=1 \text{ if } Qn \geq p \times k \ (0.5 < p < 0.95) \tag{3}$$

$$Yn=0 \text{ if the magnitude of } Qn \text{ is outside the range of Eq. (3)} \tag{4}$$

Further, in the present invention, signals with signal intensity being 1 are determined to be bit detection signals among the signals Yn newly formed based on the rules indicated by above Eq. (3) and Eq. (4).

As described previously, setting p=0.8 herein, the signals shown in FIG. 28D are converted according to the above rules of Eq. (3) and Eq. (4).

Figure 28E:
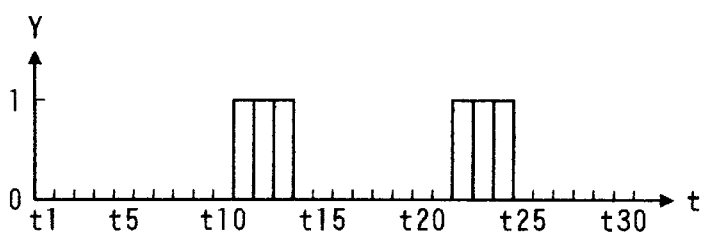

The result is shown in FIG. 28E.

As apparent from comparison of FIG. 28A with FIG. 28E, the signal processing according to the present invention can remove the noise measured in $t15 \leq t \leq t16$ and $t27 \leq t \leq t28$ in FIG. 28A, and can extract only the bit detection signals measured in $t8 \leq t \leq t12$ and $t19 \leq t \leq t23$.

The above signal processing according to the present invention is applied to the individual probes for performing the bit detection in the recording/reproducing apparatus.

In that case, even if the distance between the probe tip and the recording medium differs probe by probe, the bit detection can be performed without controlling the distances between the probes and the recording medium for the individual probes.

The reason is explained in the following.

Let us note a probe (hereinafter referred to as probe b) different from the probe (hereinafter referred to as probe a) having detected the data of FIG. 28A described previously.

The distance between the tip of probe b and the recording surface is assumed to be greater than that of the probe a. The signal processing according to the present invention as described previously referring to FIGS. 28A to 2SE is also applied to signal processing for signals reflecting states of the recording medium, detected through the probe b.

Figure 29A:
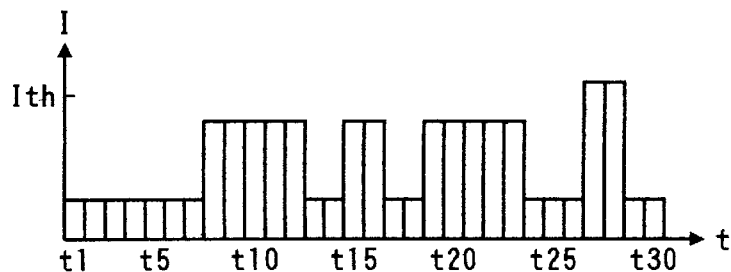
FIGS. 29A to 29E are conceptual drawings of signal processing according to the present invention.

FIG. 29A is a conceptual drawing to show signals obtained by digitizing the time series signals reflecting the states of the recording medium, detected through the probe b.

The abscissa t=tn (n=1, 2, ..., n, ...) indicates the clock signals. The time of start of the bit detection operation is defined as t=t1. The ordinate I indicates signal intensity. In the following description, in denotes the intensities of the time series signals at times corresponding to the clock signals t=tn.

In FIG. 29A, peaks in t8≦t≦t12 and t19≦t≦t23 respectively represent signals originating from bits. On the other hand, peaks in t15≦t≦t16 and in t27≦t≦t28 respectively represent signals originating from noise. The probe scans a region on a bit-less portion of the recording surface at least in the zone corresponding to the period of from t=t1 to t=tm (m≦1).

In the following description m=5 is assumed. Further, the clock signals tn are formed at timings capable of sampling k (221 k) data while the probe moves the distance corresponding to the mean maximum size of each bit in the bit string, and the following description assumes k=5.

In the following description, signal intensities detected at bit portions by the probe b are assumed to be smaller than the signal intensity Ith shown in FIG. 28A.

Unless noise is mixed in signals detected through the probe a, accurate bit extraction is possible by setting Ith shown in FIG. 28A as a threshold value.

However, accurate bit extraction is not possible by using this Ith as a threshold value for signals detected through the probe b.

Next, for the signals shown in FIG. 29A, the mean value of signal intensities I in the zone corresponding to the range of clock signals of from t=t1 to t=t5 is calculated as follows.

$$(I1+I2+ \ldots +I5)/(t5-t1)=M \qquad (5)$$

Figure 29B:
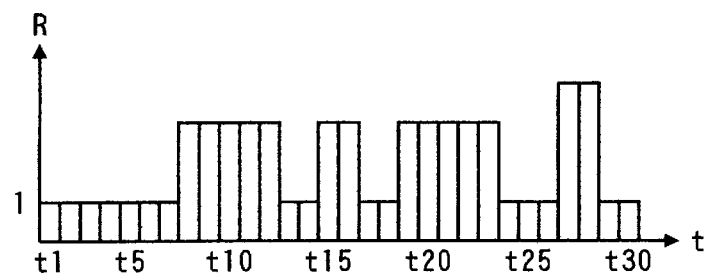

The aforementioned digital time series signals In (see FIG. 29A) are multiplied by the reciprocal 1/M of the mean value M of signal intensities represented by above Eq. (5). The result is shown in FIG. 29B.

The abscissa t=tn (n=1, 2, ..., n, ...) indicates the clock signals. The ordinate R indicates intensities of signals formed by multiplying the time series signals I shown in FIG. 29A by above 1/M. In the following description, the intensities of signals R at times corresponding to the clock signals t=tn will be denoted by Rn (n=1, 2, ..., n, ...).

Next, by the binarizing process to compare the above signals Rn (see FIG. 29B) with a threshold value, the above signals Rn are converted to binary signals comprised of 0 and 1.

The threshold value in the description of the present invention using FIGS. 29A to 29E is determined as threshold value=3, similarly as in the case described using FIGS. 28A to 28E.

The rules for the conversion to binary signals are as follows. As explained previously, if the signals detected by the probe are such that the signal intensities at the bit portions are relatively greater than those detected at the non-bit-forming portions, among the digital signals Rn intensities of signals greater than the above threshold value (=3) are converted to 1 while intensities of signals smaller than the above threshold value (=3) to 0.

Contrary to this, if the signals detected by the probe are such that the signal intensities at the bit portions are relatively smaller than those detected at the non-bit-forming portions, among the digital signals Rn intensities of signals smaller than the threshold value (=3) are converted to 1 while intensities of signals greater than the threshold value (=3) to 0.

Figure 29C:
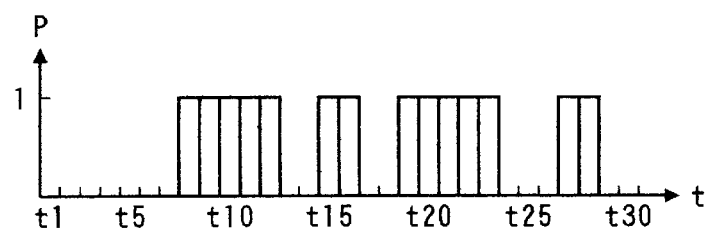

According to the above rules, the time series signals Rn shown in FIG. 29B are converted to binary signals. The result of the binarizing process is shown in FIG. 29C.

The abscissa t=tn (n=1, 2, ..., n, ...) indicates the clock signals. The ordinate P indicates the signal intensities binarized according to the above rules.

In the following description, the intensities of signals P at times corresponding to the clock signals t=tn will be denoted by Pn (n=1, 2, ..., n, ...).

In the present invention, a distribution of signals with signal intensity being 1 is measured in the time series signals Pn comprised of the above binary signals. Then, signals in a zone where the signal distribution with signal intensity 1 satisfies a predetermined condition are determined to be bit detection signals resulting from a bit.

The process for measuring the above signal distribution is described in the following.

First, with the time series signals Pn comprised of the binary signals, signals indicated by below Eq. (2) are calculated for all n.

$$Pn+Pn-1+ \ldots +Pn-k+1=Qn \qquad (2)$$

For example, Q10 of the signals shown in FIG. 29C as to the clock signal t=t10 is given as follows.

$$\begin{aligned} Q10 &= P10+P9+P8+\ldots+P6 \\ &= 1+1+1+0+0 \\ &= 3 \end{aligned}$$

Figure 29D:
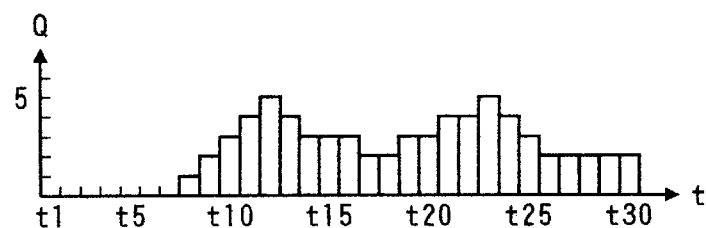

The calculation result of the signals Qn concerning the binary signals shown in FIG. 29C is shown in FIG. 29D.

In the present invention, the above time series signals Qn are further converted to new signals Yn according to the rules indicated by below Eqs. (3) and (4).

$$Yn=1 \text{ if } Qn \geq p \times k \ (0.5<p<0.95) \qquad (3)$$

$$Yn=0 \text{ if the magnitude of } Qn \text{ is outside the range of Eq. (3)} \qquad (4)$$

Here, p=0.9 is assumed.

Figure 29E:
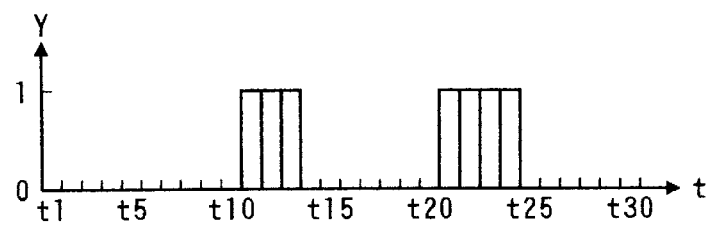

Then the signals shown in FIG. 29D are converted according to the rules of Eq. (3) and Eq. (4). The result is shown in FIG. 29E.

In the present invention, among the signals Yn newly formed based on the rules indicated by above Eq. (3) and Eq. (4), signals with signal intensity being 1 are determined to be bit detection signals.

The greater the value of p, the higher the bit detection accuracy.

In the present invention the value of p is preferably 0.8 or more.

As apparent from comparison of FIG. 29A with FIG. 29E, by performing the signal processing according to the present invention, only the signals originating from bits can be extracted without performing the distance control for the individual probes and without setting a threshold value for each probe even if the individual probes in the recording/reproducing apparatus have variation in the distance between the probe tip and the recording medium. The noise mixed in the signals detected by the probes is removed, so that only the signals originating from the bits can be extracted.

As explained above, the present invention permits only the bits to be detected correctly without performing complex signal processing for removing the noise even if the noise is mixed in the signals detected by the probes during bit detection.

Even if the individual probes in the recording/reproducing apparatus have variation in the distance between the probe tip and the recording medium, only the bits can be detected correctly without performing the distance control for the individual probes and without setting a threshold value for each probe. The signals processed by the signal processing means according to the present invention may be any signals reflecting a distribution of magnitudes of interaction between the probe and the recording medium in the recording surface. Specific examples of the interaction include the tunnel current, interatomic force, magnetic force, evanescent light, and so on.

The values of above k and p are not limited to the above values. In addition, there is no specific limitation on the recording medium.

The present invention adopts the bit detection method as described in the following description of the embodiments during reproduction of recording bits in the apparatus as described above.

The embodiments of the present invention will be described.

[Embodiment 1]

Described in detail in the following is Embodiment 1 in which the apparatus as described above is arranged to apply the bit detection method of the present invention to the scanning method in combination of x-scan with y-scan.

As shown in FIG. 1, plural (three or more) scans shifted little by little one from another in the y-direction are carried out for a bit string 101 aligned in the x-direction on a certain track 1 to detect recording bits (ON bits 105 indicated by solid lines in the drawing). (Portions indicated by dotted lines in the drawing indicate OFF bits 106 without record.)

The present embodiment shows an example of performing three scans, first scan 102 (from a to b), second scan 103 (from c to d), and third scan 104 (from e to f) as shown in the drawing.

Here, the scanning direction of the second scan 103 is opposite to that of the first scan 102 and the third scan 104.

The scanning positions are shifted from each other by approximately a fraction of the diameter of recording bits in the y-direction (see the portions of from b to c and from d to e).

After three scans are carried out in the x-direction for a bit string, the probe is shifted to the next track in the y-direction (from f to a') to scan a bit string 107 in track 2.

This step is repeated to perform scanning of all bit strings.

Figure 3:
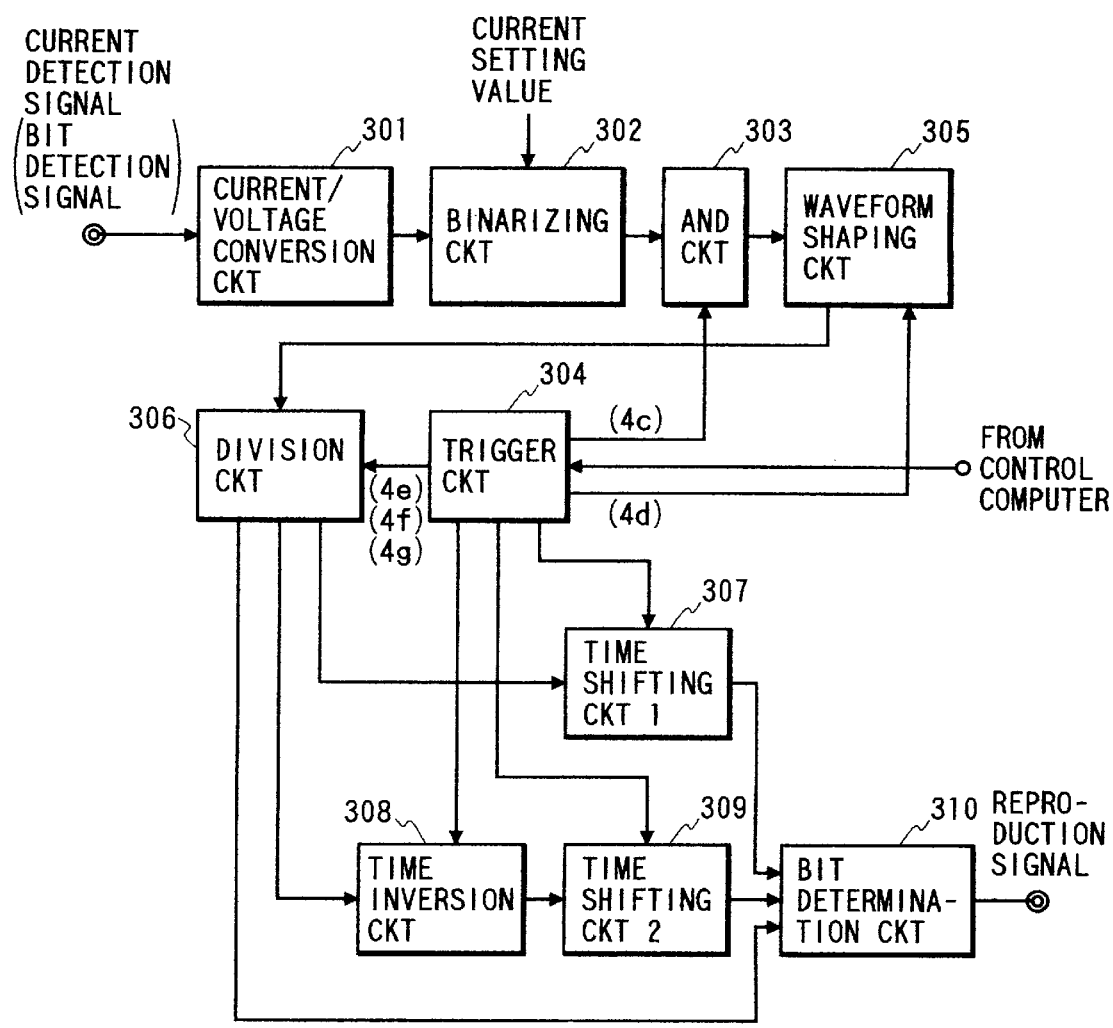
FIG. 3 is a block diagram of a reproduction control circuit for performing a bit detection signal process in the present invention.

Next explained with FIG. 3 is the reproduction control circuit for performing bit detection by plural scans. The block diagram shown in FIG. 3 shows the details of the reproduction control circuit 212 shown in FIG. 2.

In FIG. 3, an electric current detection signal (bit detection signal) input is converted into a voltage signal in a current/voltage converting circuit 301, and thereafter the voltage signal is binarized with respect to the reference of a voltage value corresponding to a predetermined electric current setting value in a binarizing circuit 302.

Next, an AND circuit 303 takes AND between the binary signal and a bit detection synchronizing signal (4c) output from a trigger circuit 304 and synchronized with a timing to carry out bit detection.

This AND signal is supplied to a waveform shaping circuit 305 to perform waveform shaping using a waveform shaping synchronizing signal (4d) output from the trigger circuit 304.

A signal after waveform shaping is supplied to a dividing circuit 306, which divides it into three, based on first, second, and third scan synchronizing signals (4e), (4f), (4g) output from the trigger circuit 304.

The first divisional signal is supplied to a time shifting circuit 1 (307) comprised of a shift register etc., which shifts the signal waveform in a direction to cause a delay of predetermined time $\Delta t1$ and thereafter supplies the resultant to a bit determining circuit 310.

The second divisional signal is supplied to a time inverting circuit 308, which temporally inverts the signal waveform and thereafter supplies the resultant to a time shifting circuit 2. The time shifting circuit 2 shifts the signal waveform in a direction to cause a delay of predetermined time $\Delta t2$ from the initial state and thereafter supplies the resultant to the bit determining circuit 310.

The third divisional signal is supplied to the bit determining circuit 310 as it is.

The bit determining circuit 310 performs determination and detection of a true bit from the three input signals and outputs it as a reproduction signal.

Each of the circuits will be described in detail.

The signals generated by the trigger circuit will be explained referring to FIGS. 4A to 4G.

FIGS. 4A to 4G are drawings to show the relationship of waveform between the x- and y-directional scan signals (4a), (4b) of the probe relative to the recording medium and the bit detection synchronizing signal (4c), waveform shaping synchronizing signal (4d), first scan synchronizing signal (4e), second scan synchronizing signal (4f), or third scan synchronizing signal (4g) made by the trigger circuit.

Three scans are carried out for a certain bit string in the x-direction with fine shift in the y-direction, based on the x-scan signal (4a) and y-scan signal (4b), and thereafter the track is changed to the next bit string, followed by scans of the next bit string.

The bit synchronizing signal (4c) includes signals synchronized with timings to perform the bit detection in each scan.

Figure 4:
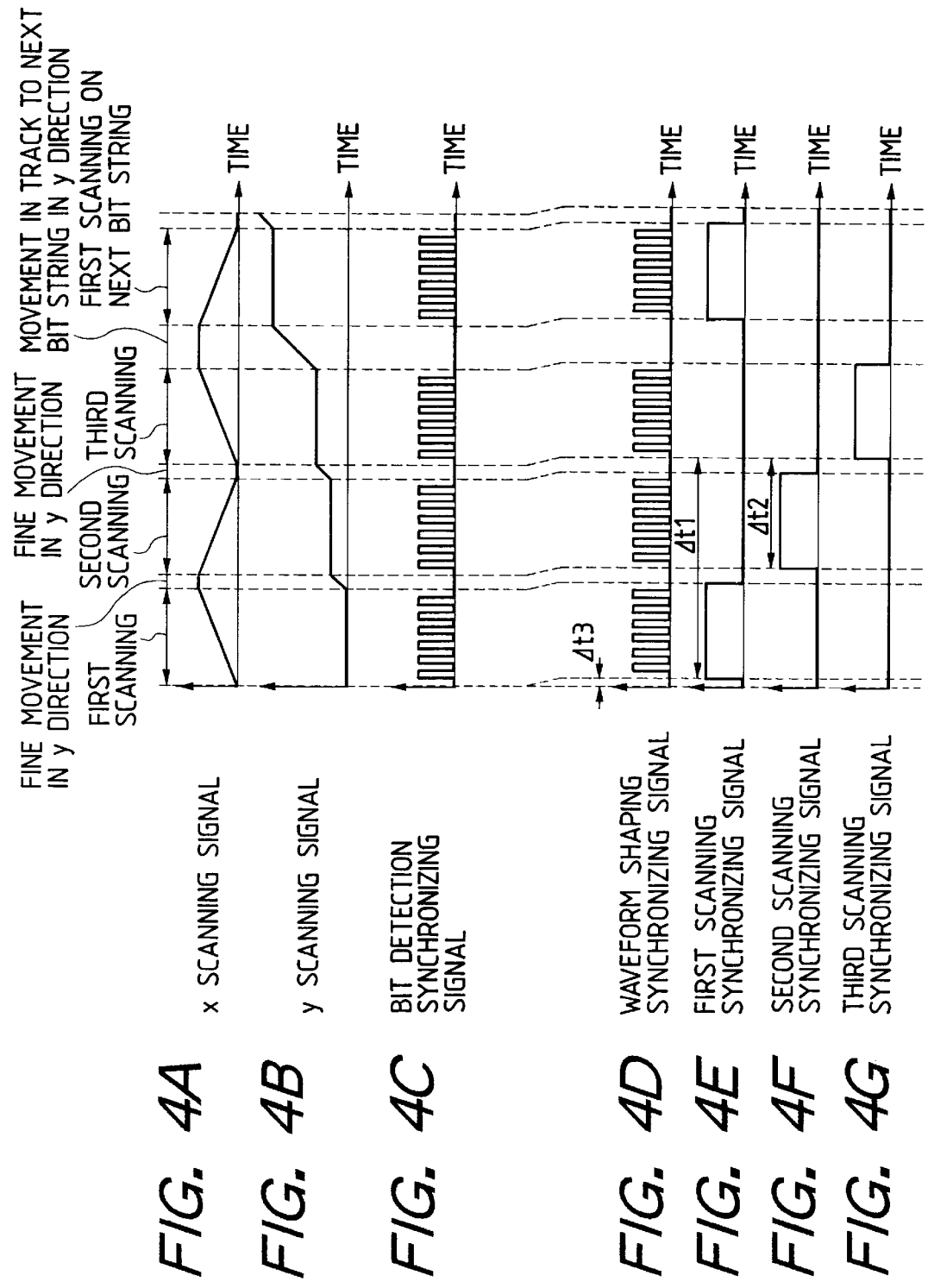
FIGS. 4A to 4G are drawings to illustrate the relationship among signal waveforms at a trigger circuit.
Figure 5:
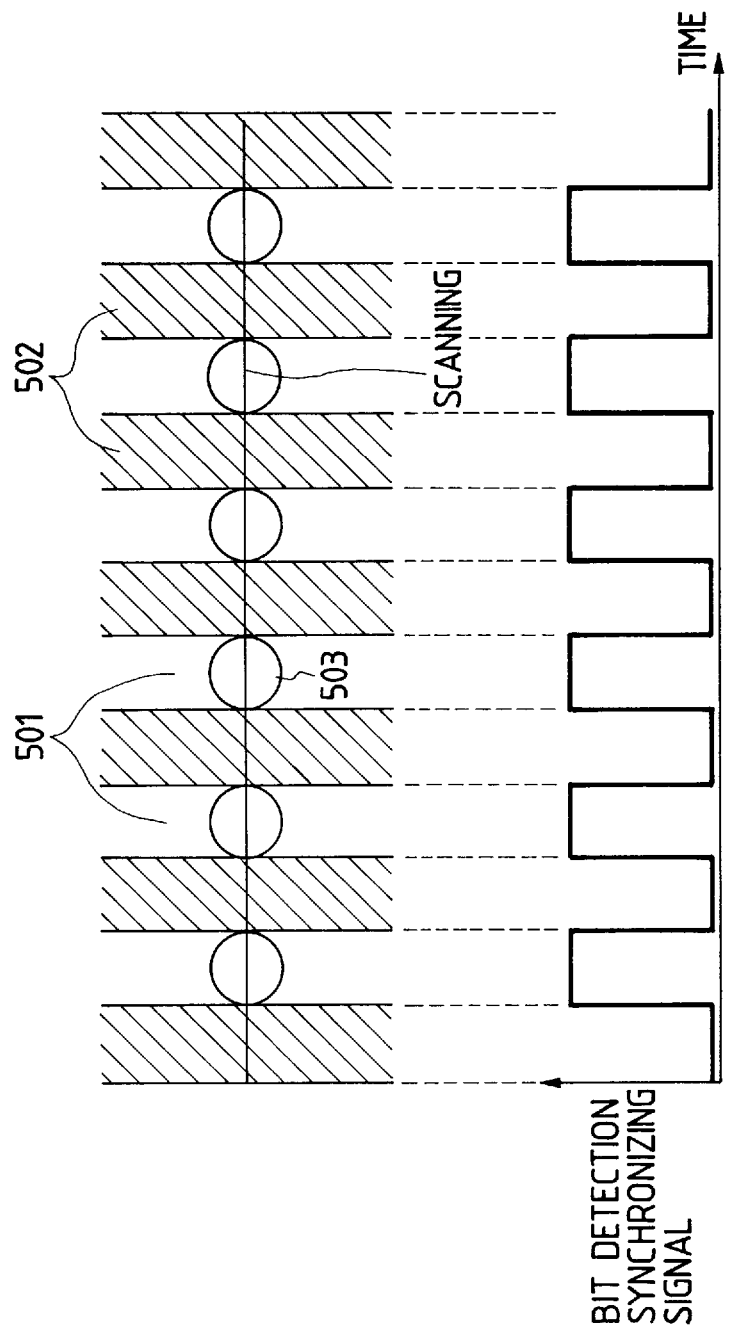
FIG. 5 is a drawing to show the details of a bit synchronizing signal.

The details of this signal are shown in FIG. 5. The scan area is separated into two types, bit detection areas 501 and non-detection areas 502, and for detecting a signal only at a timing to detect a bit 503, a bit detection synchronizing signal synchronized with this timing is produced. This bit detection signal is produced from a signal synchronized with the x-scan signal (4a). Since the waveform synchronizing is signal (4d) is used in performing waveform shaping of the AND signal between the binary signal and the bit detection synchronizing signal, it has the same waveform as the bit detection synchronizing signal (4c) as shown in FIG. 4D, but it is temporally shifted a little, by $\Delta t3$. The first, second, and third scan synchronizing signals (4e), (4f), (4g) are signals synchronized with respective scans, and the time delays of the third scan synchronizing signal (4g) relative to the first and second scan synchronizing signals (4e), (4f) are aforementioned $\Delta t1$ and $\Delta t2$, respectively.

Figure 6:
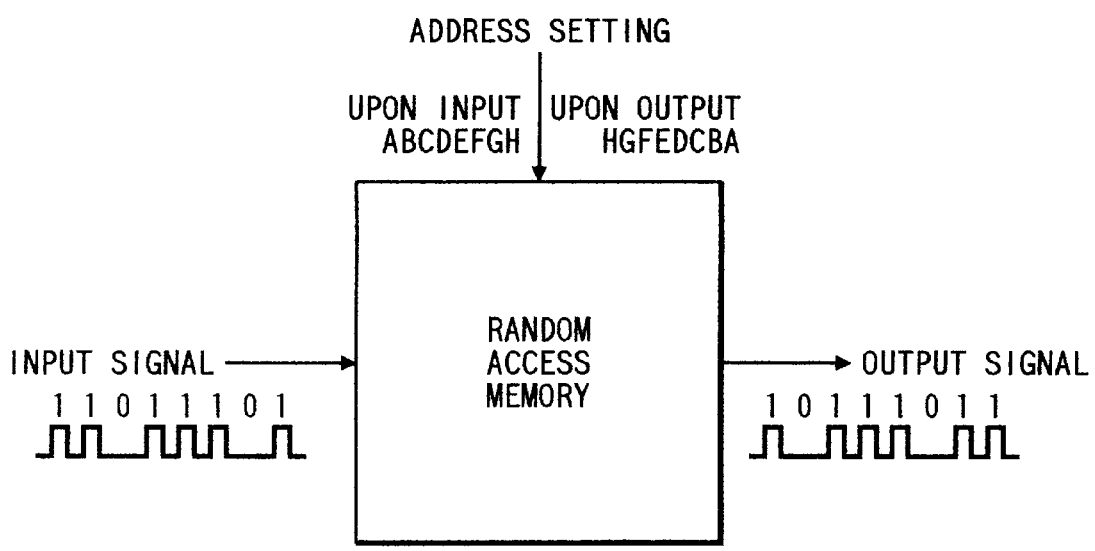
FIG. 6 is a drawing to show an example of a time inverting circuit.

FIG. 6 shows an example of the time inverting circuit.

In this example, the time inverting circuit is comprised of a random access memory.

For example, input data of 11011101 is stored in the random access memory as being given the addresses ABCDEFGH as shifted in order.

The addresses are inverted when output, so that the stored data is read out in the order of HGFEDCBA.

This obtains the output 10111011 temporally inverted from the input.

Figure 7:
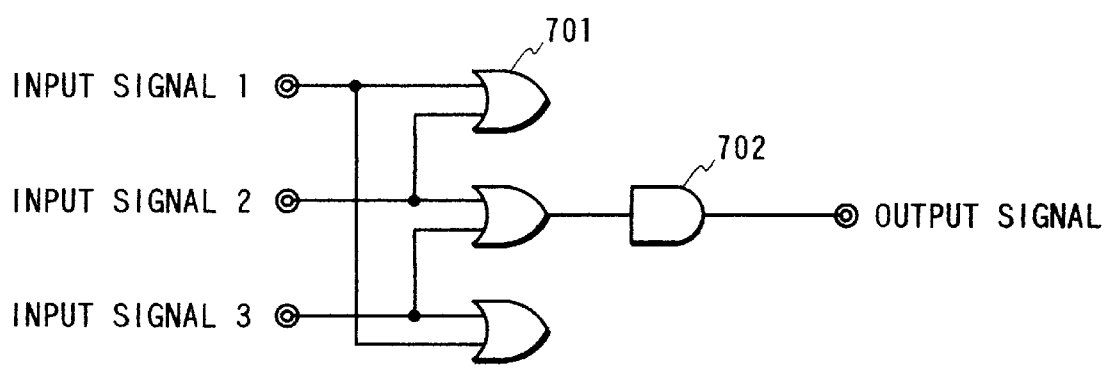
FIG. 7 is a drawing to show an example of a bit determining circuit.

FIG. 7 shows an example of the bit determining circuit. In this example the bit determining circuit is comprised of three OR circuits 701 and an AND circuit 702.

The three divisional signals output from the aforementioned dividing circuit, after the waveform processing described above, are supplied as three input signals to the bit determining circuit.

With the three input signals, the OR circuits 701 each take three logical ORs between two signals out of the three input signals and supply the three logical OR outputs to the AND circuit 702, which takes an AND of the three signals and gives it as an output from the bit determining circuit.

Next described is an example in which an actual signal waveform is processed using the reproduction control circuit as explained above.

FIG. 8 is a drawing to show a state of bit to become a first cause of bit detection error in a recording bit string on an actual recording medium.

Numeral 801 designates a recording bit, or ON bit, and 802 a non-recording bit, or OFF bit.

Examples of the potential causes of bit detection error include, first, a local defect or sudden electric signal noise in the recording medium, irregularity of detection current values at bits, irregularity of bit shape, x-directional, positional deviation of bit, and x-directional, positional deviation of scan.

These are shown in FIG. 8, as noise area 803, small ON bit 804, large ON bit 805, and ON bit 806 the position of which deviates in the x-direction (also including the x-directional, positional deviation of scan).

An actual signal waveform for the bit string including these noise area and bits will be explained using FIGS. 9A to 9K.

Electric current detection signals (bit detection signals) obtained by plural (three in the present embodiment) scans over the bit string are as shown in FIG. 9A.

Binarization with the threshold value shown by the dotted line in the drawing is carried out with the electric current detection signals (FIG. 9A) to obtain binary signals as shown in FIG. 9B.

AND is taken between the binary signals and bit detection synchronizing signals (FIG. 9C) to obtain AND signals as shown in FIG. 9D.

This AND process eliminates signals present in portions deviated from timings of bit detection, that is, signals from portions outside the bit detection areas among the noise area 803, large bit 805, and ON bit 806 with x-directional, positional deviation, not included in the bit detection areas (see FIG. 5).

The AND signals (FIG. 9D) are subjected to waveform shaping to obtain the signal (FIG. 9E) after the waveform shaping. (In this example, a delay of the signals due to the waveform shaping is ignored for simplicity of explanation.)

This waveform shaping process corrects the small bit 804 and ON bit 806 with x-directional, positional deviation for deviation from the corresponding bit detection areas, and shapes the waveforms.

The process up to this point eliminates bit detection errors due to the local defect or sudden electric signal noise of the recording medium in the bit detection areas, irregularity of detection current values at bits, irregularity of bit shape, x-directional, positional deviation of bit, and x-directional positional deviation of scan.

After this, with the first, second, and third scan synchronizing signals, the signals (FIG. 9E) after the waveform shaping are divided into three groups corresponding to the first, second, and third scans, which are used as first, second, and third divisional signals (FIG. 9F), (FIG. 9H), (FIG. 9J), respectively.

Among them, the first divisional signal (FIG. 9F) is temporally delayed by Δt1 by the time shifting circuit 1 (307 in FIG. 3), so as to be the output signal (FIG. 9G) from the time shifting circuit 1.

The second divisional signal (FIG. 9H) is subjected to time inversion of waveform and thereafter the time shifting circuit 2 (309 in FIG. 3) performs the temporal delay of waveform so as to temporally delay the waveform as a whole by Δt2, thus obtaining the output signal (FIG. 9I) from the time shifting circuit 2.

These three signals, the output signal (FIG. 9G) from the time shifting circuit 1, the output signal (FIG. 9I) from the time shifting circuit 2, and the third divisional signal (FIG. 9J), are supplied to the bit determining circuit (310 in FIG. 3), which outputs reproduction signals (FIG. 9K).

FIG. 10 is a drawing to show another state of bit to become a second cause of bit detection error in a recording bit string on an actual recording medium.

Examples of causes of error different from the first cause of bit detection error described above include a local defect or sudden electric signal noise in the bit detection areas of recording medium, and separation of the probe from the recording medium during contact scan because of mechanical vibration or the like.

These are shown in FIG. 10 as noise areas 1001, 1002 appearing in OFF bit portions and an undetected portion 1003 in an ON bit portion.

Unlike the foregoing example, by the signal processing for the case having the bit detection error cause shown in FIG. 10, the noise cause is not eliminated yet at the time of output from the waveform shaping circuit 305 in the reproduction control circuit shown in FIG. 3.

Next, the output signal from the time shifting circuit 1, the output signal from the time shifting circuit 2, and the third divisional signal, which are outputs from the dividing circuit 306, time shifting circuit 1 (307), time inverting circuit 308, and time shifting circuit 2 (309), are shown in the waveforms (FIG. 11A), (FIG. 11B), and (FIG. 11C), respectively.

When these three signals are supplied to the bit determining circuit (310 in FIG. 3), the waveform shown in FIG. 11E is output as reproduction signals.

A waveform diagram to conceptually illustrate the function of the bit determining circuit is shown in FIG. 11D.

FIG. 11D indicates the number of times of "provisionally having been detected as a bit" in the signals obtained by plural (three in the present embodiment) scans.

The bit detection circuit makes a determination that a true bit is detected, when the bit is detected two or more times (twice in the present embodiment) though does not have to be detected every time (three times in the present embodiment) in the signals obtained by the plural (three in the present embodiment) scans.

This process eliminates the foregoing noise signals due to the second bit detection error cause so as to prevent missing of detection of bit.

Figure 12:
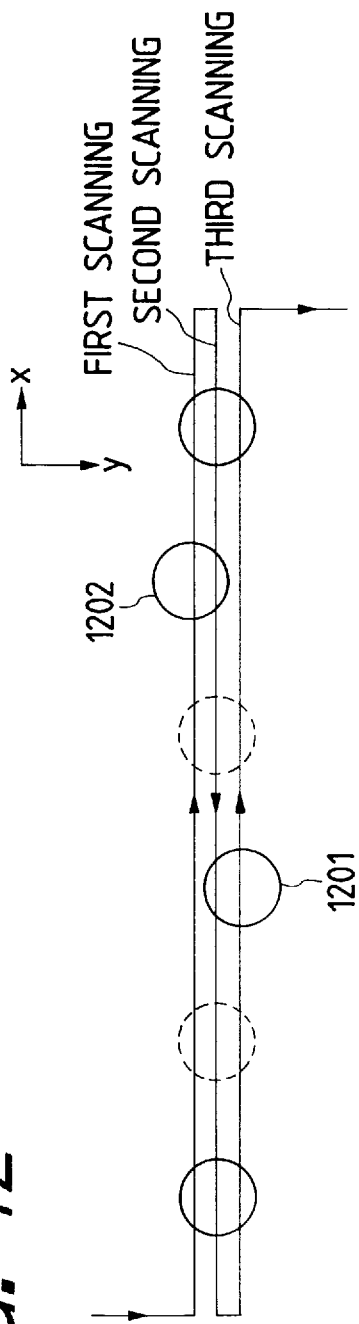
FIG. 12 is a drawing to show a state of bit to become a third cause of bit detection error.

FIG. 12 is a drawing to show still another state of bit to become a third cause of bit detection error in a recording bit string on an actual recording medium. An example of the third error cause is y-directional positional deviation of recording bit. This is shown as ON bits 1201, 1202 the positions of which are shifted in the y-direction, in FIG. 12.

Similarly as in the example of FIG. 10, by the signal processing for the case having the bit detection error cause shown in FIG. 12, the noise cause is not removed yet at the time of output from the waveform shaping circuit 305 in the reproduction control circuit shown in FIG. 3.

Next, the output signal from the time shifting circuit 1, the output signal from the time shifting circuit 2, and the third divisional signal, which are outputs from the dividing circuit 306, time shifting circuit 1 (307), time inverting circuit 308, and time shifting circuit 2 (309), are shown in the waveforms (FIG. 13A), (FIG. 13B), and (FIG. 13C), respectively.

When these three signals are supplied to the bit determining circuit (310 in FIG. 3), the waveform shown in FIG. 13E is output as reproduction signals.

A waveform diagram to conceptually illustrate the function of the bit determining circuit is shown in FIG. 13D.

The processing similar to that in the example of FIG. 10 can avoid missing of detection of bit due to the foregoing third cause of bit detection error.

Figure 14:
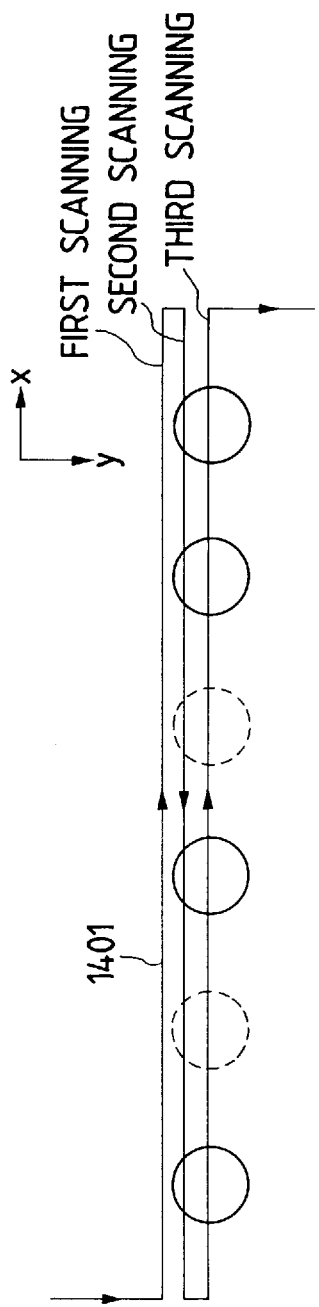
FIG. 14 is a drawing to show a state of scan for a bit string to become a fourth cause of bit detection error.

FIG. 14 is a drawing to show a state of bit to become a fourth cause of bit detection error in a recording bit string on an actual recording medium.

An example of the fourth error is y-directional, positional deviation of scanning position.

This is shown as scan 1401 off the bits in the y-direction, in FIG. 14.

Similarly as in the example of FIG. 10, by the signal processing for the case having the bit detection error cause shown in FIG. 14, the noise cause is not removed yet at the time of output from the waveform shaping circuit 305 in the reproduction control circuit shown in FIG. 3.

The output signal from time shifting circuit 1, the output signal from time shifting circuit 2, and third divisional signal, which are outputs from the next dividing circuit 306, time shifting circuit 1 (307), time inverting circuit 308, and time shifting circuit 2 (309), are shown in the waveforms (FIG. 15A), (FIG. 15B), and (FIG. 15C), respectively.

When these three signals are supplied to the bit determining circuit (310 in FIG. 3), the waveform shown in FIG. 15E is output as reproduction signals.

A waveform diagram to conceptually illustrate the function of the bit determining circuit is shown in FIG. 15D.

The processing similar to that in the example of FIG. 10 can avoid missing of detection of bit due to the foregoing fourth cause of bit detection error.

The above processing eliminates the bit detection errors due to the local defect or sudden electrical signal noise in the bit detection areas of recording medium, separation of the probes from the recording medium during contact scan because of the mechanical vibration or the like, y-directional, positional deviation of recording bit, and y-directional, positional deviation of scanning position.

The present embodiment showed the example in which three scans were carried out for a bit string and a bit was determined as a true bit when the bit was detected two or more times.

The idea of the present invention is by no means limited to this example, but may encompass such an arrangement that three or more scans are carried out and a bit is determined as a true bit when the bit is detected plural times. For example, the following arrangements are possible.

(a) Four scans are carried out, and a bit is determined as a true bit when the bit is detected two or more times in a same bit detection area.

(b) Four scans are carried out, and a bit is determined as a true bit when the bit is detected three or more times in a same bit detection area.

(c) Five scans are carried out, and a bit is determined as a true bit when the bit is detected three or more times in a same bit detection area.

Figure 16:
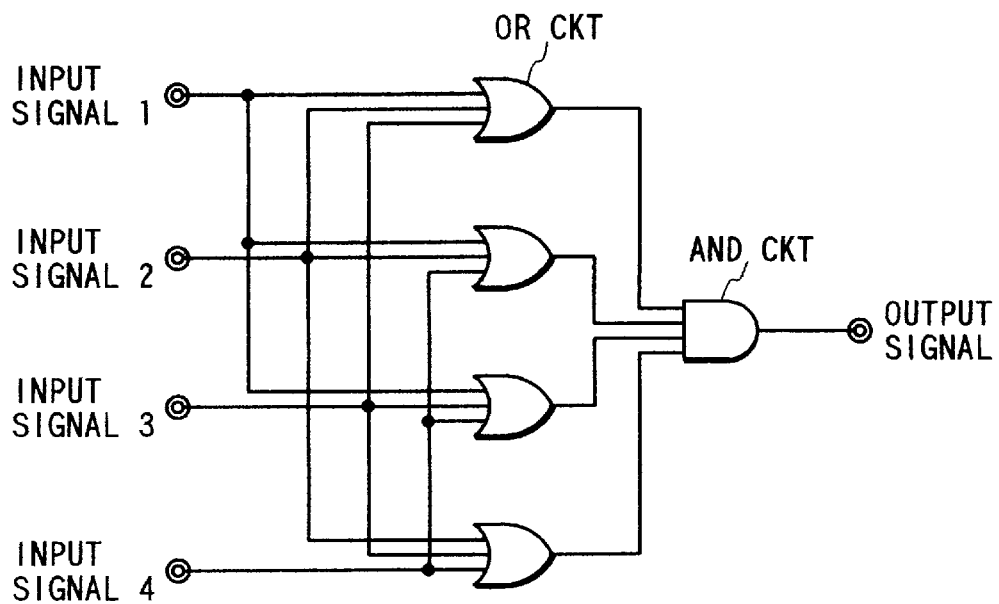
FIG. 16 is a drawing to show a bit determining circuit for determining that a bit is a true bit when the bit is detected two or more times during execution of four scans.
Figure 17:
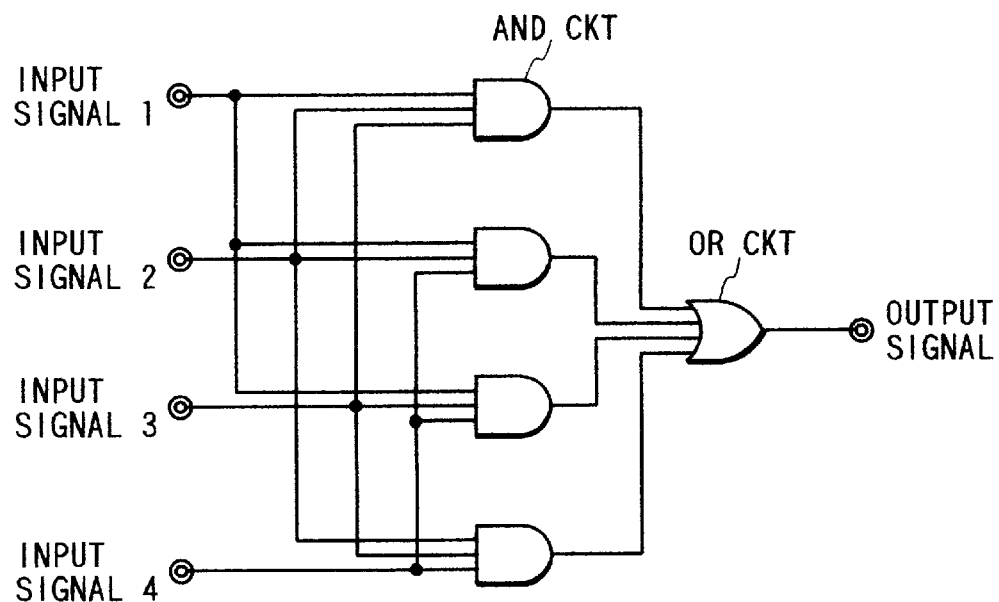
FIG. 17 is a drawing to show a bit determining circuit for determining that a bit is a true bit when the bit is detected three or more times during execution of four scans.
Figure 18:
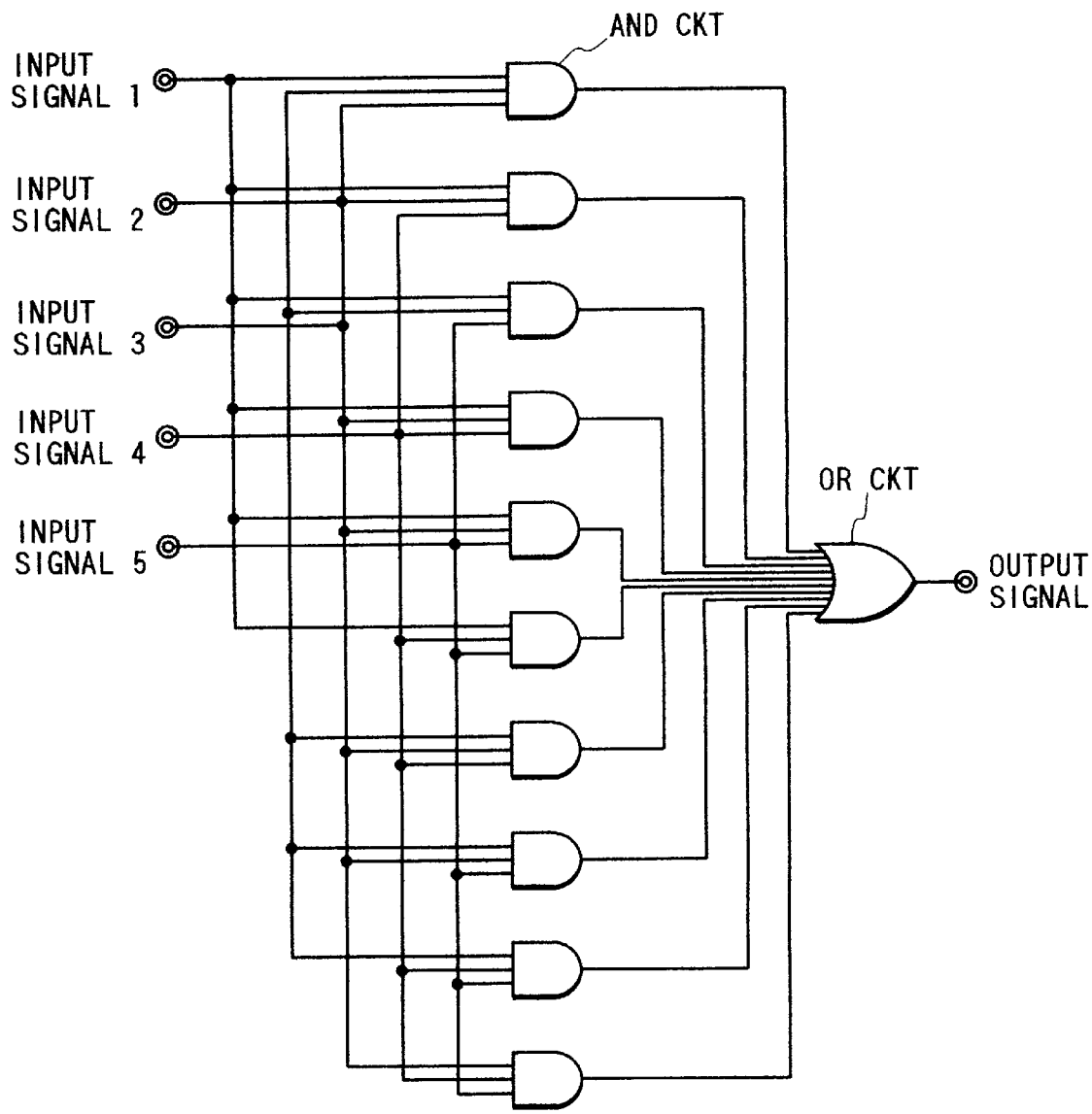
FIG. 18 is a drawing to show a bit determining circuit for determining that a bit is a true bit when the bit is detected three or more times during execution of five scans.

The reproduction control circuits for these cases are substantially the same as in the present embodiment except for portions related to an increase in the number of signals due to the change from three scans to four or five scans. However, only the bit determining circuit is different, and specific examples of the bit determining circuit corresponding to above (a), (b), and (c) are shown in FIG. 16, FIG. 17, and FIG. 18, respectively.

As compared with the present embodiment (three scans and two or more detections), the case of (a) has an advantage of decreasing errors due to missing of detection of bit.

As compared with (a), the case of (b) has an advantage of decreasing errors to erroneously determine noise or the like as a bit, though increasing errors due to missing of detection of bit.

As compared with (a) and (b), the case of (c) has an advantage of decreasing the both errors due to missing of detection of bit and due to erroneous determination of noise or the like as a bit.

An increase in the number of scans can improve the bit detection accuracy as described, but the total bit detection speed, i.e., the reproduction speed is decreased. For practical apparatus, the optimum number of scans and the optimum number of bit detections for determination may be selected taking account of occurrence frequencies of errors due to the causes as listed above and the necessary reproduction speed, depending upon the recording medium, probes, electric circuits, mechanical characteristics of apparatus, and so on.

Now, the present embodiment showed the example in which the second scan out of the three scans was carried out in the opposite direction to the bit reproduction direction and time inversion of detected waveform was carried out thereafter.

This enables bit detection with plural scans being carried out in different directions, which includes no waste scanning time, thus realizing high-speed bit detection by plural scans.

In the practical apparatus as shown in FIG. 2, precise scanning of probes 205 needs to be performed relative to the recording medium 203 and a piezo-element actuator is sometimes used as the xyz driving mechanism 207 for driving the xyz stage 208.

Figure 19:
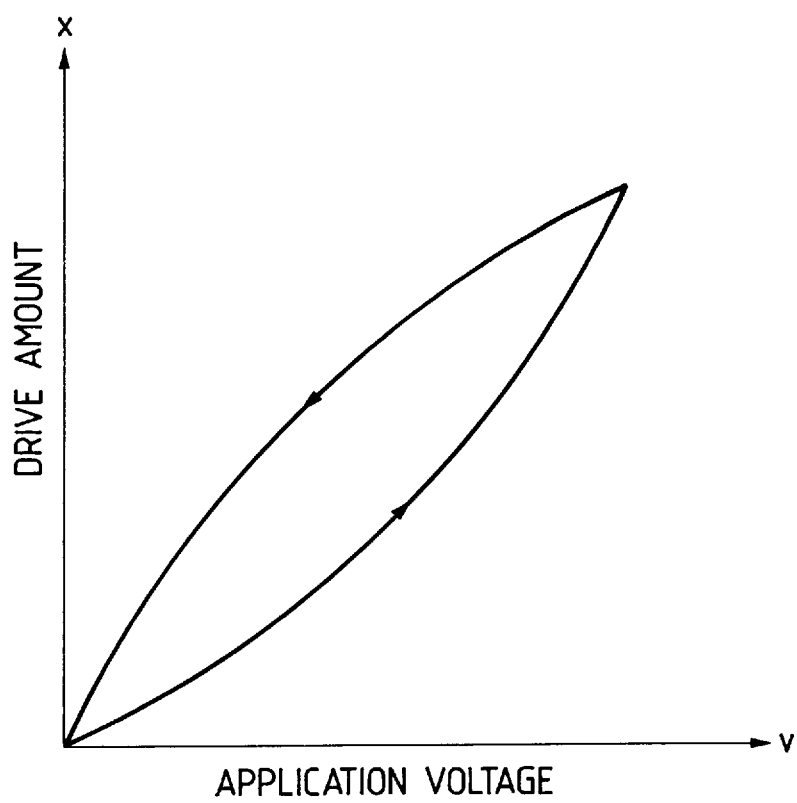
FIG. 19 is a drawing to illustrate hysteresis characteristics in applied voltage-drive amount characteristics of piezo-element actuator.

However, the applied voltage-drive amount characteristics of piezo-element actuator include the hysteresis characteristics as shown in FIG. 19.

Figure 20A:
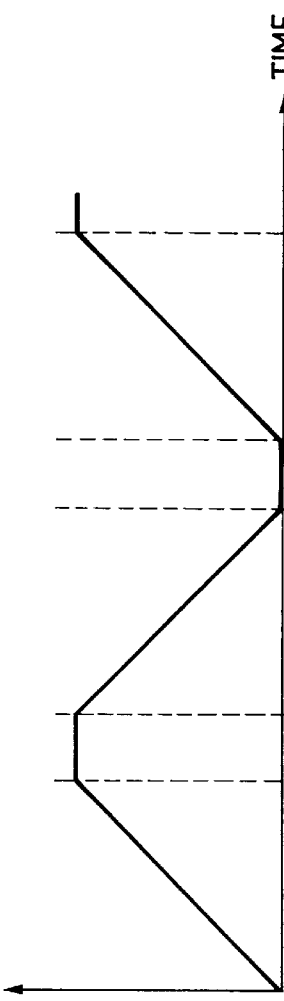
FIGS. 20A to 20C are drawings to show distortion of bit signal processing waveform due to hysteresis of piezo-element actuator.
Figure 20B:
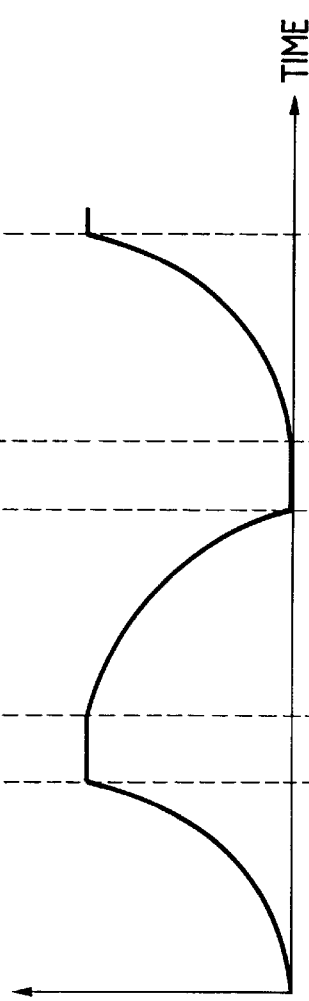

Because of it, when the voltage of the waveform shown in FIG. 20A is applied to the piezo-element actuator for driving the stage in the x-direction in the present embodiment, actual drive amounts of the piezo-element actuator become as shown in FIG. 20B.

Figure 20C:
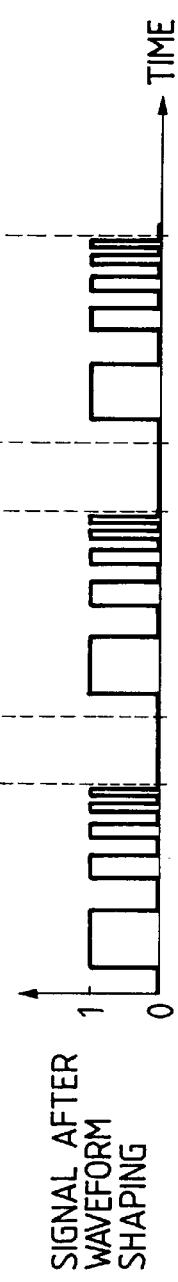

At this time, the signals after waveform shaping of the current detection signals (bit detection signals) become as shown in FIG. 20C, and the signals through the subsequent time inverting process will have deviation of waveform, which complicates waveform processing for determination of bit more or less.

Thus, preliminarily taking account of the hysteresis characteristics of piezo-element actuator, the waveform of the voltage applied is arranged to be as shown in FIG. 21A, whereby actual drive amounts can have linearity with respect to the time as shown in FIG. 21B. This makes the signals after waveform shaping of the current detection signals equally spaced with respect to the time, as shown in FIG. 21C, and bit determination can be performed without deviation of waveform even after the subsequent time inverting process.

This drive taking account of the hysteresis characteristics of piezo-element actuator does not make the waveform processing for bit detection complex even in the case of performing forward and backward scans for bit string, which improves the overall reproduction speed.

Of course, consideration of the hysteresis characteristics can be omitted in the drive and time waveform process if bit detection is carried out by only unidirectional scans (forward scans). However, the overall reproduction speed will be decreased because of (waste) scans (backward scans) not used for signal detection.

[Embodiment 2]

The bit detection method in the scanning method in combination of x-scan with y-scan as described above always necessitates forward and backward motions between the probes and the recording medium and involves the problem of hysteresis if the piezo-element actuator is used.

Thus, this is solved by the circular scanning method of drive for effecting relative circular movement (which is not rotation) between the probe and the recording medium as detailed in the description of Embodiment 2.

Figure 22:
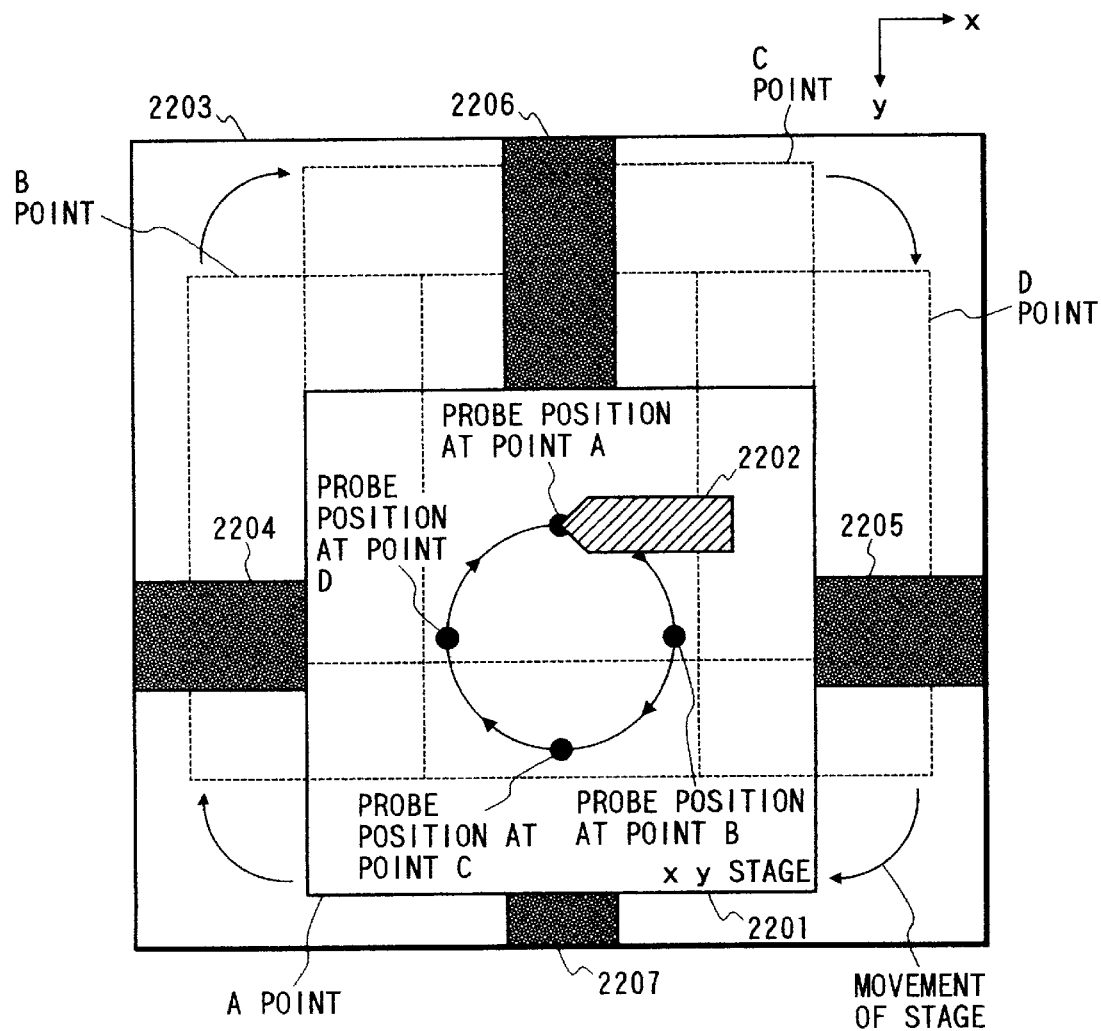
FIG. 22 is a drawing to illustrate the details of drive in a circular scan method.

FIG. 22 shows the details of the circular scanning method.

The position of the xy stage 2201 indicated by the thick solid line is defined as point A, and positions indicated by three types of dotted lines as point B, point C, and point D.

The probe 2202 is fixed to a housing 2203. By driving x-directional and y-directional driving mechanisms 2204 to 2207, the xy stage 2201 is driven relative to the housing 2203.

Accordingly, the xy stage 2201 is driven relative to the probe 2202.

At this time, two drive voltages of sinusoidal waves having the same frequency f and same amplitude v but opposite polarities (shifted 180° in phase) are applied to the x-directional driving mechanisms 1 (2204) and 2 (2205).

Also, two drive signals of sinusoidal waves having the same frequency f and the amplitude v but having the relation shifted 90° in phase each with respect to the two sinusoidal waves applied to the x-directional drive mechanisms (i.e., drive signals of cosine waves) are applied to the y-directional driving mechanisms 1 (2206) and 2 (2207).

By this, when observed from the xy stage 2201, the tip of probe 2202 moves as drawing a circle as shown on the xy stage 2201.

The probe positions at point A, point B, point C, and point D in the drawing are positions on the xy stage 2201 when the position of the probe is located at point A, in the case where the xy stage 2201 moves past the respective positions of from point A via point B and via point C to point D.

By changing the frequency f, the frequency of circular scanning or the speed of circular motion can be changed. By changing the amplitude v, the diameter of circular scanning can be changed.

Figure 23:
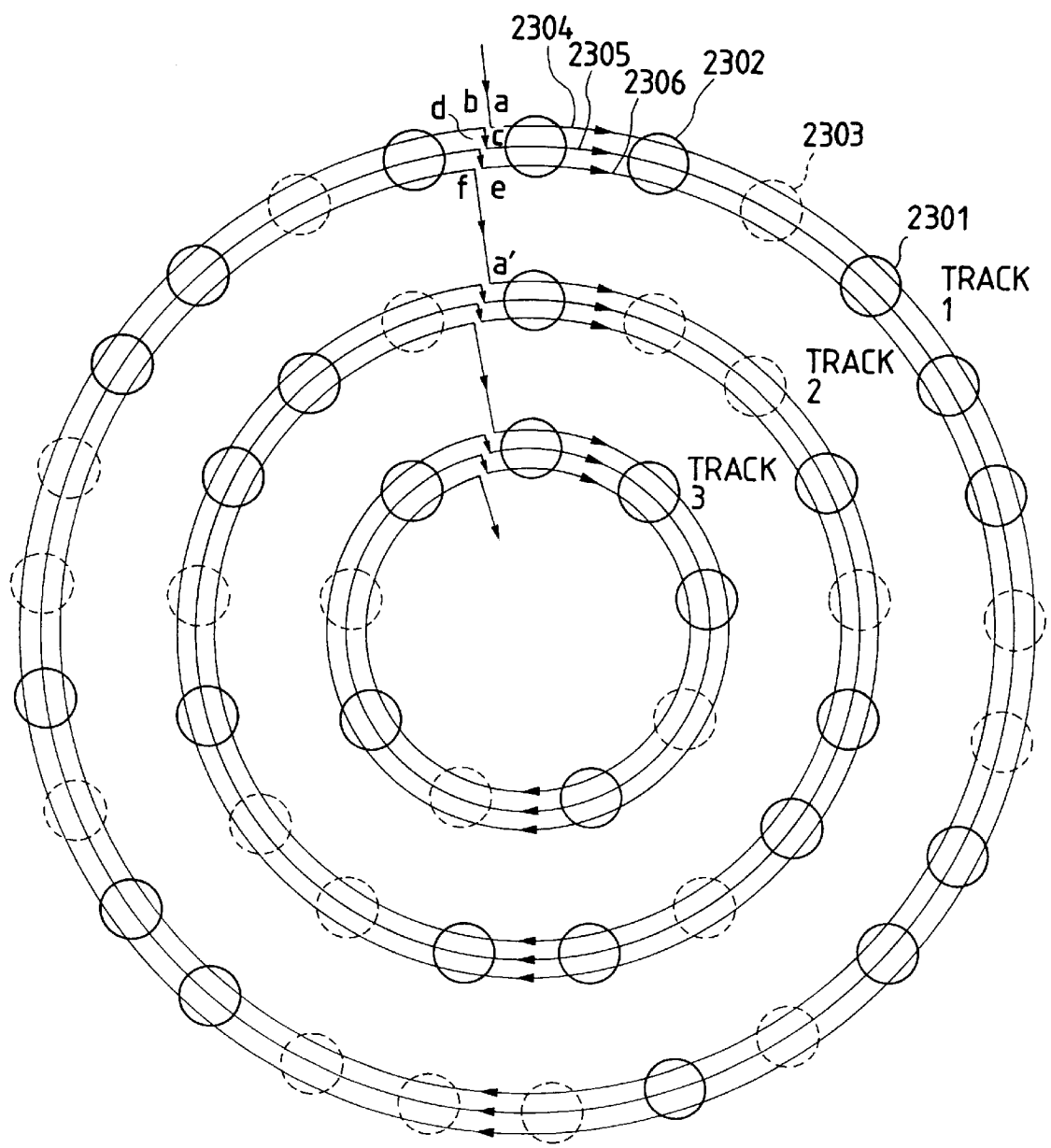
FIG. 23 is a drawing to illustrate Embodiment 2 of the recording/reproducing method according to the present invention.

FIG. 23 shows an embodiment in which the present invention is applied to the circular scanning method as described above.

As shown in FIG. 23, plural (three or more) circumferential scans shifted little by little in the radial direction are carried out for a bit string arranged on a circumference on a certain track 1 (2301) out of a plurality of concentric tracks, thereby detecting recording bits (ON bits 2302 shown by the solid lines in the drawing). (In the drawing the portions indicated by the dotted lines are OFF bits 2303 without record of bit.)

The present embodiment shows an example of performing three scans, first scan 2304 (from a to b), second scan 2305 (from c to d), and third scan 2306 (from e to f) shown in the drawing.

Here, the directions of the first scan 2204, second scan 2205, and third scan 2206 all are the same (clockwise in the present embodiment), different from Embodiment 1.

The scanning positions (diameters of circumferential scans) are shifted approximately a fraction of the diameter of the recording bits little by little in the radial direction (in the portions of from b to c and from d to e).

After three circumferential scans are carried out for a bit string, the probe is shifted to the next track in the radial direction (from f to a') and scanning is carried out for the bit string in track 2.

This step is repeated to scan the all bit strings.

The method for performing scanning of bit string as described above and performing reproduction from current detection signals (bit detection signals) detected is substantially the same as in Embodiment 1.

Figure 24:
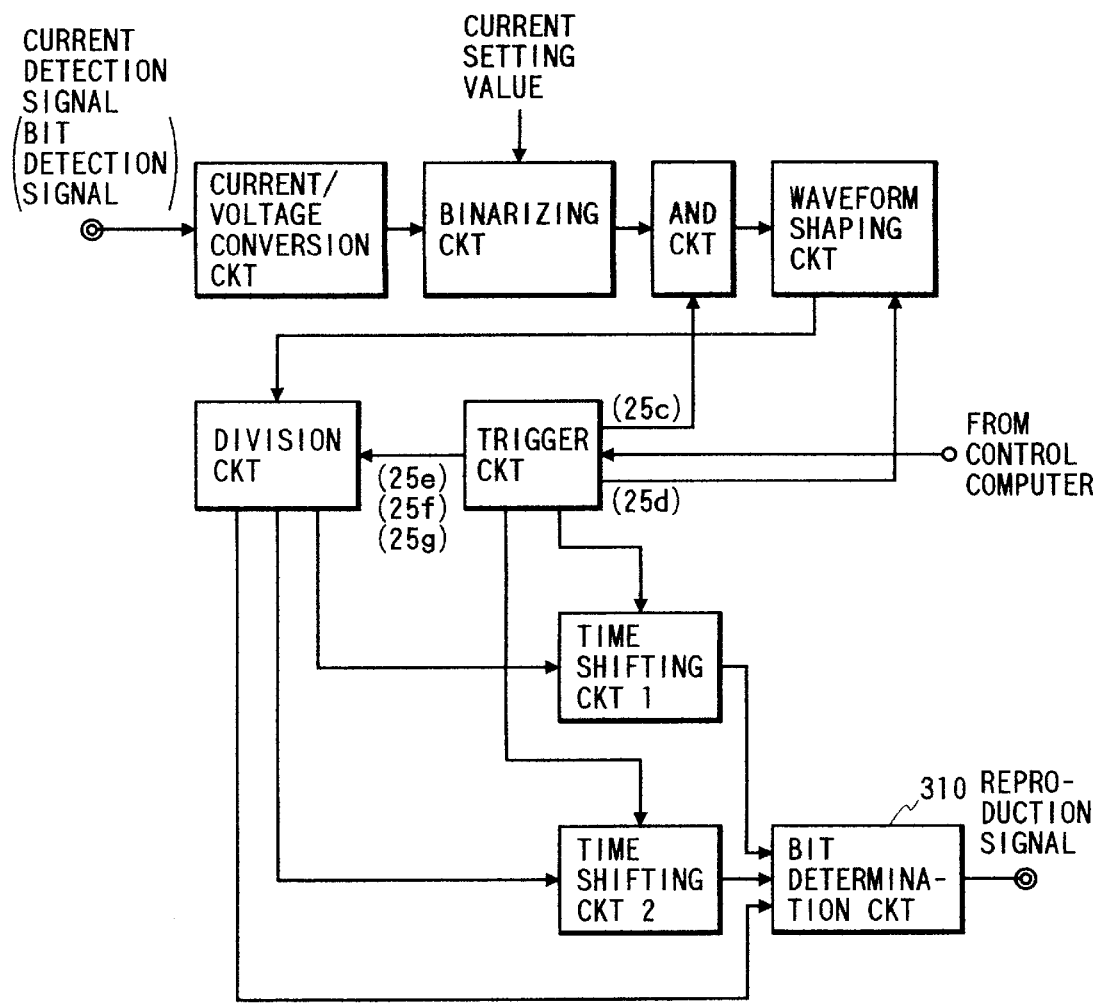
FIG. 24 is a block diagram of the reproduction control circuit in the circular scanning method.
Figure 25:
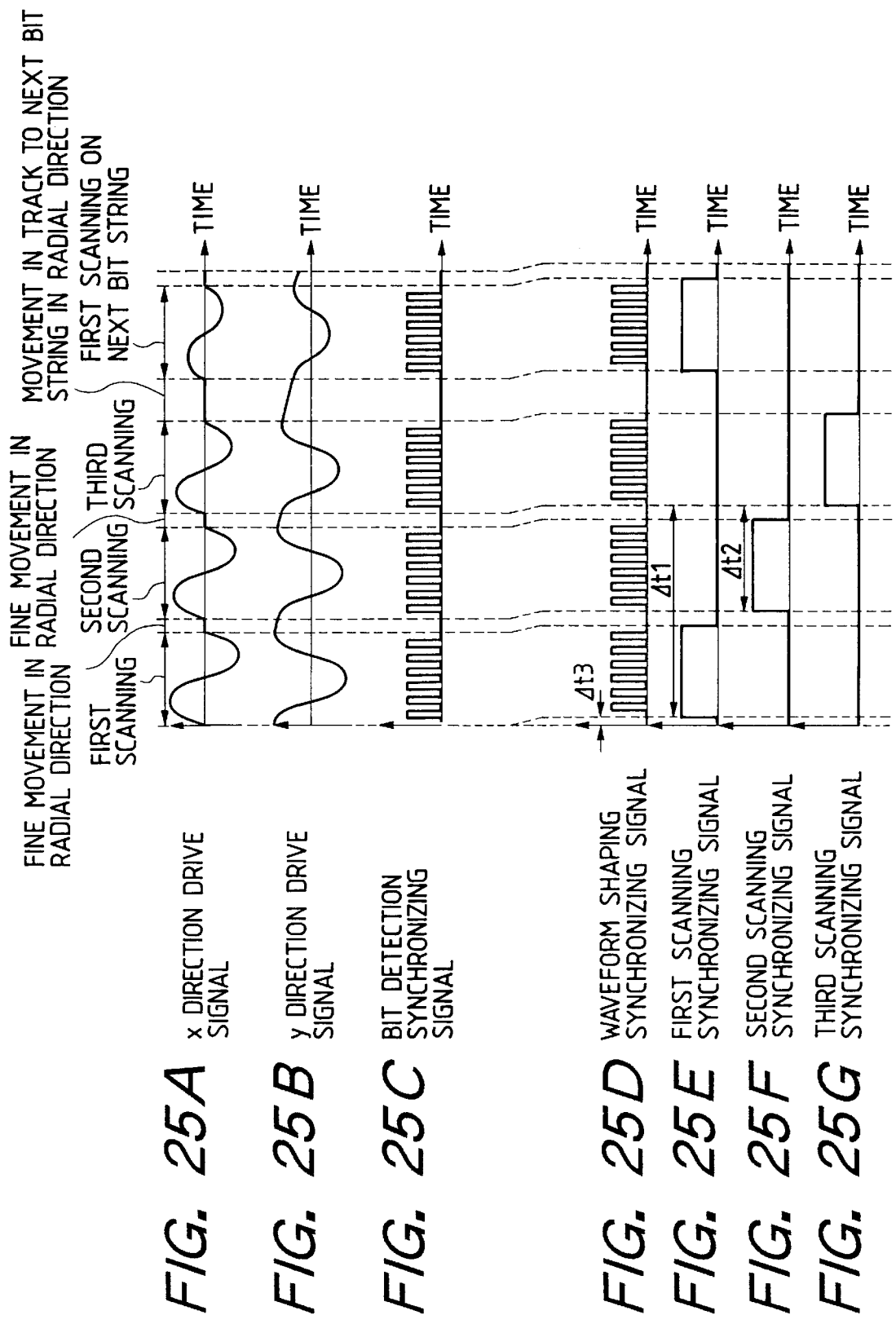
FIGS. 25A to 25G are drawings to illustrate the relationship among signal waveforms made in the trigger circuit in Embodiment 2.

The details of the reproduction control circuit in the circular scanning method are shown in FIG. 24.

In the circular scanning method, inversion of scanning direction is not necessary, no waste scan is caused, and the process of time inversion is not necessary in signal waveforms detected by plural scans.

Further, the hysteresis of piezo-element actuator becomes smaller, and thus, special signal waveform processing is unnecessary even in the cases of not applying drive of complex waveform.

Therefore, high-speed recording/reproducing operation can be realized by the simpler structure than Embodiment 1.

FIGS. 25A to 25G are drawings to show the relationship of waveform between the x- and y-directional drive signals (FIG. 25A), (FIG. 25B) of the probe relative to the recording medium, and the bit detection synchronizing signal (FIG. 25C), waveform shaping signal (FIG. 25D), first scan synchronizing signal (FIG. 25E), second scan synchronizing signal (FIG. 25F), or third scan synchronizing signal (FIG. 25G) produced by the trigger circuit.

The actual waveform processing in the reproduction control circuit is substantially the same as in Embodiment 1, but only a different point is that there is no time inverting process in the portion of from FIG. 9H to FIG. 9I in the process corresponding to FIGS. 9A to 9K of Embodiment 1.

Finally explained is the fact that the bit detection methods of the present invention as described in Embodiment 1 and Embodiment 2 are most suitable for the apparatus with plural probes.

By an arrangement wherein a plurality of probes are integrated, wherein they are positioned relative to the recording medium, and wherein the recording/reproducing operation is carried out in parallel by the plural probes, there is an advantage of increasing the recording/reproducing speed by the number of probes without necessitating a complex driving mechanism of the probes and recording medium.

In practical use, there are, actually, x- and y-directional positional deviation of the plural probe needles caused by errors in the step of fabricating the probes, x- and y-directional positional deviation of bits formed during recording, thermal expansion or contraction due to change of ambient temperature, and the like.

Because of this, there are some cases in which the plural probes have characteristic positional deviation amounts for the respectively corresponding bit strings and in which thereby the plural probes cannot access the corresponding bit strings at a time.

Even in such cases, the bit detection methods of the present invention have the advantage that the bits can be detected by making the plural probes access the bit strings with shift of time, because the plural scans are carried out as changing their positions.

Figure 26:
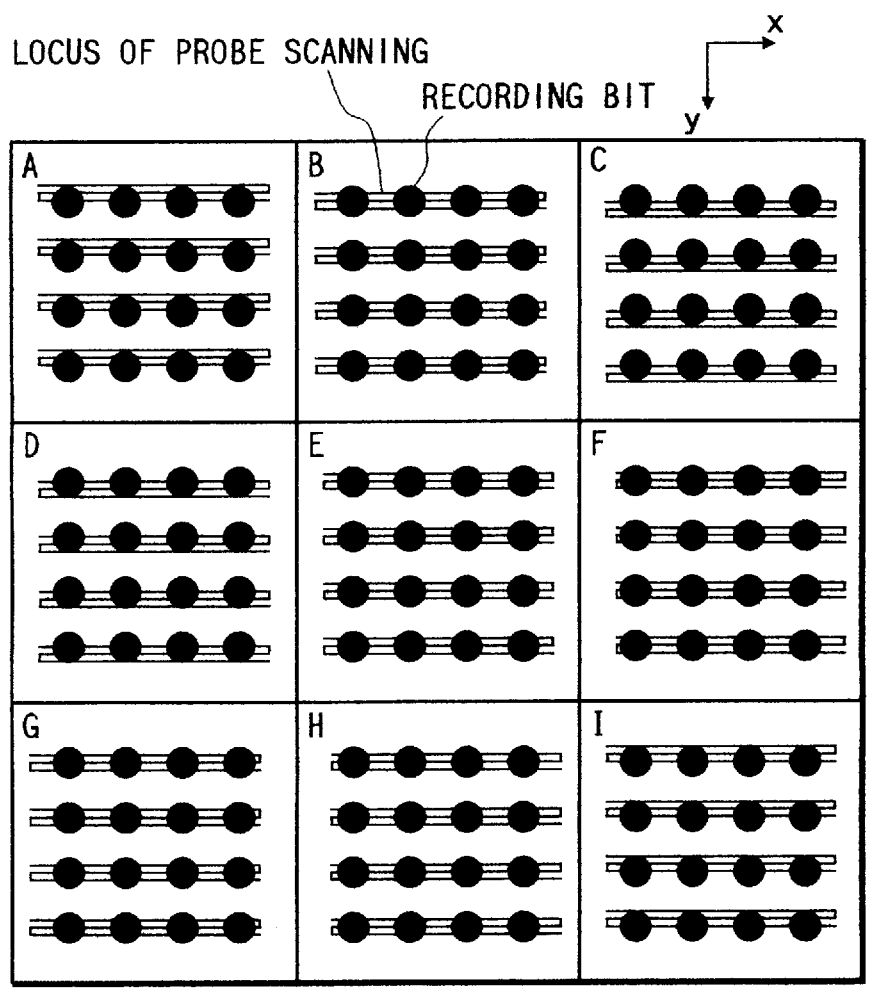
FIG. 26 is a drawing to show states of plural probes with positional deviation accessing respective bit strings in Embodiment 1.
Figure 27:
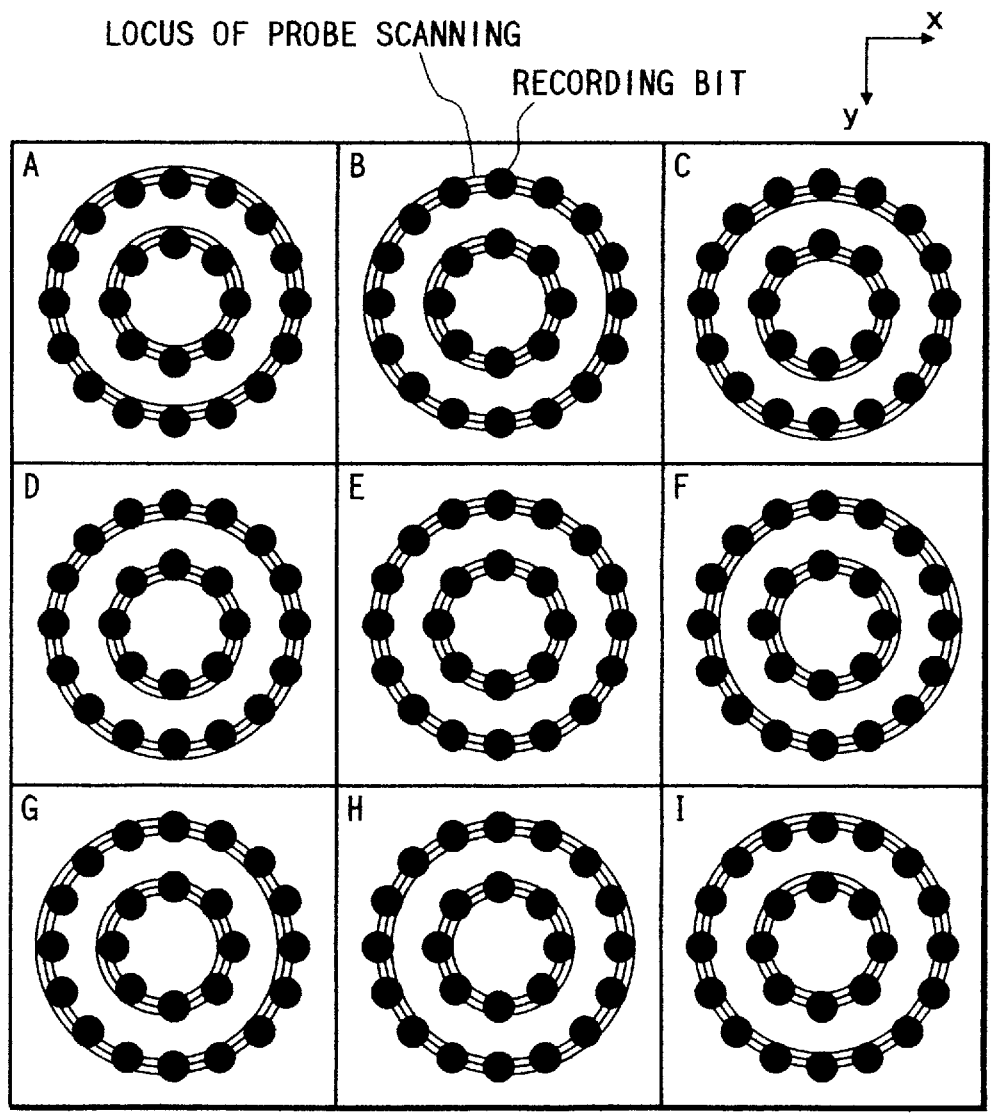
FIG. 27 is a drawing to show states of plural probes with positional deviation accessing respective bit strings in Embodiment 2.

FIG. 26 and FIG. 27 show states of access to each bit string with each probe having the positional deviation as described above as to Embodiment 1 and Embodiment 2, respectively.

In FIG. 26 and FIG. 27 the region indicated by E shows the state in which the probe accesses the bit strings without x- and y-directional, positional deviation.

Regions B, F, G, and H show cases with relative, positional deviation in the x-direction.

Regions A, C, D, and I show cases with relative, positional deviation in the y-direction.

Even with positional deviation of each probe relative to the corresponding bit string as described, the methods of the present invention can perform the bit detection without causing a bit detection error as long as amounts of the positional deviation are within the width of plural scans.

[Embodiment 3]

In the present embodiment bit detection was carried out using the recording/reproducing apparatus provided with the signal processing means according to the present invention.

The structure of the recording/reproducing apparatus used in the present invention will be explained using FIG. 30, FIG. 31, and FIGS. 32A to 32E.

Figure 30:
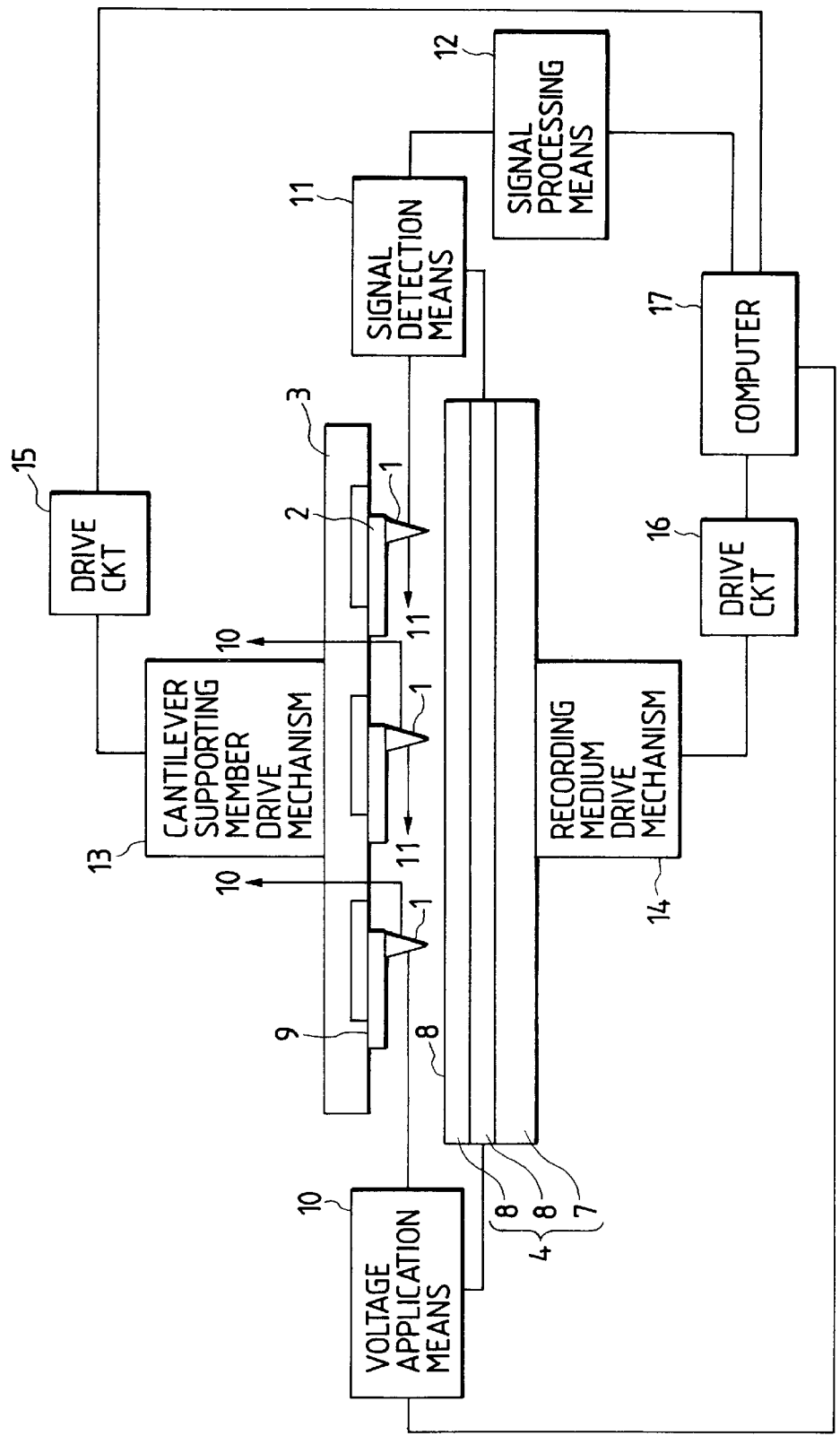
FIG. 30 is a schematic drawing of an information recording/reproducing apparatus used in the embodiments.

In FIG. 30, numeral 1 designates electrically conductive probes, so that the recording/reproducing apparatus of the present embodiment has a plurality of probes (only three of which are shown in FIG. 30).

Each probe 1 is fixed to a free end of cantilever 2. Then the individual cantilevers 2 are two-dimensionally arranged and fixed to a supporting member 3 of cantilever. The probes 1, cantilevers 2, and cantilever supporting member 3 were fabricated using the well-known fine patterning technology as called micromechanics and microelectronics technology employed in fabricating LSI or the like (for example, see Petersen Proc. IEEE, vol. 70, p. 420, (1982), the bulletin of Japanese Laid-open-Patent Application No. 62-281138, and the bulletin of Japanese Laid-open Patent Application No. 1-196751).

Numeral 4 designates a recording medium, which is comprised of a recording layer 5, an electrode 6, and a substrate 7.

In the present embodiment a quartz glass substrate was used as the substrate 7. The electrode 6 is of Au 1000 Å thick formed by vacuum vapor deposition on the substrate 7. Squarilium-bis-6-octylazulene (SOAZ) was used as a material for making the recording layer 5, which was made by building two monomolecular layers of SOAZ up on the electrode 6 by the LB technique (see the bulletin of Japanese Laid-open Patent Application No. 63-161552).

The recording surface 8 of the recording layer 5 is positioned as opposed to the tips of probes 1 in the recording apparatus. The fixed ends 9 of the individual cantilevers 2 are present in a plane parallel to the recording surface 8.

Numeral 10 is a voltage applying means for applying a voltage between the probes and the electrode upon formation of bit and upon reproduction of bit. Numeral 11 denotes a signal detecting means for converting a magnitude of interaction between probe and recording medium detected by each probe upon reproduction of bit into an electric signal. Numeral 12 is a signal processing means for performing signal processing according to the present invention.

Numeral 13 designates a driving mechanism of the cantilever supporting member for driving the cantilever supporting member 3 relative to the recording surface 8.

Numeral 14 is a recording medium driving mechanism for driving the recording medium 4. The driving mechanisms 13, 14 are driven by signals from driving circuits 15, 16, respectively.

As described below, upon recording and reproducing operation, the cantilever supporting member driving mechanism 13 and recording medium driving mechanism 14 are driven to effect relative movement between the probes and the recording medium.

Numeral 17 represents a computer, which controls the recording/reproducing apparatus.

Next explained is the recording/reproducing operation with the recording layer 5 comprised of the SOAZ monomolecular built-up film.

In the present embodiment bit formation (recording operation) into the recording layer 5 was carried out by the following method.

By bringing the cantilever supporting member 3 and the recording surface 8 closer to each other, the plural probes 1 are brought into close proximity to the recording surface 8.

Figure 31:
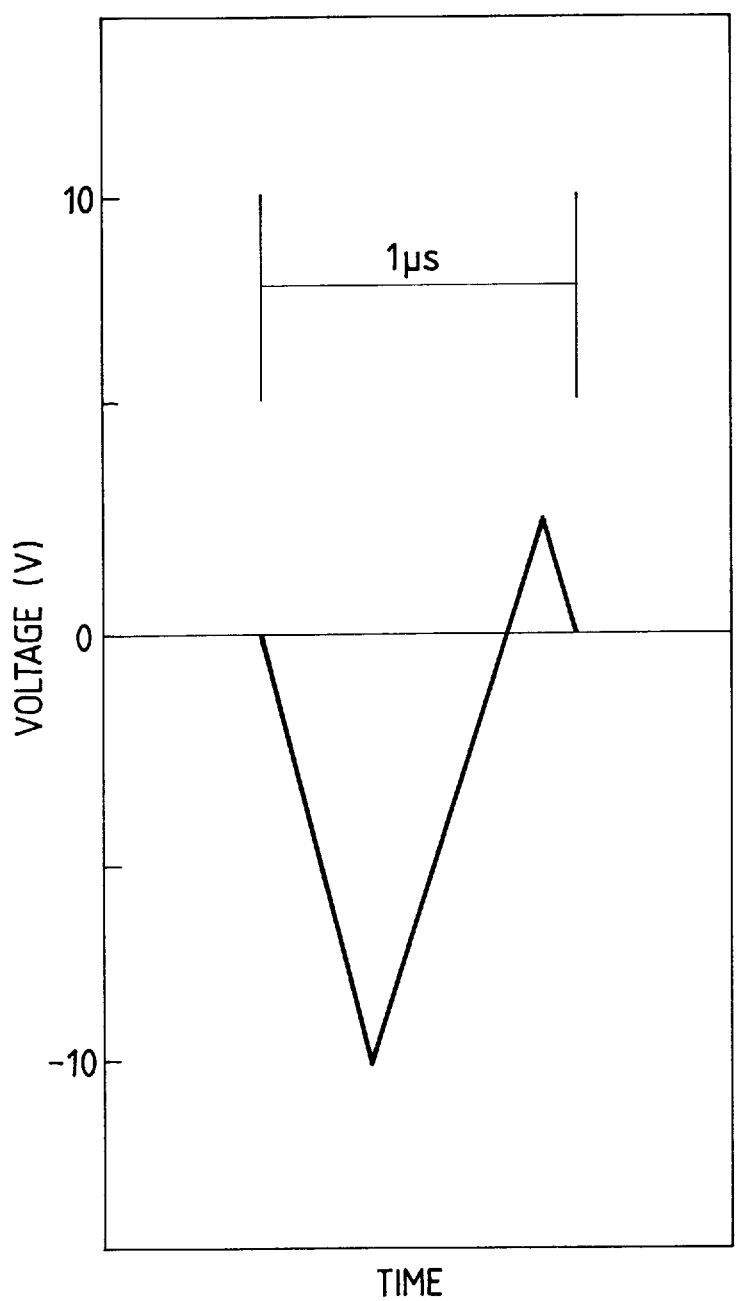
FIG. 31 is a voltage application pattern for formation of bit.

In this state they are scanned relative to each other. Then, at desired positions on the recording surface 8, the voltage as shown in FIG. 31 is applied between the probes 1 and the electrode 6 by the voltage applying means 10 with the probes 1 being plus and the electrode 6 being minus.

After application of the voltage, the conductivity of small regions of the recording layer 5 opposed to the probes 1 increases and its state is preserved. Bits are formed by the above method.

In order to easily check that accurate bit detection can be performed by the signal processing of the present invention, five bits were formed in the recording surface by each probe in the present embodiment.

In the present embodiment, reproduction of the bits recorded in the recording medium was carried out according to the following method.

The recording surface is scanned relative to the probes in the state of the probes to which the voltage of +1.5 V is applied by the voltage applying means 10, proximate to the recording surface 8, and above the bit string including the above five bits.

During the scanning, the distance between the cantilever supporting member 3 and the recording surface 8 is kept constant. Then fine electric currents flowing through the probes during the scanning were continuously measured by the signal detecting means 11.

Signals measured by the signal detecting means 11 are supplied to the signal processing means 12 according to the present invention.

The signal processing means 12 effects the signal processing according to the present invention on the signals input thereto, thus performing bit detection.

In the present embodiment, noise was mixed in the signals detected by the probes upon reproduction of bits. The noise was mixed in only signals detected while the probes were scanning regions above non-bit-forming portions. The magnitude of the noise is substantially the same as the intensities of signals originating from the bits.

Figure 32A:
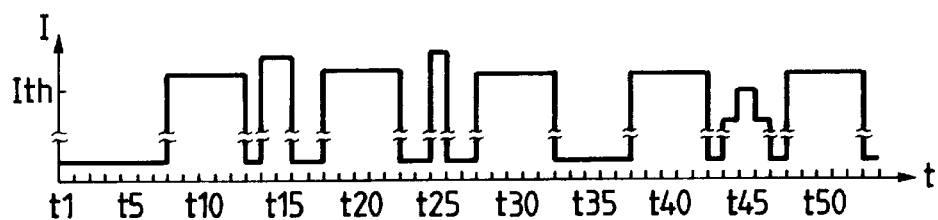
FIGS. 32A to 32E are drawings to show signal processing steps in a signal processing means in Embodiment 3.

FIG. 32A shows time series signals (also including the noise components) obtained by digitizing electric currents flowing through probe 1 (i.e., the output from the signal detecting means 11) upon reproduction of the bit string formed in the recording surface 8 by the probe 1, based on the clock signals. The abscissa t=tn (n=1, 2, . . . , n, . . . ) indicates the clock signals. The ordinate I indicates the intensities of the time series signals.

In the following description, the intensities of signals I at clock signals t=tn are represented by In.

In FIG. 32A, t=t1 corresponds to the time of start of the bit detection operation by the probe 1. In the period corresponding to $t1 \leq t \leq t5$ the probe 1 scans a region on a non-bit-forming portion of the recording surface 8.

Peaks in $t14 \leq t \leq t15$, t=t25, and $t44 \leq t \leq t46$ are the noise. Peaks at times other than them are signals originating from bits. In the present embodiment the clock signals tn are formed at timings capable of sampling k data (k=5 in the present embodiment) during the period where the probe 1 moves the distance corresponding to the mean maximum diameter of each bit in the bit string.

Next, a mean value of signal intensities I as defined by the following equation is calculated in the period corresponding to the clock signals of from t=t1 to t=t5 shown in FIG. 32A.

$$(I1+I2+ \ldots +I5)/(t5-t1)=M \qquad (1)$$

Figure 32B:
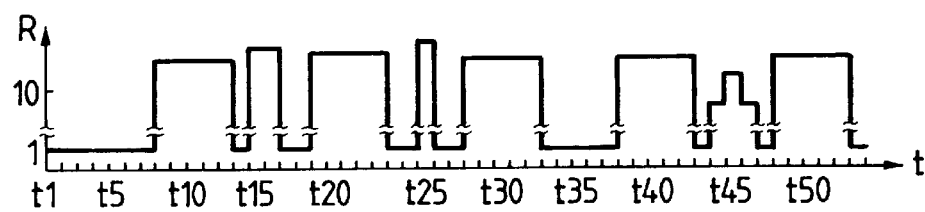

Then the digital time series signals In (see FIG. 32A) are multiplied by the reciprocal 1/M of the mean M of signal intensities, represented by above Eq. (1). The result is shown in FIG. 32B.

The abscissa t=tn (n 1, 2, ... n, ...) indicates the clock signals. The ordinate R represents the intensities of the signals formed by multiplying the time series signals I shown in FIG. 32A by foregoing 1/M. In the following description, intensities of signals R at times corresponding to the clock signals t=tn are denoted by Rn (n=1, 2, ..., n, ...).

Next, by the binarizing process to compare the above signals Rn (see FIG. 32B) with a threshold value, the signals Rn are converted to binary signals comprised of 0 and 1.

In the present embodiment the threshold value was preliminarily set as described below.

For the intensities of signals detected by the probes upon bit detection, if there was the relation that intensities of signals detected at bit portions>intensities of signals detected at non-bit-forming portions, the aforementioned threshold value was set to be 10, which was the value obtained by obtaining for each probe the ratio Ib/Inb between the signal intensity Inb detected by each probe in performing the bit detection operation while the all probes involved in the bit formation and bit detection in the recording/reproducing apparatus were fixed relative to respective non-bit-forming regions of the recording surface, and the signal intensity Ib detected by each probe in further performing the bit detection operation after execution of the bit forming operation while each probe was fixed relative to the aforementioned region, and calculating a value of {(Hmin−1)×0.8a+1} for the minimum value Hmin among the ratios of the respective probes.

The rules for conversion to binary signals were as follows.

If the signals detected by the probes are such that the intensities of signals at bit portions are relatively greater than those detected at non-bit-forming portions, among the digital signals Rn the intensities of signals greater than the threshold value (=10) are converted to 1 and the intensities of signals smaller than the threshold value (=10) to 0.

Contrary to it, if the signals detected by the probes are such that the intensities of signals at bit portions are relatively smaller than those detected at non-bit-forming portions, among the digital signals Rn the intensities of signals smaller than the threshold value (=10) are converted to 1 while the intensities of signals greater than the threshold value (=10) to 0.

Figure 32C:
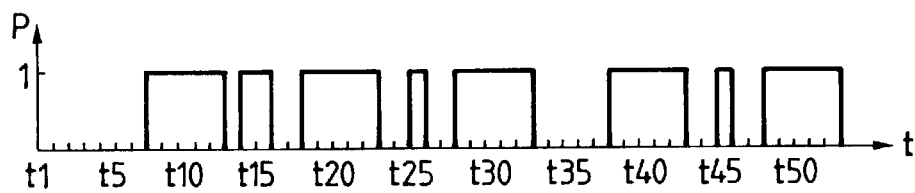

According to the above rules, the time series signals Rn shown in FIG. 32B are converted to binary signals. The result of the binarizing process is shown in FIG. 32C. The abscissa t=tn (n=1, 2, ..., n, ...) indicates the clock signals. The ordinate P indicates the signal intensities binarized according to the above rules.

In the following description, the intensities of signals P at times corresponding to the clock signals t=tn will be denoted by Pn (n=1, 2, ..., n, ...).

In the present invention, in the time series signals Pn comprised of the binary signals, a distribution of signals with signal intensity being 1 is measured.

Then signals in a zone where the distribution of signals with signal intensity 1 satisfies a predetermined condition are determined to be bit detection signals resulting from a bit.

The process for measuring the above signal distribution is described below.

First, for the time series signals Pn comprised of the binary signals, the signals represented by below Eq. (2) are calculated for all n.

$$Pn+Pn-1+ \ldots +Pn-k+1=Qn \qquad (2)$$

For example, Q10 for clock signal t10, of the signals shown in FIG. 32C is given as follows.

$$Q10=P10+P9+ \ldots +P6$$

Figure 32D:
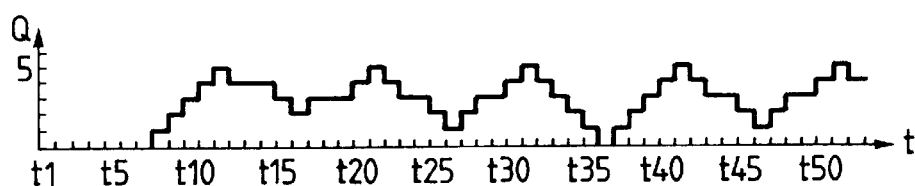

The calculation result of the signals Qn for the binary signals shown in FIG. 32C is shown in FIG. 32D.

In the present invention, the above time series signals Qn are further converted to new signals Yn in accordance with the rules indicated by below Eqs. (3) and (4).

$$Yn=1 \text{ if } Qn \geq p \times k \ (0.5<p<0.95) \qquad (3)$$

$$Yn=0 \text{ if the magnitude of } Qn \text{ is outside the range of Eq. (3)} \qquad (4)$$

Figure 32E:
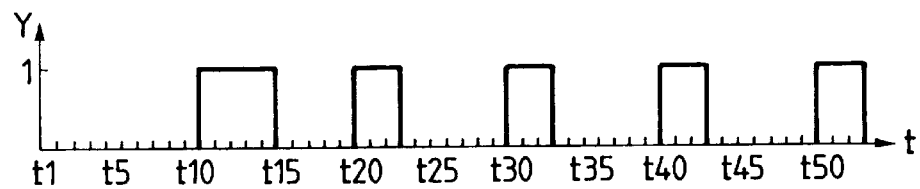

Here, the result of converting the signals shown in FIG. 32D according to the rules of Eq. (3) and Eq. (4) with p=0.9 is shown in FIG. 32E.

In the present invention, among the signals Yn newly formed based on the rules as represented by above Eq. (3) and Eq. (4), signals with signal intensity being 1 are determined to be bit detection signals.

The larger the value of p, the higher the bit detection accuracy.

In the present invention, the value of p is preferably 0.8 or more.

As apparent from comparison of FIG. 32A with FIG. 32E, the signal processing according to the present invention removed the noise measured in t14≦t≦t15, t=t25, and t44≦t≦t46, thereby extracting only the signals originating from corresponding bits.

As described above, by performing the signal processing according to the present invention, only the bits were able to be detected correctly even with mixture of noise during bit detection, without performing complex signal processing for removing the noise.

(Comparative Example 3)

Instead of performing the signal processing according to the present invention as described in Embodiment 3, bit detection was conducted by a process of comparing the digital signals shown in FIG. 32A with the threshold value Ith shown in FIG. 32A.

In the signals shown in FIG. 32A, intensities of signals greater than the threshold value Ith were converted to 1 and intensities of signals smaller than the threshold value to 0. The signals with signal intensity being 1 were determined to be bit-originating signals.

In this case, the noise other than the bits was also recognized erroneously as a bit.

[Embodiment 4]

In the present embodiment, bit detection was carried out using the information recording/reproducing apparatus used in Embodiment 3.

Similarly as in Embodiment 3, the noise was also mixed in the signals detected by the probes upon reproduction of bit in the present embodiment. In the present embodiment the noise was mixed in only the signals detected while the probes were scanning regions on the bits.

The magnitude of the noise is almost equal to the intensities of the signals originating from the bits and the polarity thereof is opposite. In order to easily check that the signal processing of the present invention permits accurate bit detection, the present embodiment used two bits formed in Embodiment 3 and bit detection was carried out for the bits.

Figure 33A:
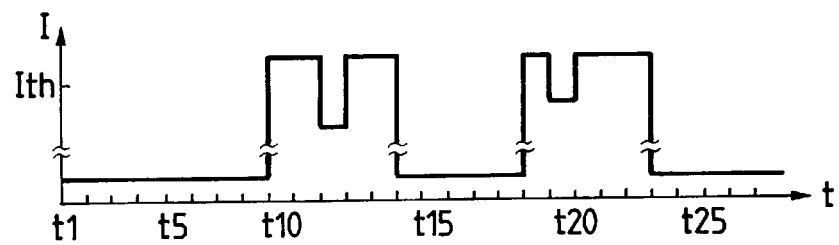
FIGS. 33A to 33E are drawings to show signal processing steps in a signal processing means in Embodiment 4.

FIG. 33A shows the time series signals (also including the above noise components) obtained by digitizing electric currents flowing through the probe 1 (i.e., the output from the signal detecting means 11) upon reproduction of the bit string formed in the recording surface 8 by the probe 1, based on the clock signals.

The abscissa t=tn (n=1, 2, ..., n, ...) indicates the clock signals. The ordinate I indicates the intensities of the time series signals. In the following description, the intensities of signals I at the clock signal t=tn will be denoted by In.

In FIG. 33A, t=t1 corresponds to the time of start of bit detection operation by probe 1.

Then, in the zone corresponding to t1≦t≦t5 the probe 1 is scanning a region on a non-bit-forming portion.

The timings when the noise was mixed in the signals originating from corresponding bits are two points of t=t11 and t20.

The clock signals tn are formed at the timings capable of sampling k data (k=5 in the present embodiment) while the probe 1 moves the distance corresponding to the mean maximum diameter of each bit in the bit string.

Next, a mean value of signal intensities I as defined below is calculated in the zone corresponding to the clock signals of t=t1 to t=t5 shown in FIG. 33A.

$$(I1+I2+ \ldots +I5)/(t5-t1)=M \quad (1)$$

The digital time series signals In (see FIG. 33A) are multiplied by the reciprocal 1/M of the mean M of signal intensities represented by above Eq. (1).

Figure 33B:
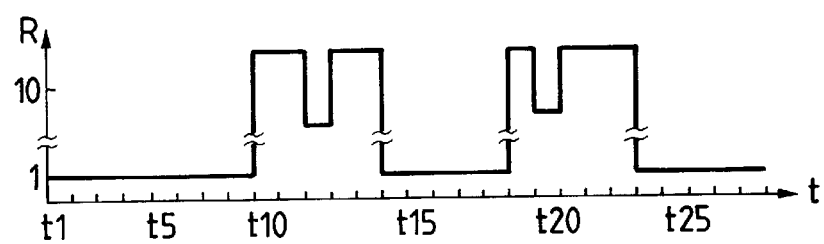

The result is shown in FIG. 33B.

The abscissa t=tn (n=1, 2, ..., n, ...) indicates the clock signals. The ordinate R indicates the intensities of the signals formed by multiplying the time series signals I shown in FIG. 33A by foregoing 1/M. In the following description, the intensities of signals R at times corresponding to the clock signals t=tn will be denoted by Rn (n=1, 2, ..., n, ...).

Next, by the binarizing process to compare the above signals Rn (see FIG. 33B) with the threshold value, the signals Rn are converted to binary signals comprised of 0 and 1.

In the present embodiment the threshold value is 10, which is the same as in Embodiment 1.

The rules for conversion to binary signals are as follows.

If the signals detected by the probes are such that intensities of signals at the bit portions are relatively greater than those detected at the non-bit-forming portions, among the digital signals Rn the intensities of signals greater than the threshold value (=10) are converted to 1 while the intensities of signals smaller than the threshold value (=10) to 0.

Contrary to it, if the signals detected by the probes are such that the signal intensities detected at the bit portions are relatively smaller than those detected at the non-bit-forming portions, among the digital signals Rn the intensities of signals smaller than the threshold value (=10) are converted to 1 while the intensities of signals greater than the threshold value (=10) to 0.

Figure 33C:
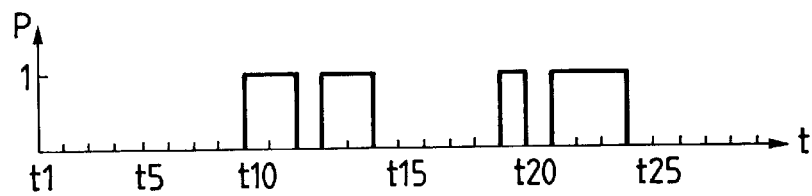

According to the above rules, the time series signals Rn shown in FIG. 33B are converted to binary signals. The result of the binarizing process is shown in FIG. 33C. The abscissa t=tn (n=1, 2, ..., n, ...) indicates the clock signals. The ordinate P indicates the signal intensities binarized according to the above rules.

In the following description, the intensities of signals P at times corresponding to the clock signals t=tn will be denoted by Pn (n=1, 2, ..., n, ...).

In the present invention, among the time series signals Pn comprised of the binary signals, a distribution of signals with signal intensity being 1 is measured.

Then signals in a domain where the distribution of signals with the signal intensity 1 satisfies a predetermined condition are determined to be bit detection signals resulting from a bit.

The above process for measuring the signal distribution is described below.

First, with the time series signals Pn comprised of the binary signals, the signals represented by below Eq. (2) are calculated for all n.

$$Pn+Pn-1+ \ldots +Pn-k+1=Qn \quad (2)$$

For example, Q10 for the clock signal t10, of the signals shown in FIG. 33C is given as follows.

$$Q10=P10+P9+ \ldots +P6$$

Figure 33D:
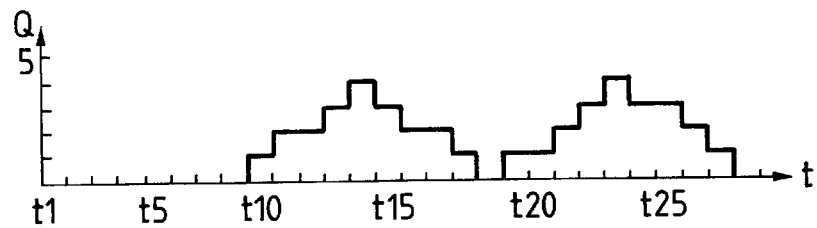

The calculation result of the signals Qn for the binary signals shown in FIG. 33C is shown in FIG. 33D.

In the present invention, the above time series signals Qn are further converted to new signals Yn according to the rules represented by below Eqs. (3) and (4).

$$Yn=1 \text{ if } Qn \geq p \times k \ (0.5<p<0.95) \quad (3)$$

$$Yn=0 \text{ if the magnitude of } Qn \text{ is outside the range of Eq. (3)} \quad (4)$$

Figure 33E:
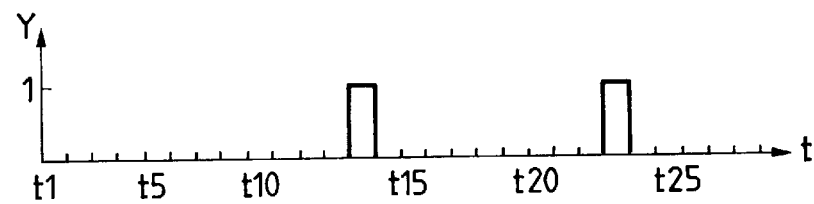

In the present embodiment, FIG. 33E shows the result of converting the signals shown in FIG. 33D in accordance with the rules of Eq. (3) and Eq. (4) with p=0.8.

In the present invention, among the signals Yn newly formed based on the rules indicated by above Eq. (3) and Eq. (4), signals with signal intensity being 1 are determined to be bit detection signals.

As apparent from comparison of FIG. 33A with FIG. 33E, the signal processing according to the present invention was able to extract the bits in the accurate number even if the noise is mixed in the signals originating from the corresponding bits.

As described above, by performing the signal processing according to the present invention, only the bits were able to be detected correctly even with mixture of noise in the bit-originating signals, without performing complex signal processing for removing the noise.

(Comparative Example 4)

Without performing the signal processing according to the present invention as described in Embodiment 4, bit detection was conducted by a process to compare the digital signals shown in FIG. 33A with the threshold value Ith shown in FIG. 33A.

Among the signals shown in FIG. 33A, the intensities of signals greater than the threshold value Ith were converted to 1 while the intensities of signals smaller than the threshold value to 0. Then signals with signal intensity being 1 were determined to be bit-originating signals.

In this case, it was recognized that there were four bits, and therefore, the erroneous number of bits was recognized.

[Embodiment 5]

In the present embodiment bit detection was carried out using the information recording/reproducing apparatus used in Embodiment 3. In the present embodiment, the signal processing of the present invention was effected on the time series signals detected by a probe (hereinafter referred to as probe b) different from the probe having detected the time series signals shown in FIG. 32A in Embodiment 3 (which will be referred to as probe a). Because of a curvature of the cantilever supporting the probe b, the distance between the probe tip of the probe b and the recording medium is larger than that of the probe a.

In the present embodiment the noise was also mixed in the signals detected by the probe upon reproduction of bit. The noise was mixed in the signals detected while the probe b was scanning the non-bit-forming portions.

In order to easily check that accurate bit detection was possible by the signal processing of the present invention, in the present embodiment bit detection was conducted for five bits formed by the method described in Embodiment 3.

Figure 34A:
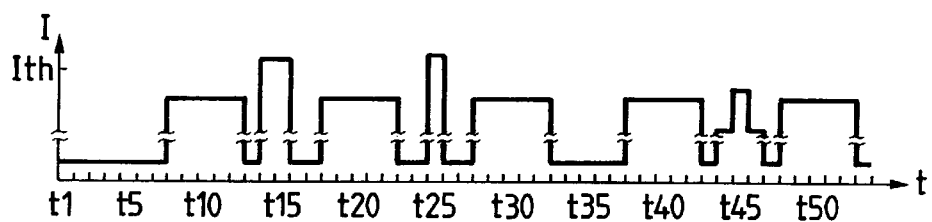
FIGS. 34A to 34E are drawings to show signal processing steps in a signal processing means in Embodiment 5.

In this case, FIG. 34A shows the time series signals (also including the above noise components) obtained by digitizing electric currents flowing through the probe b (i.e., the output from the signal detecting means 11) upon reproduction of bit string formed in the recording surface 8 by the probe b.

The abscissa t=tn (n=1, 2, ..., n, ...) indicates the clock signals. The ordinate I indicates the intensities of the time series signals. In the following description, the intensities of signals I at the clock signals t=tn will be denoted by In.

In FIG. 34A, t=t1 corresponds to the time of start of bit detection operation by the probe b.

In the zone corresponding to t1 t≦t≦t5, the probe b scans a region on a bit-less portion.

The clock signals tn are formed at timings capable of sampling k data (k=5 in the present embodiment) while the probe b moves the distance corresponding to the mean maximum diameter of each bit in the bit string.

Next, the mean value of signal intensities I as defined below is calculated in the zone corresponding to the clock signals of from t=t1 to t=t5 as shown in FIG. 34A.

$$(I1+I2+ \ldots +I5)/(t5-t1)=M \quad (1)$$

Then the digital time series signals In (see FIG. 34A) are multiplied by 1/M, the reciprocal of the mean M of signal intensities represented by above Eq. (1).

Figure 34B:
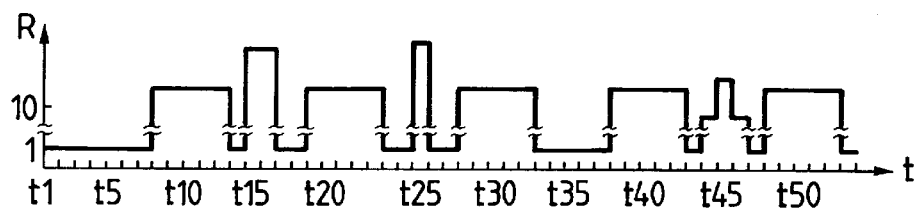

The result is shown in FIG. 34B.

The abscissa t=tn (n=1, 2, ..., n, ...) indicates the clock signals. The ordinate R indicates the intensities of signals formed by multiplying the time series signals I shown in FIG. 34A by above 1/M. In the following description, the intensities of signals R at times corresponding to the clock signals t=tn will be denoted by Rn (n=1, 2, ..., n, ...).

Next, by the binarizing process to compare the above signals Rn (see FIG. 34B) with the threshold value, the signals Rn are converted to binary signals comprised of 0 and 1.

In the present embodiment the threshold value is 10, which is the same as in Embodiment 3.

The rules for conversion to the binary signals are as follows.

If the signals detected by the probe are such that the intensities of the signals at the bit portions are relatively greater than those detected at the bitless portions, among the digital signals Rn the intensities of the signals greater than the threshold value (=10) are converted to 1 while the intensities of the signals smaller than the threshold value (=10) to 0.

Contrary to it, if the signals detected by the probe are such that the signal intensities at the bit portions are relatively smaller than those detected at the bitless portions, among the digital signals Rn the intensities of the signals smaller than the threshold value (=10) are converted to 1 while the intensities of the signals greater than the threshold value (=10) to 0.

Figure 34C:
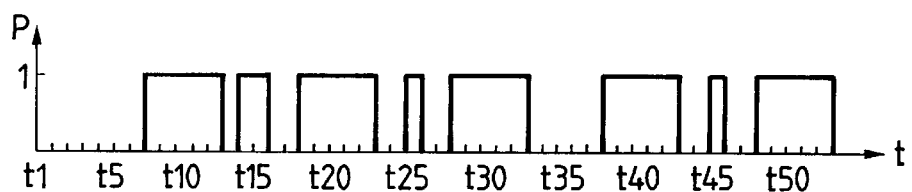

According to the above rules, the time series signals Rn shown in FIG. 34B are converted to binary signals. The result of the binarizing process is shown in FIG. 34C. The abscissa t=tn (n=1, 2, ..., n, ...) is indicates the clock signals. The ordinate P indicates the signal intensities binarized according to the above rules.

In the following description, the intensities of signals P at times corresponding to the clock signals t=tn will be denoted by Pn (n=1, 2, ..., n, ...).

In the present invention, a distribution of signals with signal intensity being 1 is measured in the time series signals Pn comprised of the above binary signals.

Then signals in a zone where the distribution of signals with signal intensity 1 satisfies a predetermined condition are determined to be bit detection signals resulting from a bit.

The process for measuring the above signal distribution is described below.

First, with the time series signals Pn comprised of the binary signals, signals represented by below Eq. (2) are calculated for all n.

$$Pn+Pn-1+ \ldots +Pn-k+1=Qn \quad (2)$$

For example, Q10 for clock signal t10 in the signals shown in FIG. 34C is as follows.

$$Q10=P10+P9+ \ldots +P6$$

Figure 34D:
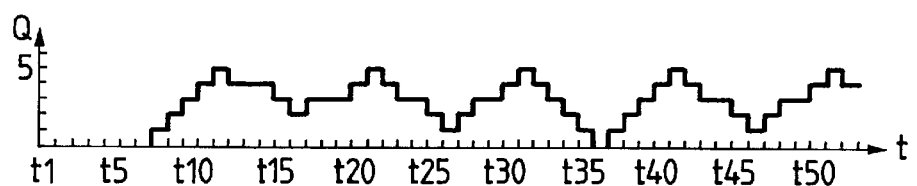

The calculation result of the signals Qn for the binary signals shown in FIG. 34C is shown in FIG. 34D.

In the present invention, the above time series signals Qn are further converted to new signals Yn according to the rules defined by below Eqs. (3) and (4).

$$Yn=1 \text{ if } Qn \geq p \times k \ (0.5 < p < 0.95) \quad (3)$$

$$Yn=0 \text{ if the magnitude of } Qn \text{ is outside the range of Eq. (3)} \quad (4)$$

In the present embodiment, the signals shown in FIG. 34D were converted according to the rules of Eq. (3) and Eq. (4) with p=0.8 and the result is shown in FIG. 34E.

In the present invention, among the signals Yn newly formed based on the rules represented by above Eq. (3) and Eq. (4), signals with signal intensity being 1 are determined as bit detection signals.

Figure 34E:
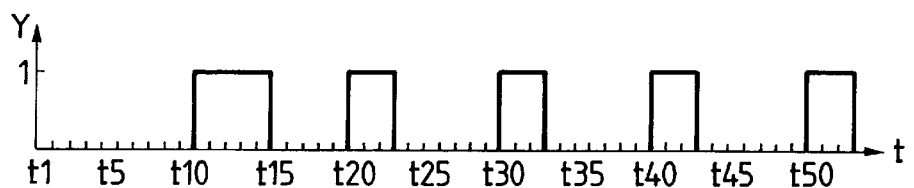

As apparent from comparison Of FIG. 34A with FIG. 34E, by the signal processing according to the present invention, the number of bits was able to be extracted accurately even with mixture of spike noise in the bit-originating signals.

As described above, by performing the signal processing according to the present invention, only the bits were able to be detected correctly even with mixture of spike noise in the bit-originating signals, without performing complex signal processing for removing the noise.

Even if the probes had variation in the distance between the probe tip and the recording medium, only the bits were able to be extracted without performing the distance control for the individual probes and without setting a threshold value for each probe.

(Comparative Example 5)

Without performing the signal processing according to the present invention as described in Embodiment 5, bit detection was carried out using Ith shown in FIG. 34A as a threshold value.

In the signals shown in FIG. 34A, the intensities of the signals greater than the threshold value Ith are converted to 1 while the intensities of the signals smaller than the threshold value to 0. Then signals with signal intensity being 1 were determined as bit-originating signals.

In this case, spike noise was recognized as bits.

[Embodiment 6]

The present embodiment explains a recording bit detection method as a combination of the bit detection method for carrying out plural scans for one recording bit string as explained in Embodiments 1 and 2 with the bit detection method for carrying out plural signal detections in time series on one recording bit during one scanning as explained in Embodiments 3 to 5.

Figure 37:
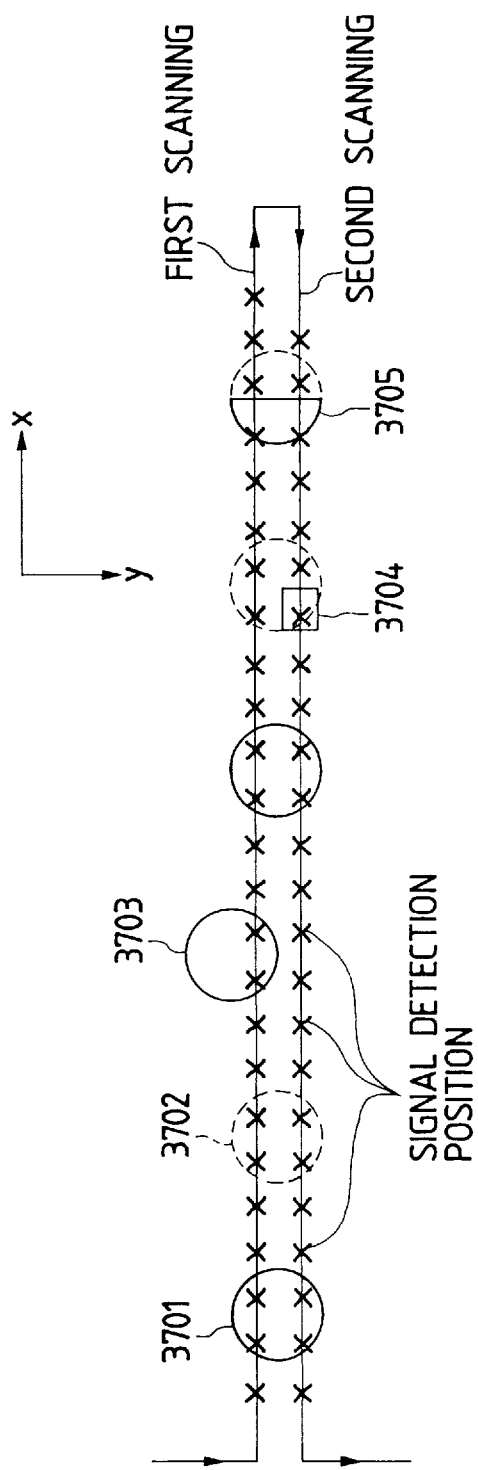
FIG. 37 is a drawing to illustrate a plural-times scanning method and plural-times recording bit detection in embodiment 6 of the recording/reproducing method of the present invention.

The present embodiment is arranged to perform plural scans (two scans, i.e., first scan and second scan, in FIG. 37), shifted in the y-direction, for one recording bit string and to perform plural (two in FIG. 37) signal detections for bit detection at positions shifted in the x-direction on one recording bit, as shown in FIG. 37.

Figure 38:
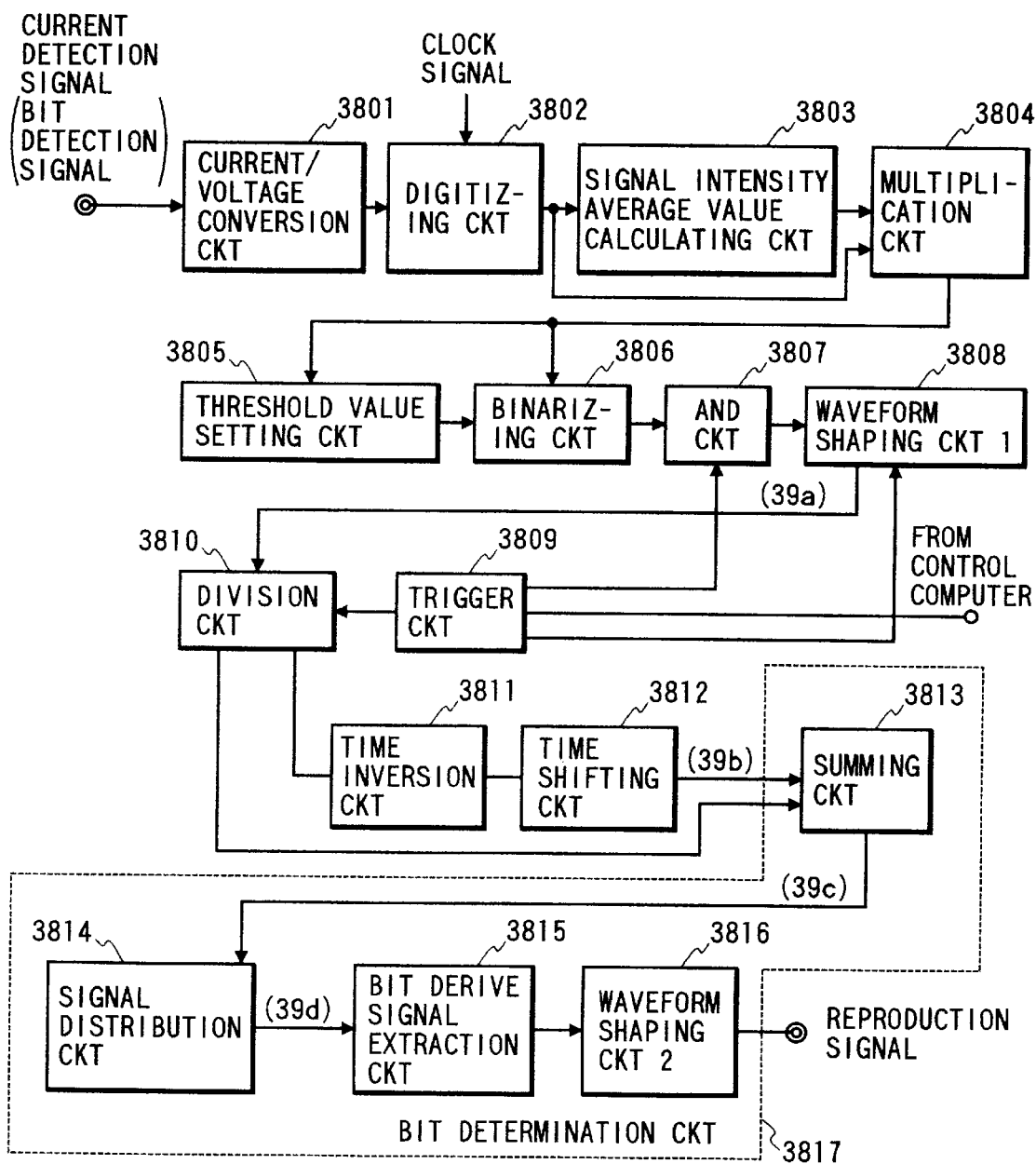
FIG. 38 is a block diagram of the reproduction control circuit for performing the bit detection signal process in Embodiment 6.

FIG. 38 shows the details of the reproduction control circuit for bit detection in the present embodiment.

In FIG. 38, a current/voltage converting circuit 3801 converts each current detection signal (bit detection signal) input thereto to a voltage signal and thereafter a digitizing circuit 3802 digitizes the voltage signal, based on the clock signal t=tn (n=1, 2, ..., n, ...), similarly as in Embodiment 3, so as to obtain the time series signals In. Then an intensity mean calculating circuit 3803 calculates the intensity mean calculating circuit 3803 calculates the mean value M=[(I1+ I2+ . . . +Ik)/(tk−t1)] of detection signal intensities at a bitless portion. Next, a multiplication circuit 3804 multiplies the digital signal In by 1/M to obtain signal Rn [=In/M]. A threshold setting circuit 3805 sets a threshold value according to the rules described in Embodiment 3. Using this signal, a binarizing circuit 3806 effects the binarizing process on the output signal from the multiplication circuit 3804 to obtain a binary signal. Then an AND circuit 3807 takes AND between the binary signal and a bit detection synchronizing signal output from a trigger circuit 3809, similarly as in Embodiment 1. The AND signal is supplied to a waveform shaping circuit 1 (3808) to obtain a waveform-shaped signal (signal corresponding to the signal Pn in Embodiment 3).

FIG. 37 shows an example in which there are ON bit 3701, OFF bit 3702, ON bit 3703 at a position shifted in the y-direction, noise area 3704, and ON bit 3705 partially broken, formed on the recording bit string. FIG. 39A shows output signal waveforms from the waveform shaping circuit 1 (3808), produced using the reproduction control circuit shown in FIG. 38 with such recording bits.

Similarly as in Embodiment 1, a signal after waveform shaping is supplied to a dividing circuit 3810 to be divided into two, first and second divisional signals, based on first scan synchronizing signal and second scan synchronizing signal output from the trigger circuit 3809. The first divisional signal is guided via a time inverting circuit 3811 and a time shifting circuit 3812 to be inverted and shifted in terms of the time, thus becoming waveforms (FIG. 39B) synchronized with the second divisional signal. An output signal from the time shifting circuit 3812 and the second divisional signal are supplied to a bit determination 3817 comprised of a summing 3813, a signal distribution measuring circuit 3814, a bit-originating signal extracting circuit 3815, and a waveform shaping circuit 3816 to be output as a reproduction signal.

First, the output signal from the time shifting circuit 3812 and the second divisional signal are put into the summing 3813 to be added. The output waveforms from the summing 3813 are shown in FIG. 39C.

The output from the summing 3813 is supplied to the signal distribution measuring circuit 3814 to calculate the signal distribution measuring signal Qn [=Pn+Pn−1+ . . . +Pn−k+1]. Waveforms as a calculation result output from this signal distribution measuring circuit 3814 are shown in FIG. 39D. Further, this signal is put into the bit-originating signal extracting circuit 3815 to be binarized based on the same rules as in Embodiment 3. Waveforms of output signals from the bit-originating signal extracting circuit 3815 are shown in FIG. 39E. Finally, the output signals are supplied to the waveform shaping circuit 2 (3816) to effect waveform shaping, thus obtaining the reproduction signals. The waveforms of the reproduction signals correspond to the result of recording bit detection carried out by scanning the recording bit string in FIG. 37 from the right to the left in the drawing (i.e., in the direction of the second scan).

By the method of the present embodiment, the recording bits can be detected correctly even with existence of the bit at the position shifted in the y-direction, the noise area, and the partially broken bit in the recording bit string. In addition, the present embodiment allows higher-accuracy recording bit detection by a smaller number of scans than Embodiments 1 and 2. Further, the recording bit rate is a little lower because of execution of plural scans than in Embodiments 3 to 5, but the present embodiment can keep the overall recording bit detection rate substantially in the same level as in Embodiments 3 to 5, because the number of signal detections in one bit can be kept down.

As described above, the recording bit detection method of the present embodiment is a combination of the method of Embodiments 1, 2 for performing plural scans with the method of Embodiments 3 to 5 for performing plural signal detections in one bit, which is a high-speed and high-accuracy recording bit detection method taking advantage of the features of the two methods more effectively.

What is claimed is:

1. A recording/reproducing apparatus for performing recording/reproduction by running a probe relative to a recording bit string on a recording medium and detecting recording bits in said recording bit string, comprising:

plural recording bit detection means for letting said probe perform plural recording bit detections as taking positions thereof shifted relative to a same recording bit string on the recording medium; and recording bit determining means for performing determination of true recording bit, based on the results of said plural recording bit detections.

2. The recording/reproducing apparatus according to claim 1, wherein said plural recording bit detection means comprises plural scanning means for letting said probe perform plural scans relative to a same recording bit string on the recording medium as taking scanning positions thereof shifted in a direction perpendicular to said bit string, and means for performing recording bit detection in each of said plural scans.

3. The recording/reproducing apparatus according to claim 2, wherein said plural scanning means performs at least three scans as shifting the position of the probe in a direction perpendicular to a scanning direction, for a same recording bit string recorded.

4. The recording/reproducing apparatus according to claim 3, wherein said plural scanning means has forward/backward scanning means for inverting a relative scanning direction between said probe and said recording bit string at least once.

5. The recording/reproducing apparatus according to claim 4, wherein said plural scanning means further comprises an actuator having hysteresis characteristics in drive signal-drive amount characteristics, and actuator drive control means for performing drive of said actuator corrected so that said drive signal-drive amount characteristics have linearity with respect to the time.

6. The recording/reproducing apparatus according to claim 3, wherein said plural scanning means has circumferential scanning means for letting said probe perform plural circumferential scans on a recording bit string arranged circumferentially.

7. The recording/reproducing apparatus according to either one of claims 3 to 6, wherein said bit determining means comprises recording bit detecting means for performing detection of recording bit during the plural scans by said plural scanning means, and reproduction signal processing means for removing an error signal from recording bit detection signals of the plural scans output from said recording bit detecting means.

8. The recording/reproducing apparatus according to claim 7, wherein said reproduction signal processing means comprises time shifting means for temporally shifting said recording bit detection signals, and a recording bit determining circuit for determining whether a bit is a true recording bit, using said recording bit detection signals and recording bit detection signals temporally shifted by said time shifting means.

9. The recording/reproducing apparatus according to claim 8, wherein said recording bit determining circuit has means for calculating an OR signal and an AND signal between said recording bit detection signal and said temporally shifted recording bit detection signal.

10. The recording/reproducing apparatus according to claim 7, wherein said reproduction signal processing means has means for generating a recording bit detection synchronizing signal synchronized with a timing to perform said recording bit detection, and synchronizing detection means for detecting said recording bit detection signal in synchronization with said recording bit detection synchronizing signal.

11. The recording/reproducing apparatus according to claim 10, wherein said synchronizing detection means has means for calculating an AND signal between said recording bit detection signal and said recording bit detection synchronizing signal.

12. The recording/reproducing apparatus according to claim 7, wherein said reproduction signal processing means has time inverting means for temporally inverting said recording bit detection signals.

13. The recording/reproducing apparatus according to any of claim 1–6, said recording/reproducing apparatus running a plurality of probes together relative to plural recording bit strings to detect a plurality of recording bits.

14. The recording/reproducing apparatus according to claim 1, wherein said plural recording bit detection means has means for letting said probe perform plural recording bit detections in one scan for a same recording bit on the recording medium.

15. The recording/reproducing apparatus according to claim 14, wherein said plural recording bit detection means is arranged to detect only signals originating from bits by signal processing means for effecting a predetermined signal process on time series signals In (intensities of time series signals at times corresponding to clock signals t=tn) digitized based on the clock signals t=tn (where n=1, 2, . . . , n, . . . ; t=t1 corresponds to a time of start of bit detection operation).

16. The recording/reproducing apparatus according to claim 15, wherein said desired signal processing means comprises:

means for calculating a mean of signal intensities, as defined below, in a zone corresponding to said clock signals of from t=t1 to t=tm, $$(I1+I2+ \ldots +Im)/(tm-t1)=M;$$

means for multiplying said digitized time series signals In by 1/M, a reciprocal of said means of signal intensities;
means for converting time series signals formed by multiplication of said reciprocal to binary signals comprised of 0 and 1 by a binarizing process to compare said time series signals with a threshold value;

means for measuring a distribution of signals with signal intensity being 1 in time series signals Pn (binary signal intensities at times corresponding to the clock signals t=tn) comprised of the binary signals;
means for determining if the distribution of signals with signal intensity being 1 satisfies a predetermined condition; and
means for determining signals in a zone where said distribution of signals satisfies the predetermined condition, as bit detection signals resulting from a bit, wherein said probe scans a region on a bitless portion of said recording surface at least in a zone corresponding to the clock signals of from t=t1 to t=tm (m<1).

17. The recording/reproducing apparatus according to claim 15 or 16, wherein said threshold value is set to a value calculated in such a manner that a ratio Ib/Inb is obtained for each probe between a signal intensity Inb, detected by each probe in, before bit formation based on said recording information, preliminarily performing a bit detection operation while the all probes involved in bit formation and bit detection in said recording/reproducing apparatus are kept fixed relative to respective bitless regions of said recording surface, and a signal intensity Ib, detected by each probe in performing the bit detection operation after execution of bit forming operation while each probe is fixed relative to said region and that a predetermined process is effected on said ratios by processing means.

18. The recording/reproducing apparatus according to claim 17, wherein said processing means for effecting the predetermined process on said ratios comprises means for obtaining a minimum value Hmin out of said ratios for said respective probes, and means for obtaining (a×Hmin) (where 0.5<a<0.9) for said Hmin, wherein said (a×Hmin) is used as said threshold value.

19. The recording/reproducing apparatus according to claim 18, wherein said a is 0.8.

20. The recording/reproducing apparatus according to claim 17, wherein said processing means for effecting said predetermined process on said ratios comprises means for obtaining a maximum value Hmax out of said ratios for said respective probes, and means for obtaining {(1−Hmax)×b+ Hmax)} (where 0.1<b<0.5) for said Hmax, wherein said {(1−Hmax)×b+Hmax} is used as said threshold value.

21. The recording/reproducing apparatus according to claim 20, wherein said b is 0.2.

22. The recording/reproducing apparatus according to claim 16, wherein if signals detected by said probes are such that intensities of signals detected at bit portions are relatively greater than intensities of signals detected at said bitless portions, said binarizing process converts intensities of signals greater than said threshold value to 1 and intensities of signals smaller than said threshold value to 0.

23. The recording/reproducing apparatus according to claim 16, wherein if signals detected by said probes are such that intensities of signals detected at bit portions are relatively smaller than intensities of signals detected at said bitless portions, said binarizing process converts intensities of signals smaller than said threshold value to 1 and intensities of signals greater than said threshold value to 0.

24. The recording/reproducing apparatus according to claims 16, 22 or 23, wherein the clock signals tn are formed at timings capable of sampling k data (2<k) during a period in which said probe moves a distance corresponding to a mean maximum diameter of each bit in said bit string.

25. The recording/reproducing apparatus according to claims 16, 22 or 23, wherein the means for measuring the distribution of signals with signal intensity being 1 in said time series signals Pn comprised of the binary signals comprises means for calculating Qn defined below for all n, $$Pn+Pn-1+\ldots+Pn-k+1 \equiv Qn.$$

26. The recording/reproducing apparatus according to claims 16, 22 or 23, wherein said predetermined condition as to the distribution of signals with signal intensity being 1 is $$Qn \geq p \times k \ (0.5 < p < 0.95).$$

27. The recording/reproducing apparatus according to claim 26, wherein said p is 0.8.

28. The recording/reproducing apparatus according to claims 16, 22 or 23, wherein said means for determining the signals in the zone where said distribution of signals satisfies the predetermined condition, as bit detection signals resulting from a bit, converts Qn satisfying said predetermined condition to a signal of signal intensity 1 and Qn not satisfying said predetermined condition to a signal of signal intensity 0, and determines the signals with signal intensity being 1 in the time series signals Yn comprised of the binary signals, as bit detection signals.

29. The recording/reproducing apparatus according to claims 15, 16, 22 or 23, which comprises a plurality of said probes.

30. The recording/reproducing apparatus according to claims 15, 16, 22 or 23, wherein said probe is fixed at a free end of a cantilever.

31. The recording/reproducing apparatus according to claims 15, 16, 22 or 23, wherein said probe and said recording medium are comprised of an electrically conductive material.

32. The recording/reproducing apparatus according to claims 15, 16, 22 or 23, wherein said recording medium is comprised of an electrically conductive electrode and an LB film formed on said electrode and said recording surface is a surface of said LB film.

33. The recording/reproducing apparatus according to claims 15, 16, 22 or 23, wherein a signal reflecting a state of the recording surface, detected through said probe, is an electric current flowing between said probe and said recording medium.

34. The recording/reproducing apparatus according to claim 33, wherein said electric current is a tunnel current.

35. A recording/reproducing method for performing recording/reproduction by running a probe relative to a recording bit string on a recording medium and detecting recording bits in said recording bit string, comprising:
   a step of letting said probe perform plural recording bit detections as taking positions thereof shifted relative to a same recording bit on the recording medium; and
   a step of performing determination of true recording bit, based on the results of said plural recording bit detections.

36. The recording/reproducing method according to claim 35, wherein said plural recording bit detections comprise performing plural scans of said probe relative to a same recording bit string on the recording medium as taking scanning positions thereof shifted in a direction perpendicular to said bit string, and performing recording bit detection in each of said plural scans.

37. The recording/reproducing method according to claim 36, wherein said determination of true bit is carried out based on a step of performing recording bit detection during plural scans by said plural scanning, and a reproduction signal processing step of eliminating an error signal from recording bit detection signals of the plural scans output from the recording bit detection.

38. The recording/reproducing method according to claim 36 or 37, wherein said plural scans of the probe are carried out by at least three scans of the probe relative to a same recording bit string recorded as taking positions thereof shifted in a direction perpendicular to a scanning direction thereof.

39. The recording/reproducing method according to claims 36 or 37, wherein said plural scans of the probe are carried out by forward/backward scans in which a relative scanning direction between said probe and said recording bit string is inverted at least once.

40. The recording/reproducing method according to claim 39, wherein said plural scans of the probe are carried out by an actuator having hysteresis characteristics in drive signal-drive amount characteristics, and an actuator drive control to perform drive of said actuator corrected so that said drive signal-drive amount characteristics have linearity with respect to the time.

41. The recording/reproducing method according to claim 39, wherein said reproduction signal processing step has a time inverting step of temporally inverting said recording bit detection signals.

42. The recording/reproducing method according to claims 35, 36 or 37, wherein said plural scans of the probe are carried out by circumferential scanning of letting said probe perform plural circumferential scans on a recording bit string arranged circumferentially.

43. The recording/reproducing method according to claim 37, wherein said reproduction signal processing step has a recording bit determining step of making a determination of a true recording bit when the recording bit is detected at least twice in the recording bit detection signals of said plural scans.

44. The recording/reproducing method according to claim 43, wherein said reproduction signal processing step further comprises a step of temporally shifting said recording bit detection signals and said recording bit determining step comprises a step of making a determination, based on said recording bit detection signals and recording bit detection signals temporally shifted in the time shifting step.

45. The recording/reproducing method according to claim 44, wherein said recording bit determining step has a step of calculating an OR signal and an AND signal between said recording bit detection signal and said temporally shifted recording bit detection signal.

46. The recording/reproducing method according to claims 37, 43, 44 or 45, wherein said reproduction signal processing step has a step of generating a recording bit detection synchronizing signal synchronized with a timing to perform said recording bit detection, and a synchronizing detection step of detecting said recording bit detection signal in synchronization with said recording bit detection synchronizing signal.

47. The recording/reproducing method according to claim 46, wherein said synchronizing detection step has a step of calculating an AND signal between said recording bit detection signal and said recording bit detection synchronizing signal.

48. The recording/reproducing method according to claims 36, 37 or 43–45, said recording/reproducing method comprising running a plurality of probes together relative to plural recording bit strings to detect a plurality of recording bits.

49. The recording/reproducing method according to claim 35, wherein said plural recording bit detection step comprises letting said probe perform plural recording bit detections in one scan for a same recording bit on the recording medium.

50. The recording/reproducing method according to claim 49, wherein said plural recording bit detections are arranged to detect only signals originating from bits by effecting a predetermined signal process on time series signals In (intensities of time series signals at times corresponding to clock signals t=tn) digitized based on the clock signals t=tn (where n=1, 2, . . . , n, . . . ; t=t1 corresponds to a time of start of bit detection operation).

51. The recording/reproducing method according to claim 50, wherein said desired signal processing comprises:

a step of calculating a mean of signal intensities, as defined below, in a zone corresponding to said clock signals of from t=t1 to t=tm, $$(I1+I2+ \ldots +Im)/(tm-t1)=M;$$

a step of multiplying said digitized time series signals In by 1/M, a reciprocal of said means of signal intensities;

a step of converting time series signals formed by multiplication of said reciprocal to binary signals comprised of 0 and 1 by a binarizing process to compare said time series signals with a threshold value;

a step of measuring a distribution of signals with signal intensity being 1 in time series signals Pn (binary signal intensities at times corresponding to the clock signals t=tn) comprised of the binary signals;

a step of determining if the distribution of signals with signal intensity being 1 satisfies a predetermined condition; and a step of determining signals in a zone where said distribution of signals satisfies the predetermined condition, as bit detection signals resulting from a bit, wherein said probe scans a region on a bitless portion of said recording surface at least in a zone corresponding to the clock signals of from t=t1 to t=tm (m>1).

52. The recording/reproducing method according to claim 50 or 51, wherein said threshold value is set to a value calculated in such a manner that a ratio Ib/Inb is obtained for each probe between a signal intensity Inb, detected by each probe in, before bit formation based on said recording information, preliminarily performing a bit detection operation while the all probes involved in bit formation and bit detection in said recording/reproducing apparatus are kept fixed relative to respective bitless regions of said recording surface, and a signal intensity Ib, detected by each probe in performing the bit detection operation after execution of bit forming operation while each probe is fixed relative to said region and that a predetermined process is effected on said ratios.

53. The recording/reproducing method according to claim 52, wherein said predetermined process on said ratios comprises a step of obtaining a minimum value Hmin out of said ratios for said respective probes, and a step of obtaining (a×Hmin) (where 0.5<a<0.9) for said Hmin, wherein said (a×Hmin) is used as said threshold value.

54. The recording/reproducing method according to claim 53, wherein said a is 0.8.

55. The recording/reproducing method according to claim 52, wherein said predetermined process on said ratios comprises a step of obtaining a maximum value Hmax out of said ratios for said respective probes, and a step of obtaining {(1−Hmax)×b+Hmax} (where 0.1<b<0.5) for said Hmax, wherein said {(1−Hmax)×b+Hmax} is used as said threshold value.

56. The recording/reproducing method according to claim 55, wherein said b is 0.2.

57. The recording/reproducing method according to claim 55, wherein if signals detected by said probes are such that intensities of signals detected at bit portions are relatively greater than intensities of signals detected at said bitless portions, said binarizing process converts intensities of signals greater than said threshold value to 1 and intensities of signals smaller than said threshold value to 0.

58. The recording/reproducing method according to claim 51, wherein if signals detected by said probes are such that intensities of signals detected at bit portions are relatively smaller than intensities of signals detected at said bitless portions, said binarizing process converts intensities of signals smaller than said threshold value to 1 and intensities of signals greater than said threshold value to 0.

59. The recording/reproducing method according to claims 51 or 58, wherein the clock signals tn are formed at timings capable of sampling k data (2<k) during a period in which said probe moves a distance corresponding to a mean maximum diameter of each bit in said bit string.

60. The recording/reproducing method according to claims 51 or 58, wherein the step of measuring the distribution of signals with signal intensity being 1 in said time series signals Pn comprised of the binary signals comprises a step of calculating Qn defined below for all n, $$Pn+Pn-1+ \ldots +Pn-k+1Qn.$$

61. The recording/reproducing method according to claims 51 or 58, wherein said predetermined condition as to the distribution of signals with signal intensity being 1 is $$Qn \geq p \times k \ (0.5<p<0.95).$$

62. The recording/reproducing method according to claim 61, wherein said p is 0.8.

63. The recording/reproducing method according to claims 51 or 58, wherein said step of determining the signals in the zone where said distribution of signals satisfies the predetermined condition, as bit detection signals resulting from a bit, comprises converting Qn satisfying said predetermined condition to a signal of signal intensity 1 and Qn not satisfying said predetermined condition to a signal of signal intensity 0, and determining the signals with signal intensity being 1 in the time series signals Yn comprised of the binary signals, as bit detection signals.

64. The recording/reproducing method according to claims 51 or 58, wherein a signal reflecting a state of the recording surface, detected through said probe, is an electric current flowing between said probe and said recording medium.

65. The recording/reproducing method according to claim 64, wherein said electric current is a tunnel current.

* * * * *